United States Patent
Clegg et al.

(10) Patent No.: US 12,494,933 B2
(45) Date of Patent: Dec. 9, 2025

(54) ARTIFICIAL INTELLIGENCE MODEL GENERATION OF MEETING TAPESTRIES

(71) Applicant: vTapestry, Inc., San Francisco, CA (US)

(72) Inventors: Eileen Marie Clegg, Bodega Bay, CA (US); Benjamin Mandeberg, Portland, OR (US); Ramana Rao, San Francisco, CA (US)

(73) Assignee: vTapestry, Inc., San Francisco, CA (US)

( * ) Notice: Subject to any disclaimer, the term of this patent is extended or adjusted under 35 U.S.C. 154(b) by 147 days.

(21) Appl. No.: 18/377,263

(22) Filed: Oct. 5, 2023

(65) Prior Publication Data

US 2024/0127514 A1  Apr. 18, 2024

Related U.S. Application Data

(60) Provisional application No. 63/416,914, filed on Oct. 17, 2022.

(51) Int. Cl.
*G06F 17/00* (2019.01)
*G06F 16/34* (2019.01)
(Continued)

(52) U.S. Cl.
CPC ........ *H04L 12/1831* (2013.01); *G06F 16/345* (2019.01); *G06F 16/5846* (2019.01);
(Continued)

(58) Field of Classification Search
CPC ............... H04L 12/1831; G06F 16/345; G06F 16/5846; G06F 40/20; G06F 40/216;
(Continued)

(56) References Cited

U.S. PATENT DOCUMENTS 10,629,189 B2 * 4/2020 Peters ................. H04L 12/1831
11,216,787 B1 * 1/2022 Shetty ................ G06Q 10/1095
(Continued)

FOREIGN PATENT DOCUMENTS

CN      110837307 A  *  2/2020  ............ G06T 11/60
KR   10-2021-0054157 A    5/2021
WO   WO-2017096147 A1 *  6/2017  ........... G06F 16/334

OTHER PUBLICATIONS

Galanti et al, Work From Home During the COVID-19 Outbreak The Impact on Employees' Remote Work Productivity, Engagement, and Stress, Journal of Occupational and Environmental Medicine (JOEM) vol. 63, No. 7, Jul. 2021, 7 pages.
(Continued)

*Primary Examiner* — Laurie A Ries
(74) *Attorney, Agent, or Firm* — HAYNES BEFFEL & WOLFELD LLP; Ernest J. Beffel, Jr.

(57) ABSTRACT

The disclosed technology teaches a method for automatically generating a graphical summary of a meeting that provides a reflection of a group's conversation with textual and graphical elements in a tapestry. The method comprises a combination of transcript analysis, selection of graphic symbols detected as relevant to the transcript by statistical analyses, and design of a virtual tapestry involving the graphic symbols using a combination of natural language processing and other machine learning models.

19 Claims, 22 Drawing Sheets
(7 of 22 Drawing Sheet(s) Filed in Color)

(51) Int. Cl.
   *G06F 16/583*   (2019.01)
   *G06F 40/20*    (2020.01)
   *G06F 40/216*   (2020.01)
   *G06F 40/289*   (2020.01)
   *G06T 11/60*    (2006.01)
   *H04L 12/18*    (2006.01)

(52) U.S. Cl.
   CPC ............ *G06F 40/20* (2020.01); *G06F 40/216* (2020.01); *G06F 40/289* (2020.01); *G06T 11/60* (2013.01)

(58) Field of Classification Search
   CPC ........ G06F 40/289; G06F 40/35; G06T 11/60; G06T 11/206
   See application file for complete search history.

(56) References Cited

U.S. PATENT DOCUMENTS

| | | | |
|---|---|---|---|
| 11,599,713 B1* | 3/2023 | Jawale | G06F 40/166 |
| 11,894,941 B1 | 2/2024 | Raheja et al. | |
| 12,222,983 B2* | 2/2025 | Avore | G06F 16/638 |
| 12,249,334 B2* | 3/2025 | Graff | G10L 15/005 |
| 12,361,371 B2* | 7/2025 | Cella | G06Q 10/0637 |
| 2013/0132480 A1 | 5/2013 | Tsuji et al. | |
| 2015/0142800 A1* | 5/2015 | Thapliyal | G06F 16/285 707/737 |
| 2016/0124940 A1 | 5/2016 | Cecchi et al. | |
| 2017/0263265 A1 | 9/2017 | Ashikawa et al. | |
| 2019/0147383 A1* | 5/2019 | Jaroch | G06Q 10/109 705/7.39 |
| 2020/0236069 A1 | 7/2020 | Nowak-Przygodzki et al. | |
| 2020/0349614 A1 | 11/2020 | Batcha et al. | |
| 2021/0342554 A1* | 11/2021 | Martin | G06F 16/355 |
| 2021/0357768 A1 | 11/2021 | Kitada et al. | |
| 2021/0375289 A1 | 12/2021 | Zhu et al. | |
| 2021/0375291 A1 | 12/2021 | Zeng et al. | |
| 2021/0383127 A1* | 12/2021 | Kikin-Gil | G06V 10/811 |
| 2021/0406839 A1* | 12/2021 | Camenares | G10L 17/00 |
| 2022/0027572 A1* | 1/2022 | Biswas | G06F 40/253 |
| 2022/0207489 A1 | 6/2022 | Gupta et al. | |
| 2022/0407900 A1 | 12/2022 | Gawande et al. | |
| 2022/0414338 A1 | 12/2022 | Cho et al. | |
| 2023/0223016 A1* | 7/2023 | Konam | G06F 40/284 704/231 |
| 2023/0245646 A1* | 8/2023 | Parthasarathy | G06F 40/35 704/231 |
| 2023/0394226 A1* | 12/2023 | Medalion | G06F 40/166 |
| 2023/0412414 A1 | 12/2023 | Wang et al. | |
| 2024/0054156 A1 | 2/2024 | Vincent et al. | |

OTHER PUBLICATIONS

Stuckey et al, The Connection Between Art, Healing, and Public Health—A Review of Current Literature, American Journal of Public Health, Feb. 2010, vol. 100, No. 2, 10 pages.
Magsamen—Your Brain on Art—The Case for Neuroaesthetics, Cerebrum, Jul.-Aug 2019, cer-07-19, Jul. 1, 2019, 13 pages.
APA Dictionary of Psychology, American Psychological Association, 5 pages, (download https://dictionary.apa.org/collective-memory).
Standaert et al, How shall we meet? Understanding the importance of meeting mode capabilities for different meeting objectives, Information & Management, vol. 58, Issue 1, Jan. 2021, 103393, (https://doi.org/10.1016/j.im.2020.103393.).
PCT/US2023/035253—International Search Report and Written Opinion dated Feb. 6, 2024, 10 pages.
Anonymous, "Work better together with Mural's visual work platform", Mural, accessed Jan. 4, 2024 via https://mural.co/, 8 pages.
Anonymous, "The Visual Workspace for Innovation", Miro, accessed Jan. 4, 2024 via https://miro.com/whiteboard/, 10 pages.
Armstrong, "Using Tapestries to Document the Collective Mathematical Thinking of Small Groups", The Qualitative Report (2017) 22(6), Article 13, in 22 pages.
PCT/US2023/035253—International Preliminary Report on Patentability dated May 1, 2025, 7 pages.

* cited by examiner

Transcript with Feature Labeling
500

502

522 People receive an immediate visual summary.
It helps them remember what occurred, as well as recall what they were thinking during the
It encourages people to reflect
Pictures help people see the overview gestalt of a conversation.
We get information as well as a feeling about the conversation.
They will remember the main points.
Visuals tap into the nonverbal source of wisdom.

542 The quality of interaction between people contributes to the meaning of the vTapestry, which reflects the coherence of the conversation.
The quality of interaction between people contributes to the meaning of the vTapestry, which reflects the meaning of the conversation.
We have a shared meaning beyond language that is visual and vTapestry activates this intuitive collective understanding.
We have a shared humanity beyond language that is visual and vTapestry activates this intuitive collective
When we tap into our shared basic meaning in a business or work setting, we think of our job in a different way.
When we tap into our shared basic humanity in a business or work setting, we think of our job in a different way.
When we see ourselves as part of a picture, the moment, the conversation, the interaction becomes transcendent.
Humans look for meaning in their lives.
vTapestry helps people see beyond the day to day meaning to the big picture.

562 Engagement translates productivity, retention

Meeting Setup:
A summary of the value of Tapestry: human engagement, productivity.

People receive an immediate visual summary. It helps them remember what occurred, as well as recall what they were thinking during the conversation. It encourages people to reflect. Pictures help people see the overview gestalt of a conversation. We get information as well as a feeling about the conversation. We feel as well as think about what has occurred. Visuals capture and hold our attention. People will be more likely to go back and review the main points. They will remember the nonverbal source of television. Money percent of knowledge is subconscious. The quality of interaction between people contributes to the meaning of the conversation. The subconscious becomes engaged. Visuals tap into the nonverbal source of television. Money percent of knowledge is subconscious. The quality of interaction shared humanity beyond language that is visual and Tapestry activates this intuitive collective understanding. When we tap into our shared basic humanity in a business or work setting, we think of our job in a different way. Important: when companies need to engage people for retention and productivity, the conversation, the moment, the interaction becomes transcendent. Humans look for meaning in their lives. People want to have meaningful work. Tapestry helps people see beyond the day to day conversation to the big picture. Engagement translates productivity, retention.

1322

"The quality of interaction between people contributes to the meaning of the tapestry, which reflects the coherence of the conversation"

Score: 25
- blue ribbon: 1
- 2 faces: 10
- 3 people: 8
- heart: 4
- profile with brain: 7
- heart: 4
- 2 faces: 10

"Tapestry helps people see beyond the day to day conversation to the big picture"

Score: 18
- triskelion: 5
- 3 people: 8
- eye: 3
- calendar/clock: 2
- calendar/clock: 2
- 2 faces: 10
- Muses: 3

1324 tree — VERB
- Occurrences: 2
- Co-occurrences with other symbols: 6 profile with brain — VERB
- Occurrences: 7
- Co-occurrences with other symbols: 17

3 people — NOUN
- Occurrences: 8
- Co-occurrences with other symbols: 21

1342

Slot 1 symbol
Symbol: tree
- Part of speech: VERB
- Occurrences: 2
- Tags: ground
- Phrase: "become"
- Unused phrases: 1
Scope: (None)
Max-size: 0.432

Slot 2 symbol
Symbol: profile with brain
- Part of speech: VERB
- Occurrences: 7
- Tags: sky, abstract, inspiration
- Phrase: "what thinking"
- Unused phrases: 10
Scope: (None)
Max-size: 0.252

Slot 3 symbol
Symbol: 3 people
- Part of speech: NOUN
- Occurrences: 8
- Tags: ground, entity
- Phrase: "to engage people for retention and productivity"
- Unused phrases: 7
Scope: (None)
Max-size: 0.336

Figure 13

ARTIFICIAL INTELLIGENCE MODEL GENERATION OF MEETING TAPESTRIES

PRIORITY

This application claims priority to and the benefit of U.S. Provisional Application No. 63/416,914 titled "Automated Generation of Meeting Tapestries," filed 17 Oct. 2022

RELATED CASES

This application is related to the following contemporaneously filed applications:

U.S. application Ser. No. 18/377,260 titled "Automated Generation of Meeting Tapestries," filed 5 Oct. 2023; and U.S. application Ser. No. 18/377,270 titled "Interactive Generation of Meeting Tapestries," filed 5 Oct. 2023.

The related applications are incorporated by reference herein for all purposes.

FIELD OF THE TECHNOLOGY DISCLOSED

The technology disclosed generally relates to generative artificial intelligence models that begin with language understanding and generation tasks such as those within the domain of natural language processing (NLP), and more specifically to the application of artificial intelligence to the automatic generation of a graphical summary of a transcript that provides a reflection of a conversation with images, key words, sentences, and phrases in a digitally-rendered tapestry.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Online meetings have become increasingly common, particularly due to the COVID-19 pandemic beginning in early 2020, and the trend is likely to continue. Disengagement during online meetings has become a rising issue for organizations. Media Naturalness Theory assumes the human brain evolved for face-to-face communication. According to Media Naturalness Theory, online meetings create an unnatural situation of prolonged eye contact with others and information overload while missing critical aspects of trust-building human social experience, such as body language and synchronicity that allow for spontaneous exchange.

In addition, the discontinuous communication style inherent to remote teamwork often results in a lack of tangible, memorable takeaways from meetings. The practice of graphic recording addresses this dilemma via an art-based solution targeted at increasing engagement and creativity. The practice has been credited with trust-building because it provides an accessible "big picture" summary of a meeting that shows participants' ideas in juxtaposition with each other, as well as a group memory after the meeting.

Studies in the field of neuroaesthetics (the intersection of neurology and the arts) show that art releases neurotransmitters associated with positive emotions. Specifically, landscape and nature scenes have been identified as having a positive effect on the parasympathetic nervous system, lowering stress. Online meeting tools for collaboration typically focus on text alone, such as outline summaries. In contrast, the use of a graphical summary produces art that enhances well-being as a framework for content, supported by neuroaesthetics research. In addition to building collective memory, art also promotes health and well-being for team members.

An opportunity arises for an art-based online meeting tool that summarizes the conversation, humanizes the meeting process with nonverbal communication, captures the key themes of a meeting, and invites engagement and creative exploration from team members. Accordingly, an opportunity also arises to leverage algorithmic layout methods that combine artificial intelligence models such as NLP with graphic reporting to automatically generate a graphical summary of a meeting that provides a reflection of a group's conversation with key phrases in a tapestry.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The color drawings also may be available in PAIR via the Supplemental Content tab.

Figure 1:
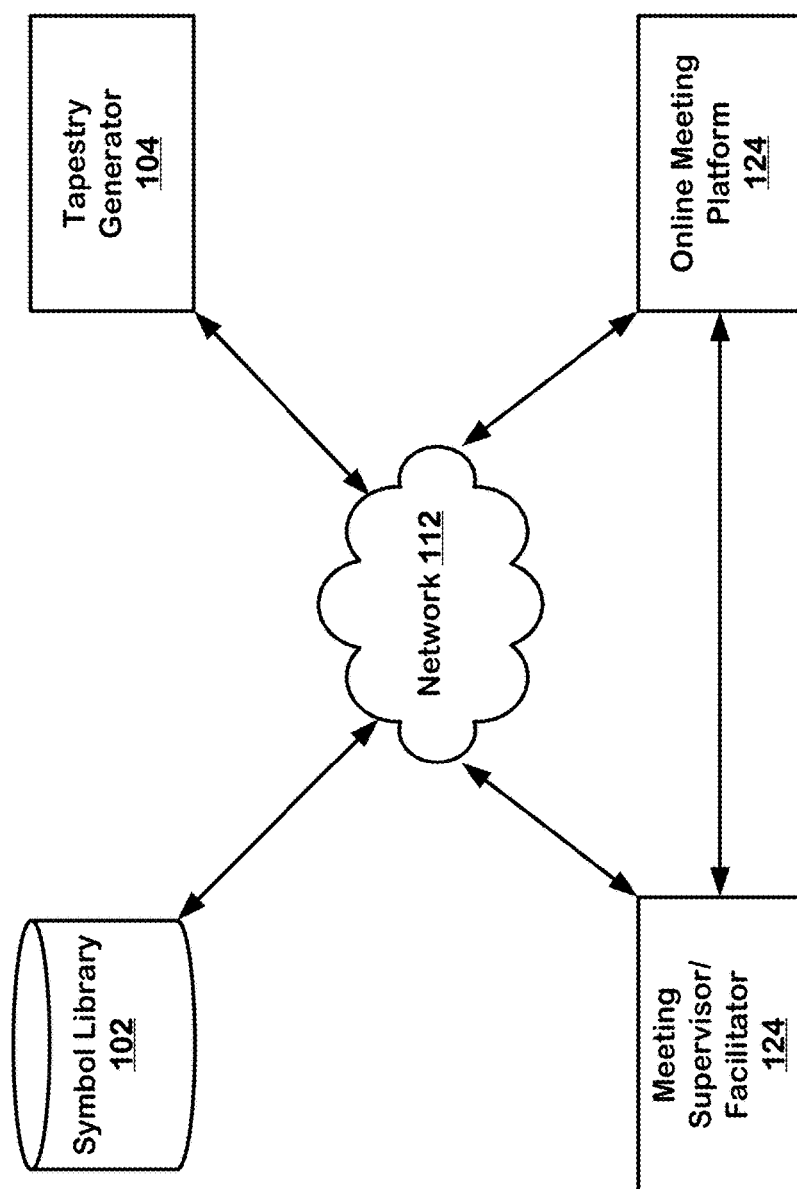

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 1 illustrates an architectural level schematic of a system for automatically generating a graphical summary of a meeting that provides a reflection of a group's conversation in a tapestry, in an example of the technology disclosed.

Figure 2A:
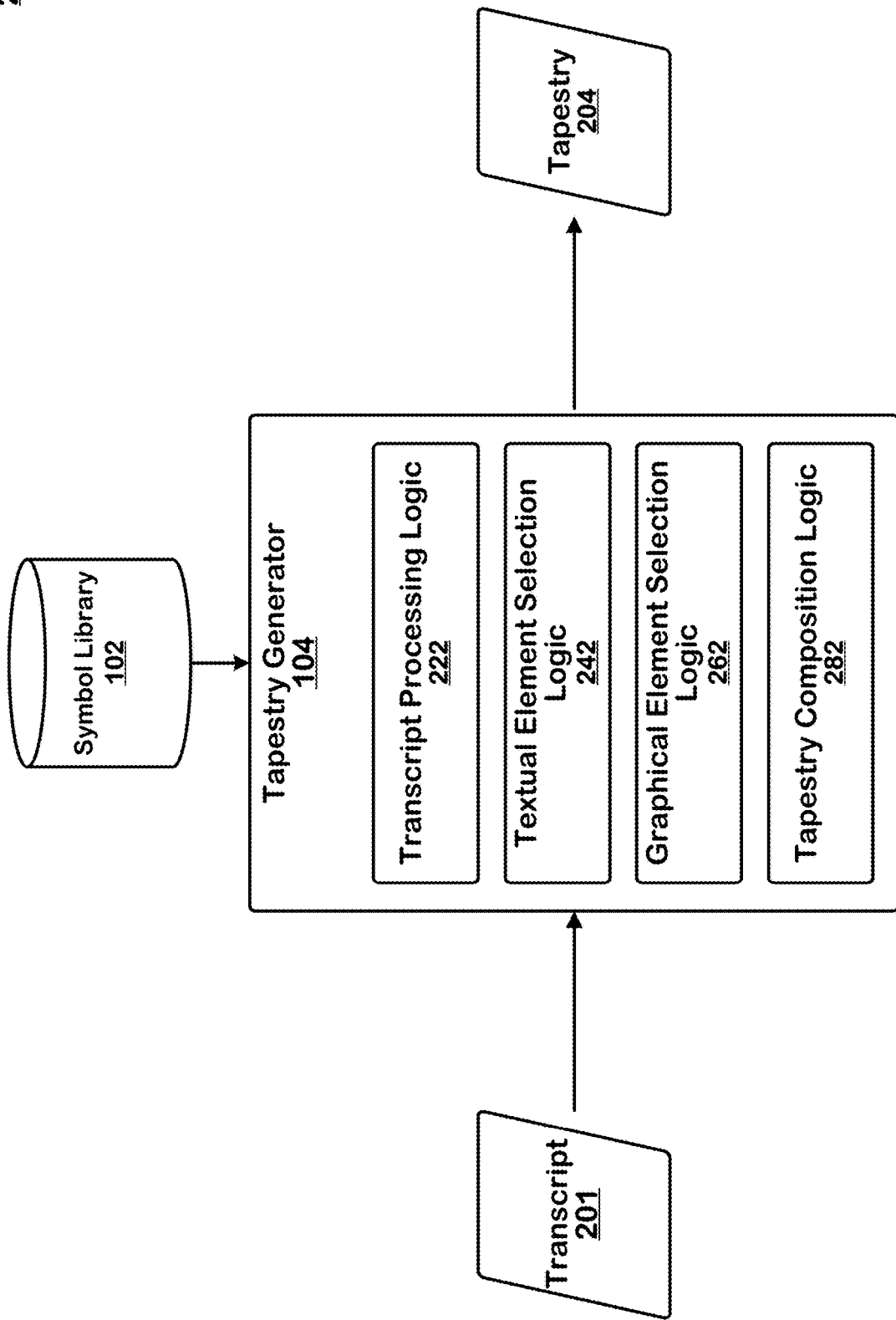

FIG. 2A shows a block diagram for generating a tapestry from a pre-defined template, in an example of the technology disclosed.

Figure 2B:
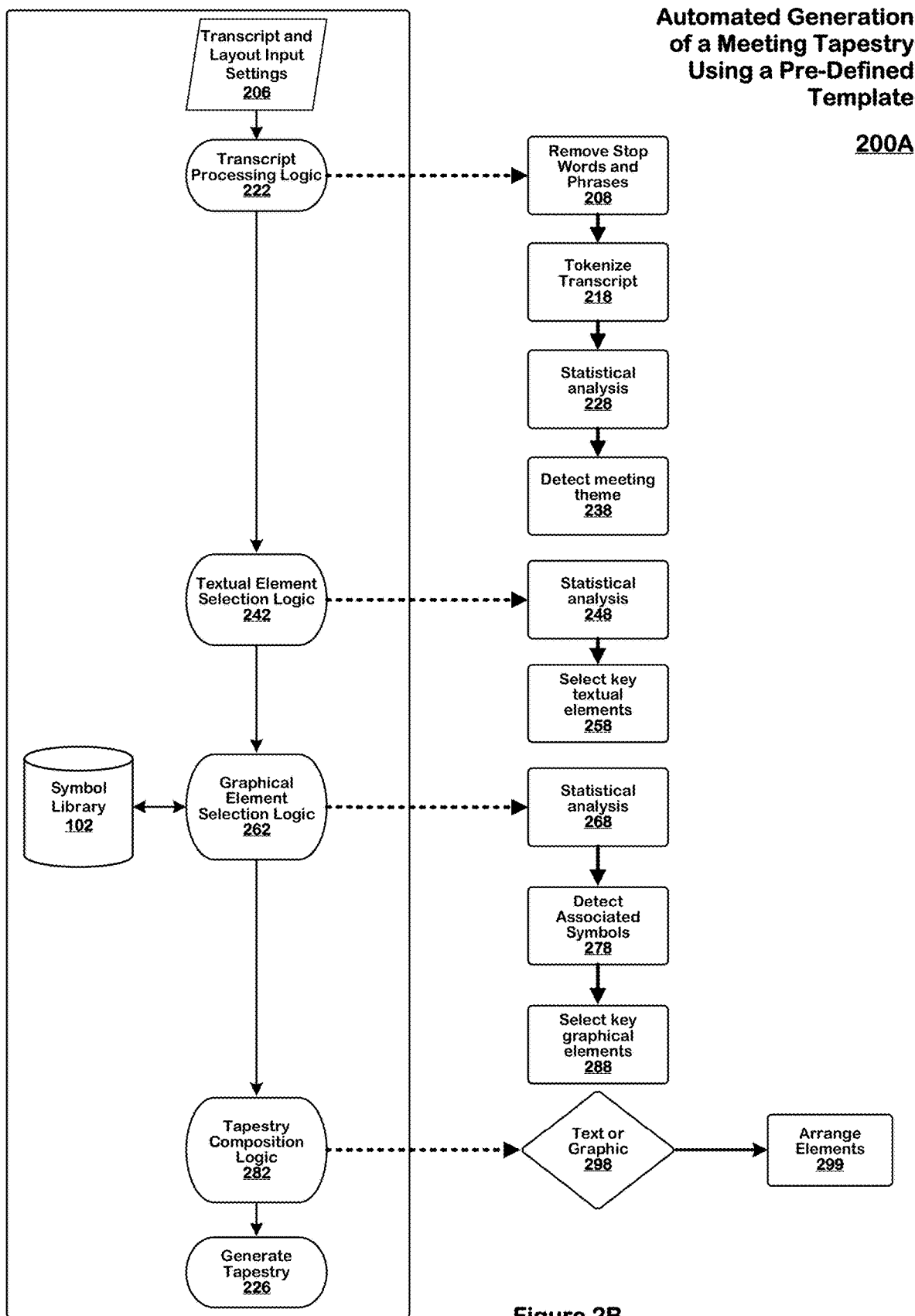

FIG. 2B shows a schematic flow diagram for a method of generating a tapestry from a pre-defined template, in an example of the technology disclosed.

Figure 3:
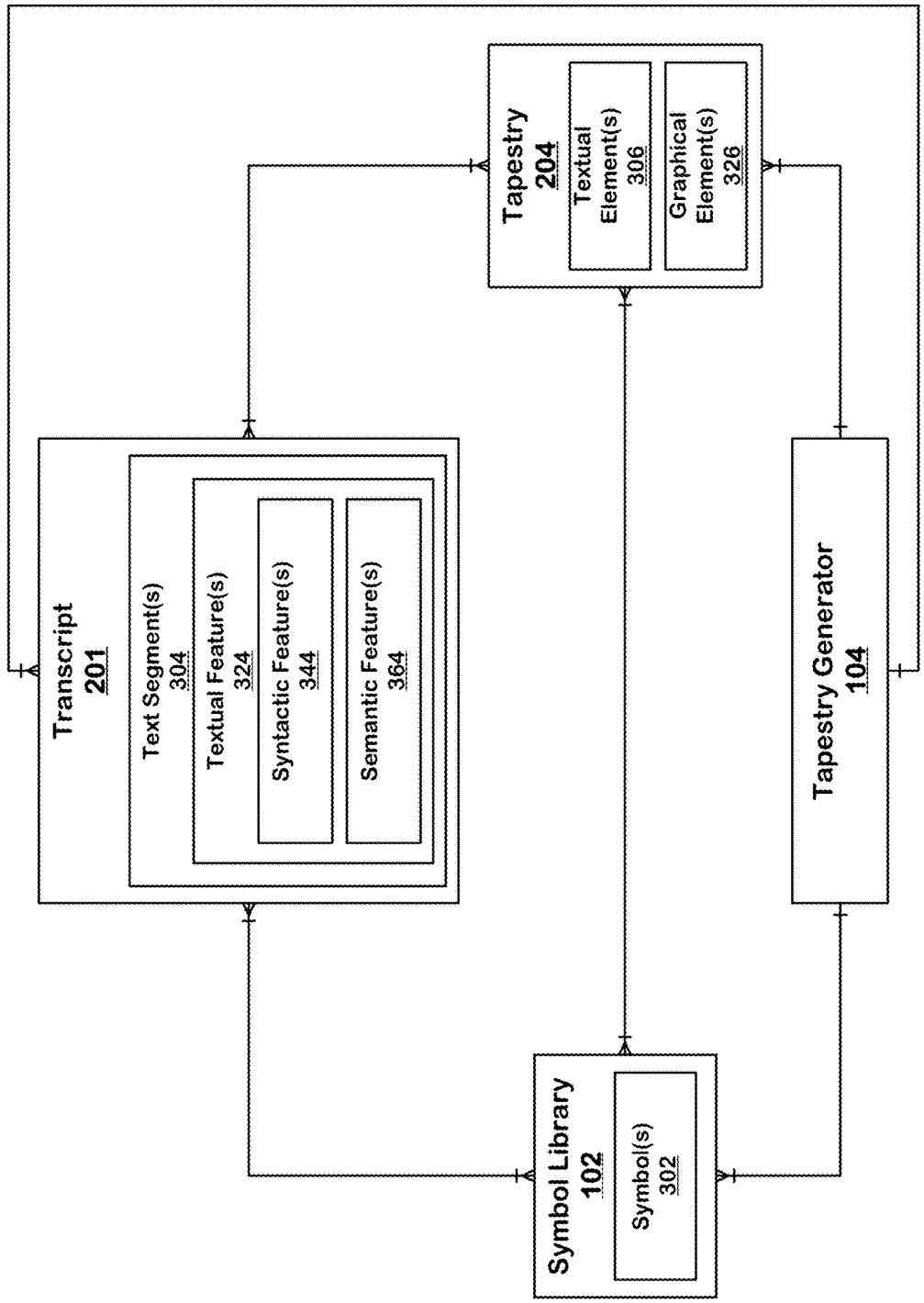

FIG. 3 is an entity-relationship diagram comprising a plurality of elements involved in generating a tapestry, within accordance with some implementations of the disclosed technology.

Figure 4:
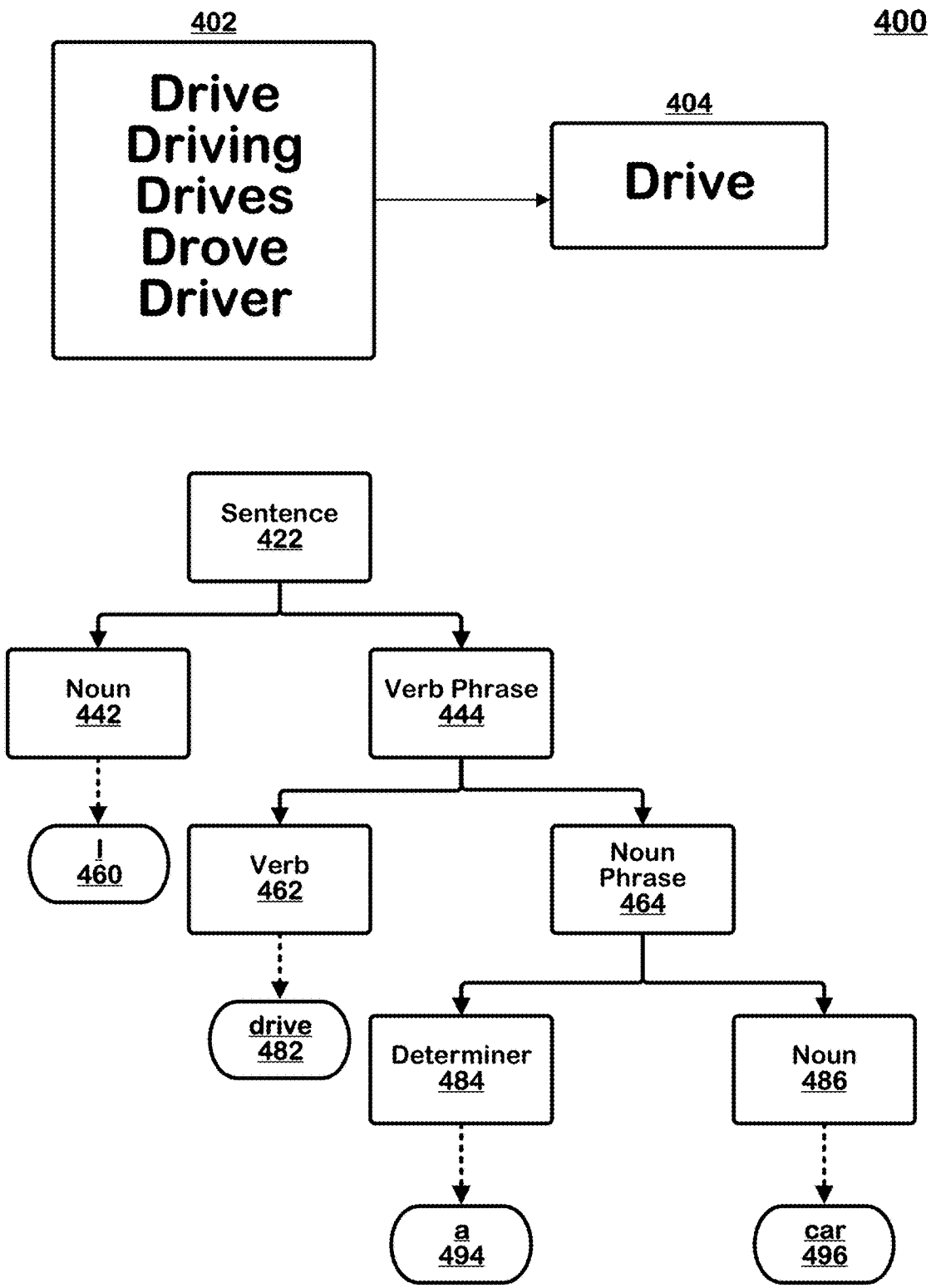

FIG. 4 illustrates a word lemmatization and a related dependency tree.

Figure 6:
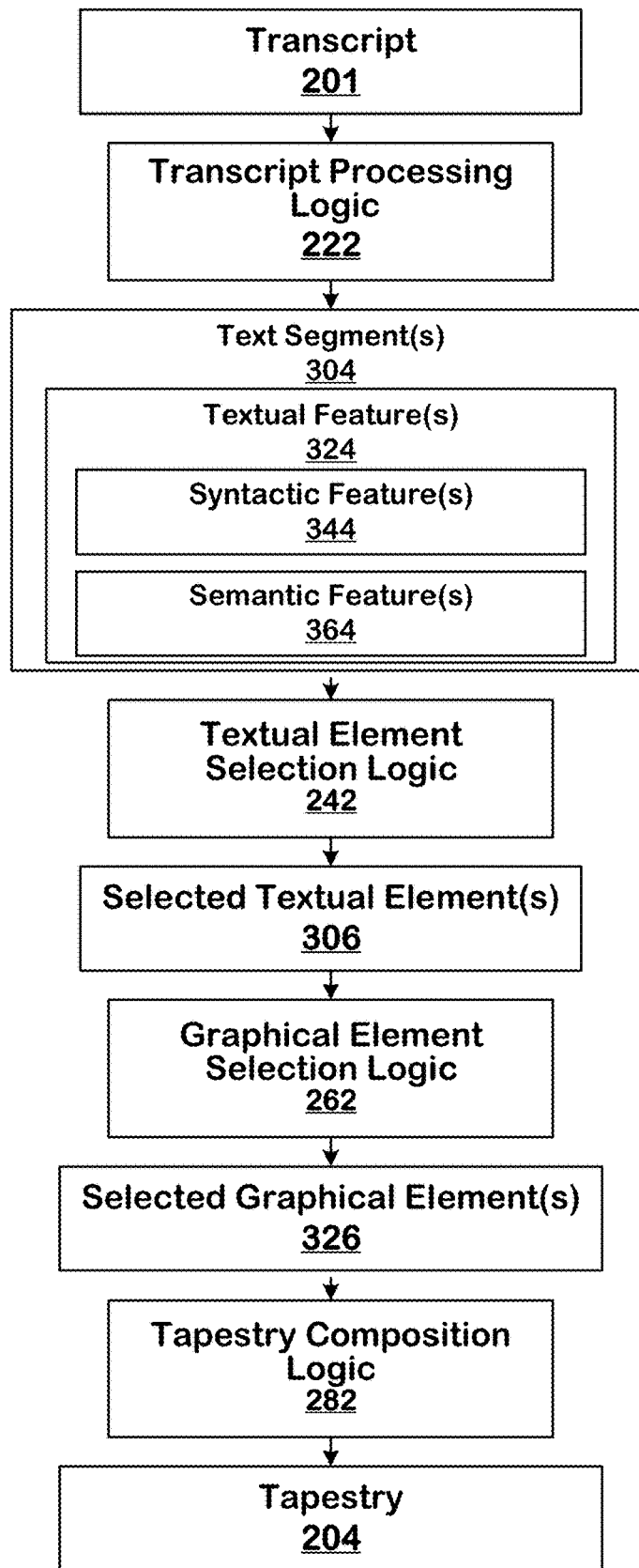

FIG. 5 shows an example natural language processing model output comprising an annotated transcript, wherein the annotations correspond to features of the transcript FIG. 6 shows an architectural level schematic of a tapestry generator model, within accordance with one implementation of the technology disclosed.

Figure 7B:
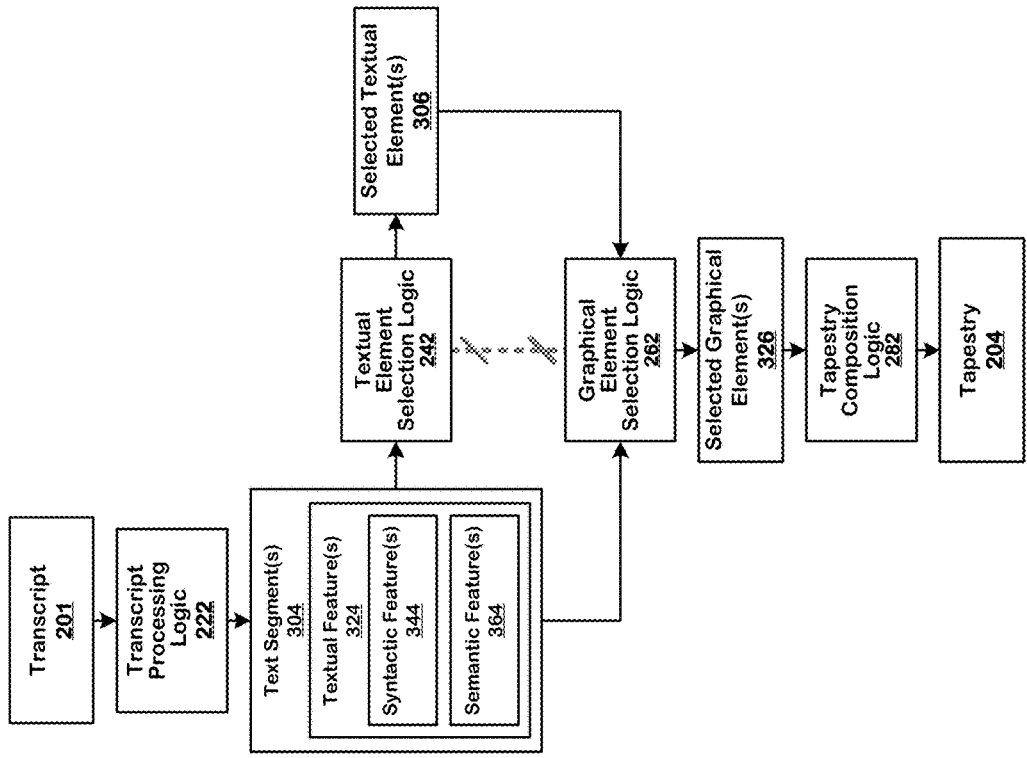
Figure 7A:
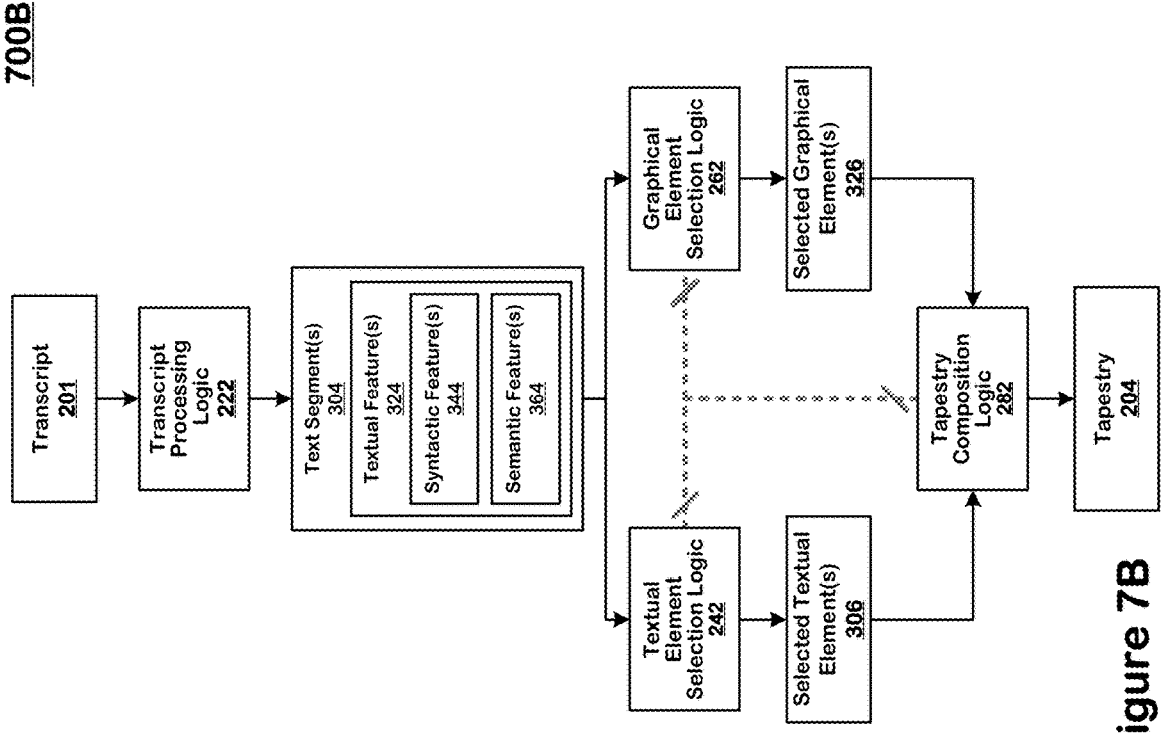

FIG. 7A shows an architectural level schematic of a tapestry generator model configured to generate a tapestry from a pre-defined template, within accordance with one implementation of the technology disclosed.

FIG. 7B shows an architectural level schematic of a tapestry generator model configured to generate a tapestry from a pre-defined template, within accordance with another implementation of the technology disclosed.

Figure 8:
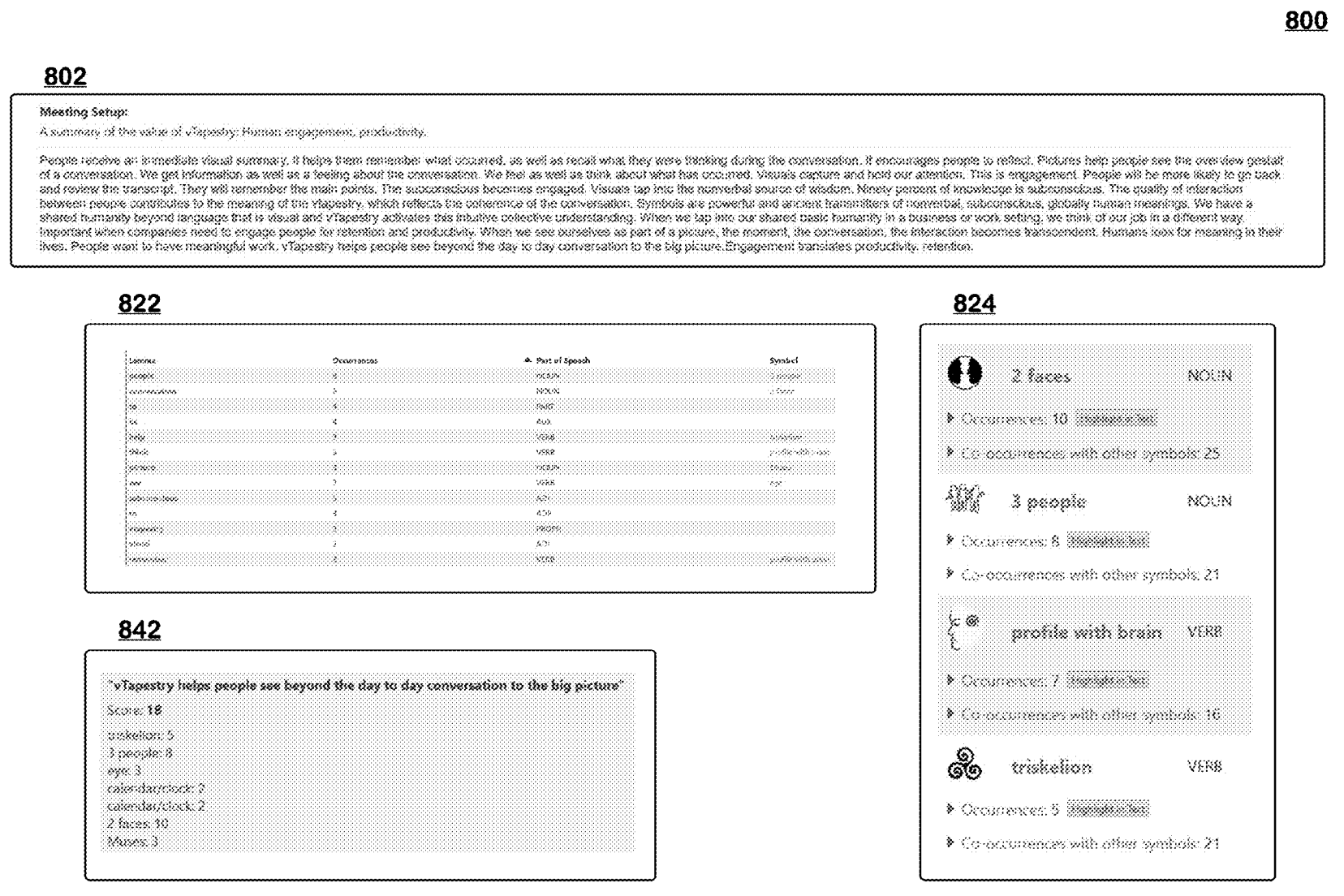

FIG. 8 shows a first plurality of example outputs obtained from various elements of the tapestry generator model.

Figure 9:
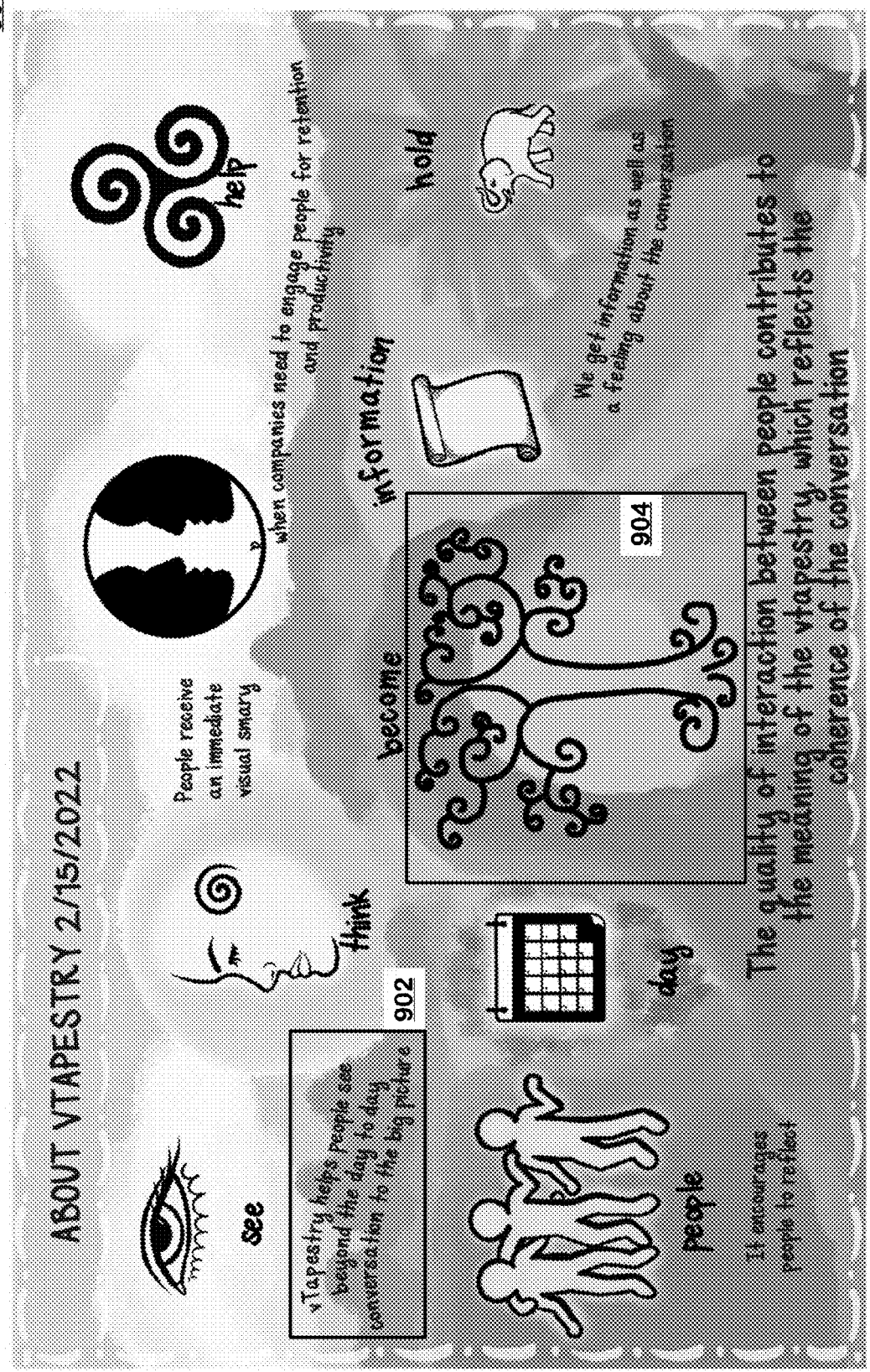

FIG. 9 shows a tapestry generated from a pre-defined template.

Figure 10A:
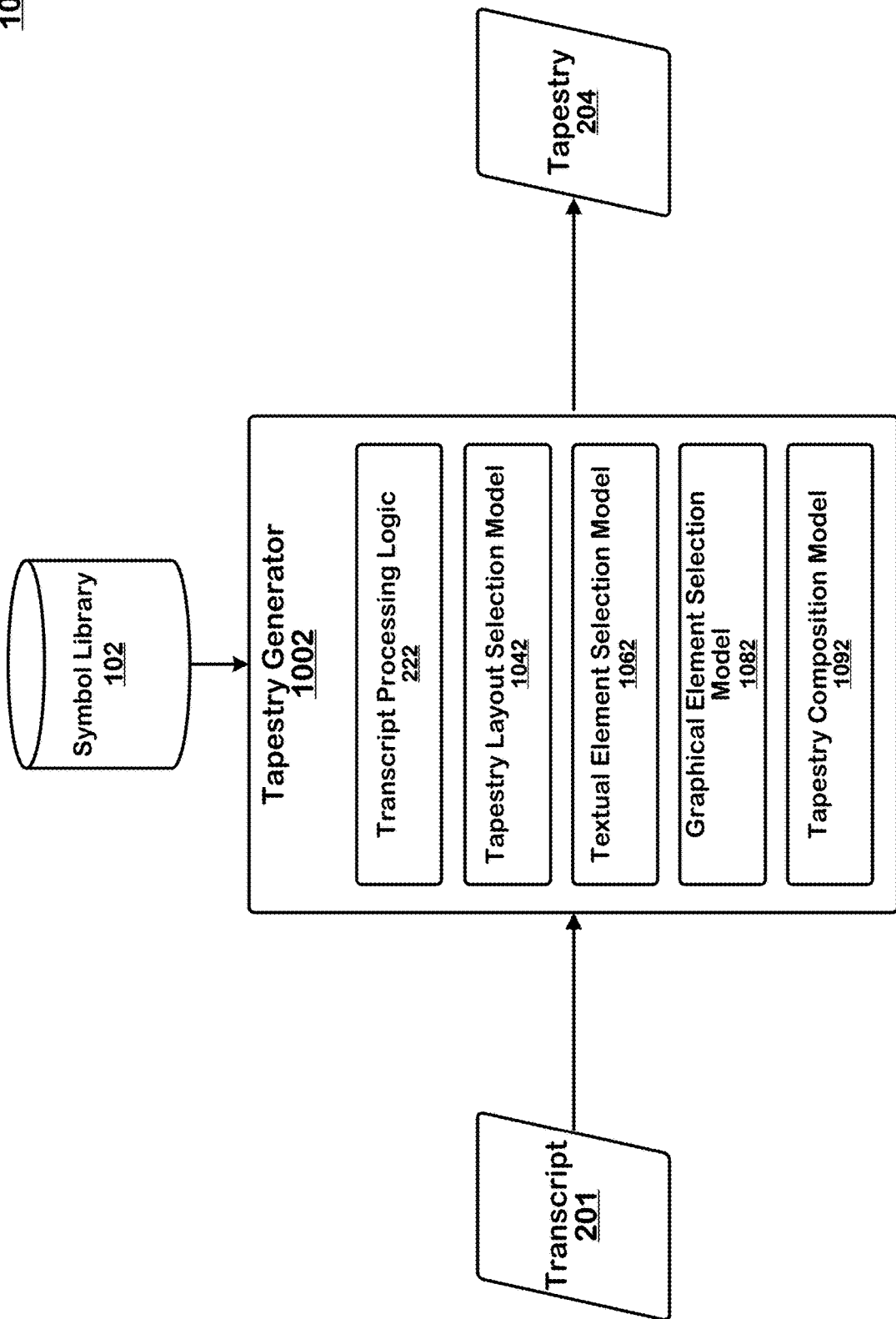

FIG. 10A shows a block diagram for generating a tapestry from an algorithm-generated layout, in an example of the technology disclosed.

Figure 10B:
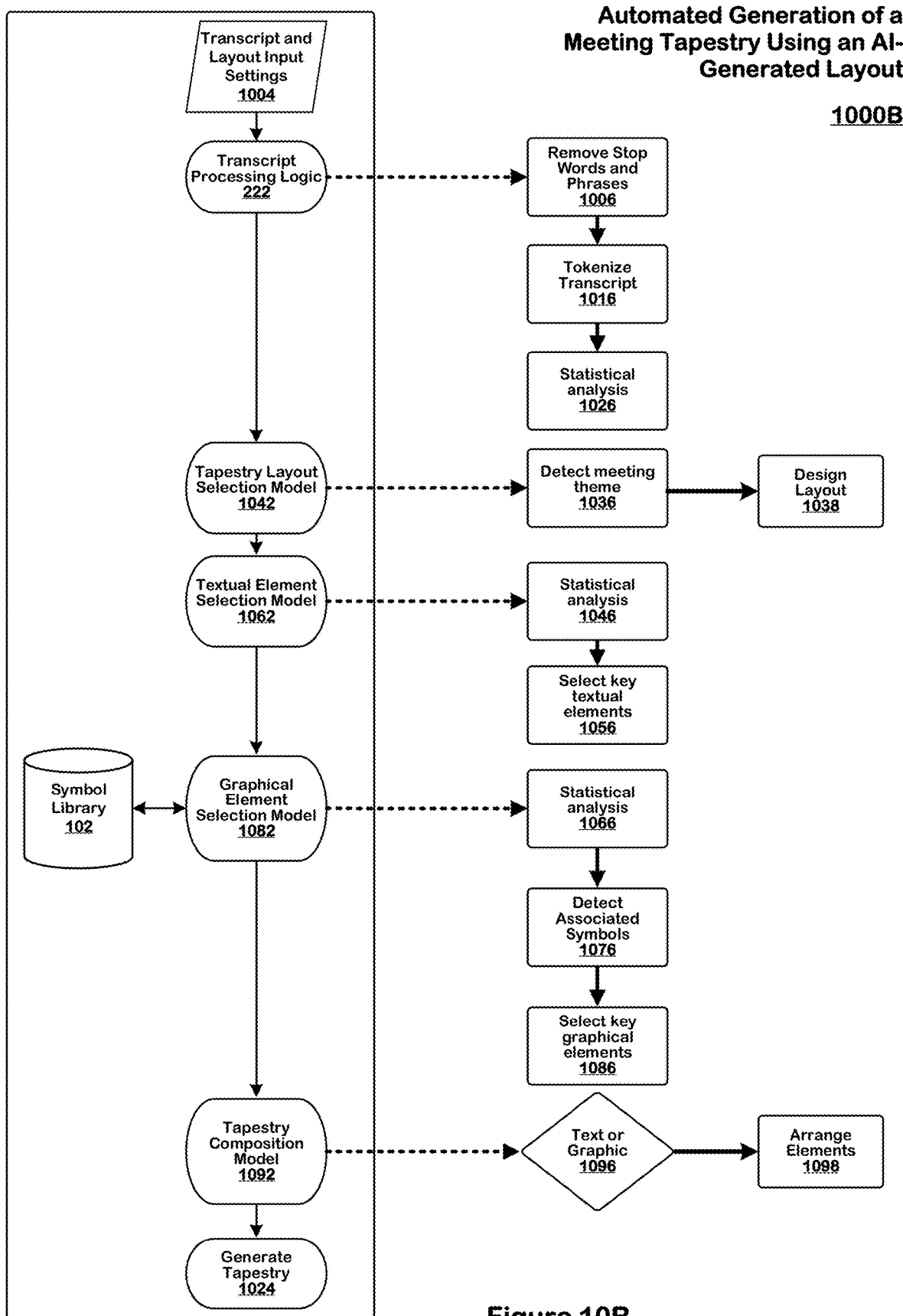

FIG. 10B shows a schematic flow diagram for a method of generating a tapestry from an algorithm-generated layout, in an example of the technology disclosed.

Figure 11:
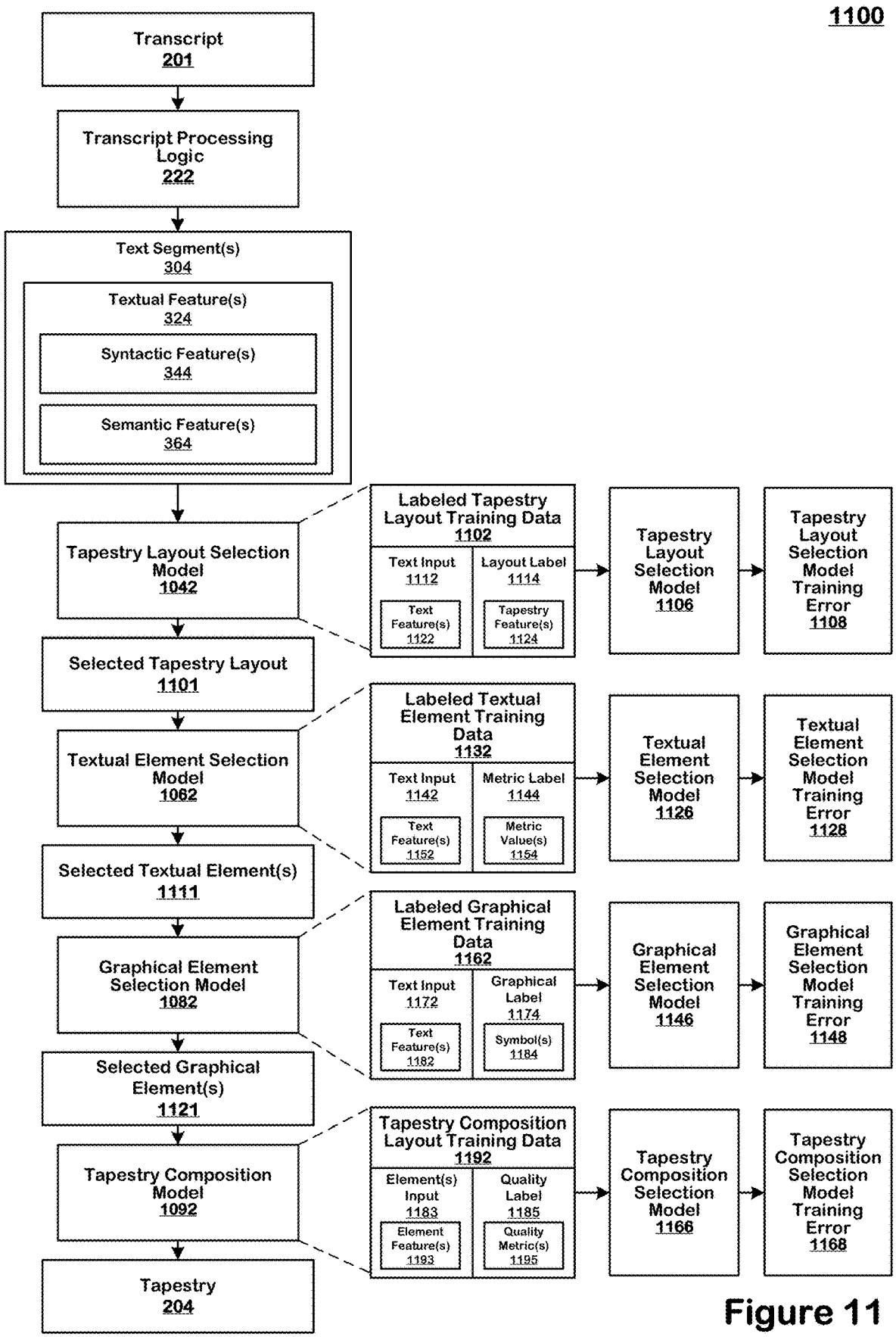

FIG. 11 shows a block diagram for training elements of the tapestry generator model, in an example of the technology disclosed.

Figures 12A, 12B:
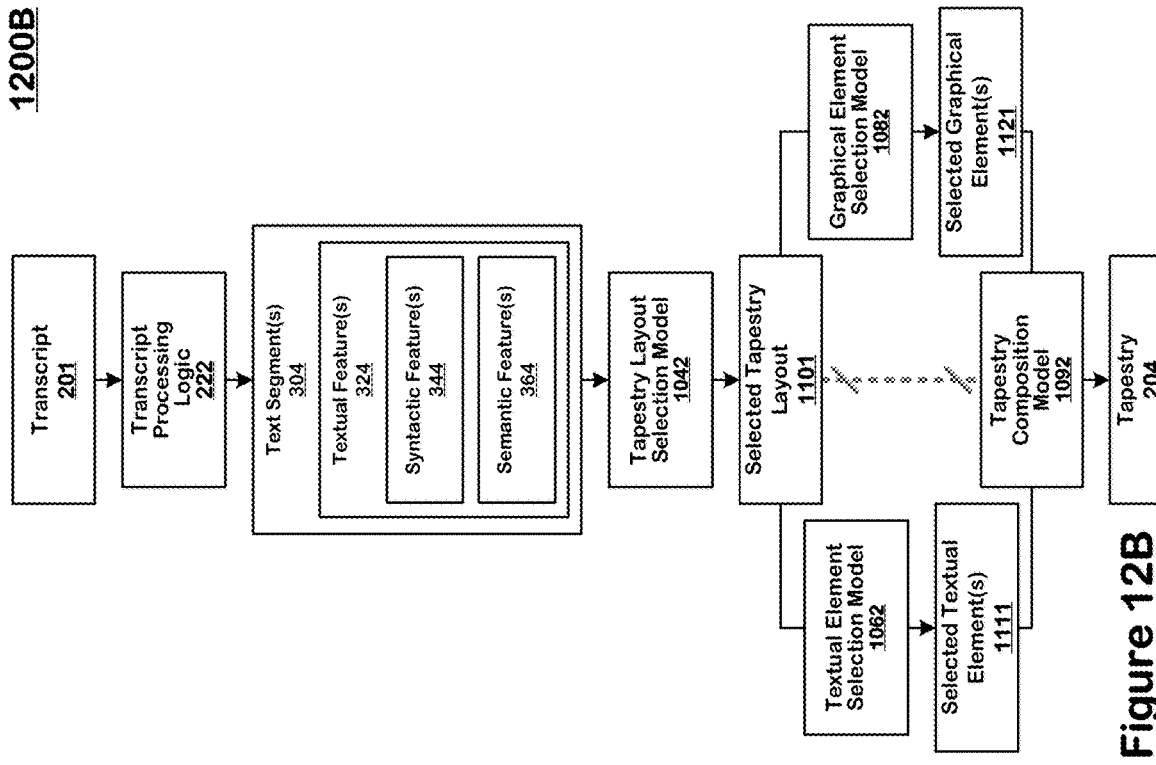

FIG. 12A shows an architectural level schematic of a tapestry generator model configured to generate a tapestry from an algorithm-generated layout, within accordance with one implementation of the technology disclosed.

FIG. 12B shows an architectural level schematic of a tapestry generator model configured to generate a tapestry from an algorithm-generated layout, within accordance with another implementation of the technology disclosed.

FIG. 13 shows a second plurality of example outputs obtained from various elements of the tapestry generator model.

Figure 14:
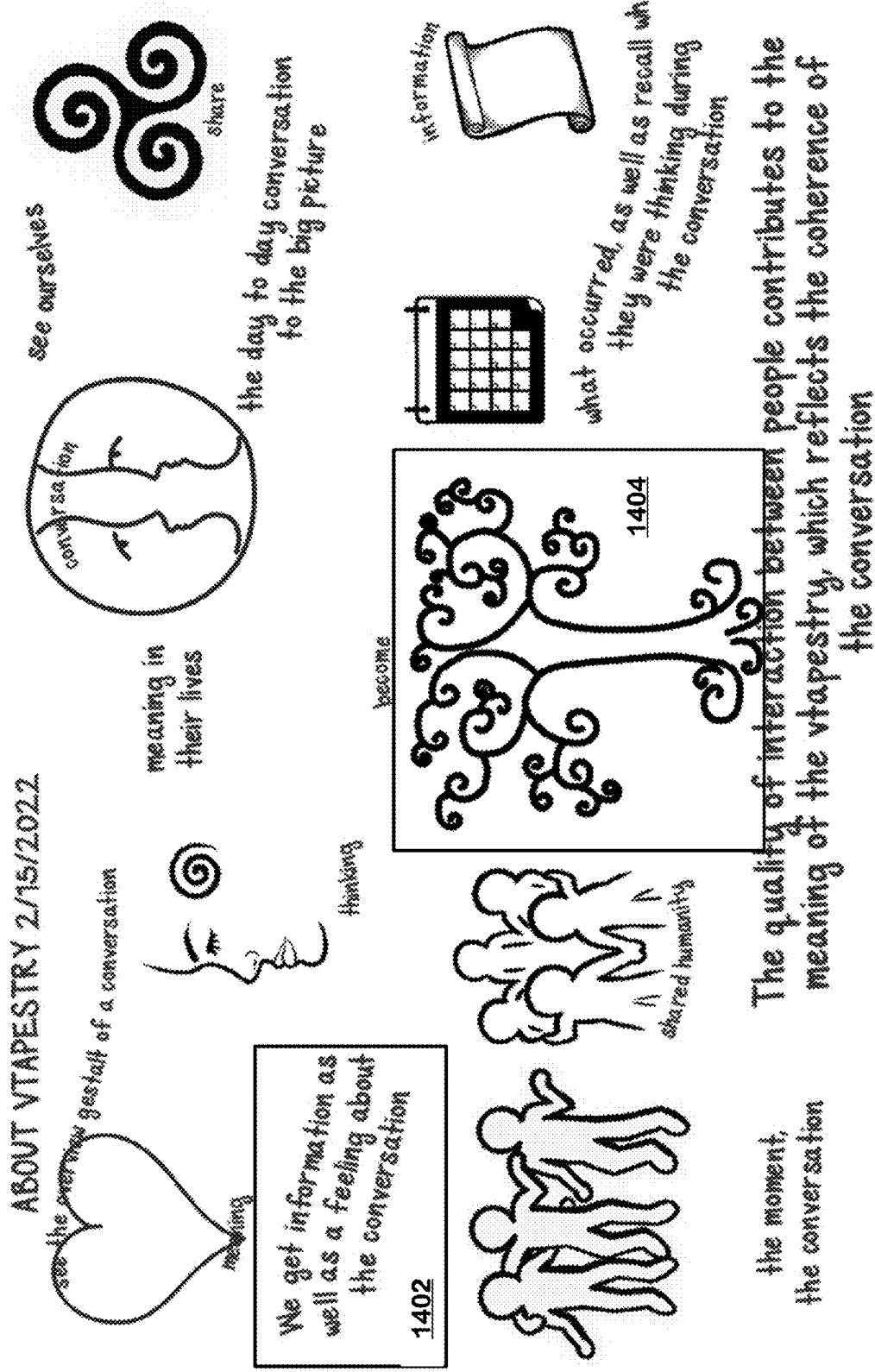

FIG. 14 shows a tapestry generated from an algorithm-generated layout.

Figure 15A:
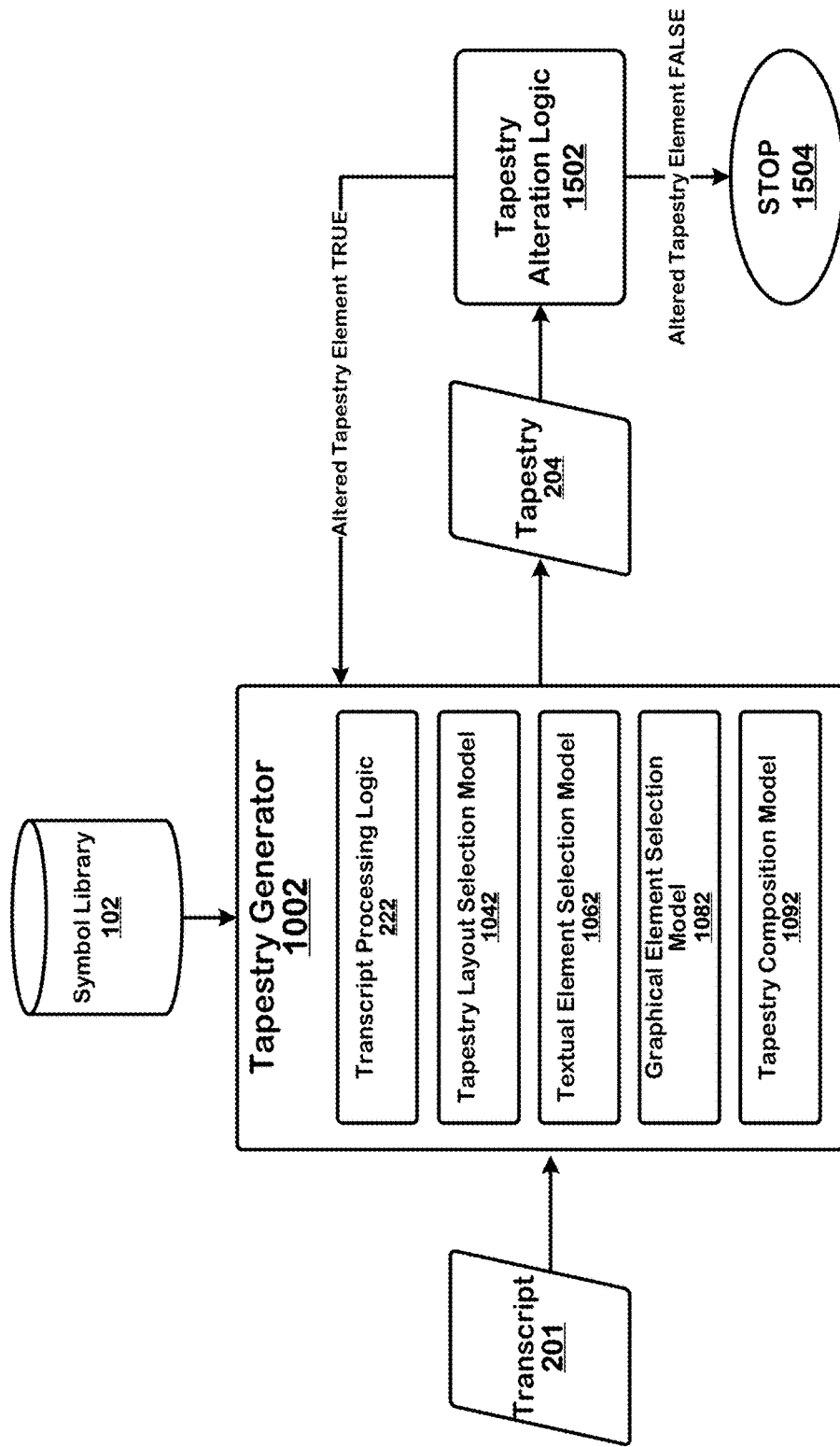

FIG. 15A shows a block diagram for interactively generating a tapestry, in an example of the technology disclosed.

Figure 15B:
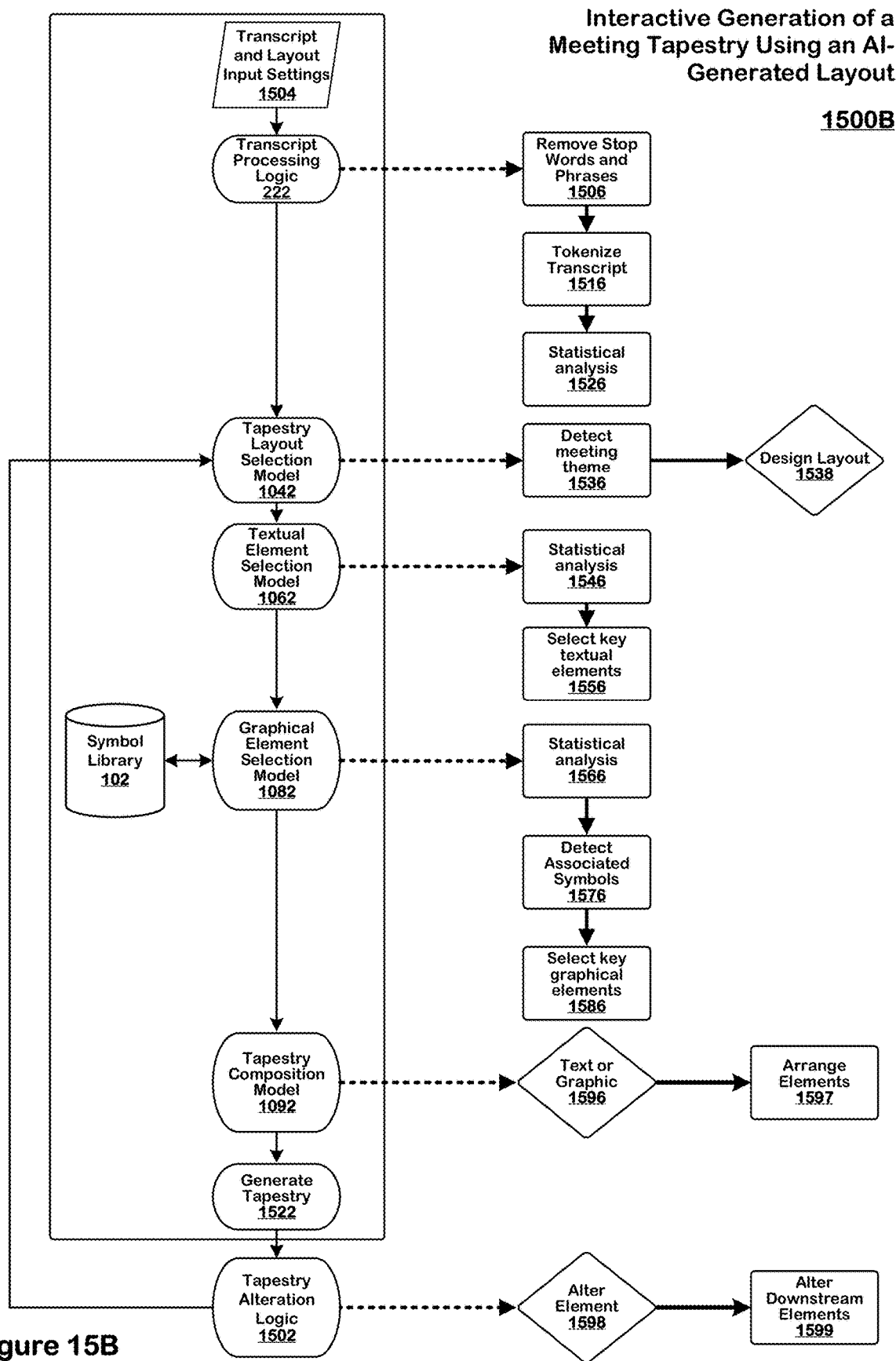

FIG. 15B shows a schematic flow diagram for interactively generating a tapestry, in an example of the technology disclosed.

Figure 16B:
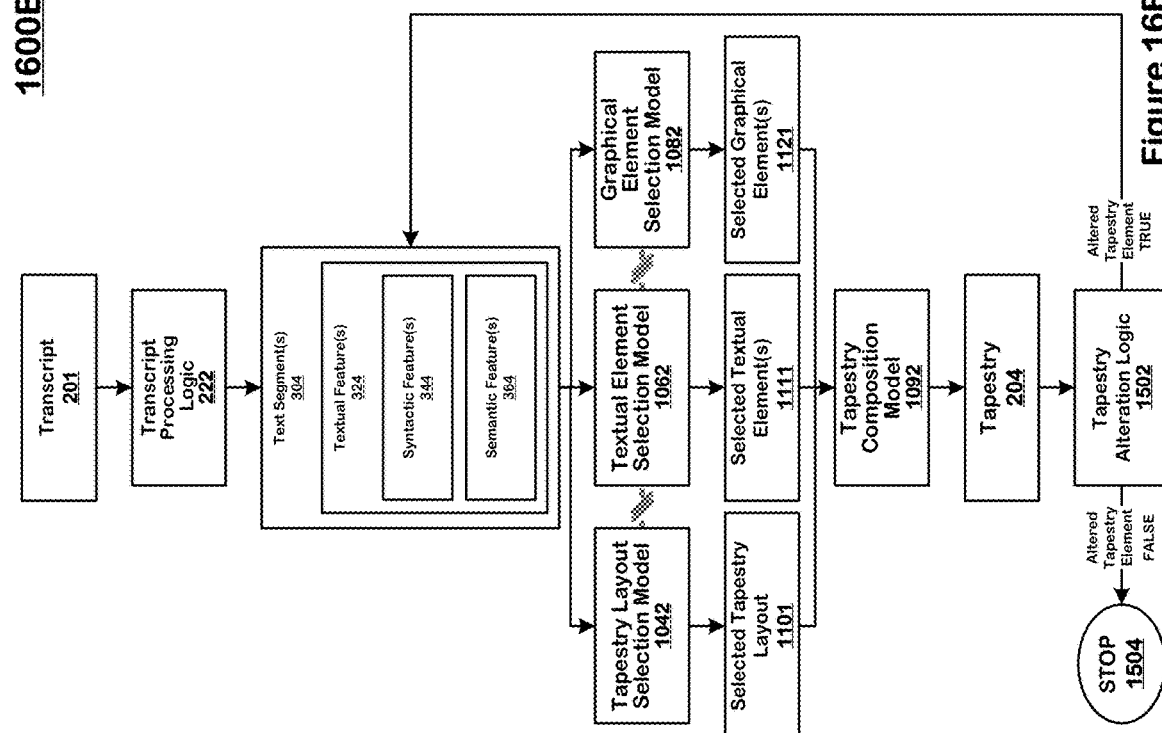
Figure 16A:
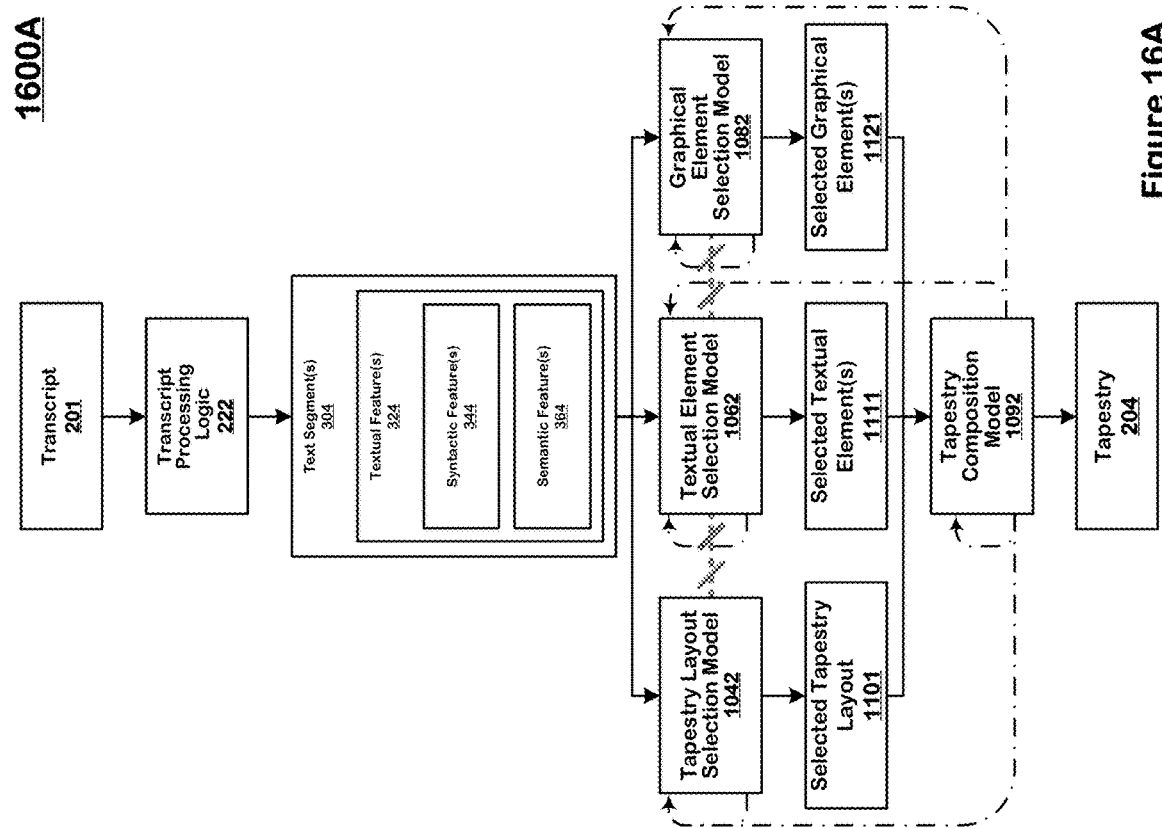

FIG. 16A shows an architectural level schematic of a tapestry generator model configured to interactively generate a tapestry, within accordance with one implementation of the technology disclosed.

FIG. 16B shows an architectural level schematic of a tapestry generator model configured to interactively generate a tapestry, within accordance with another implementation of the technology disclosed.

Figure 17A:
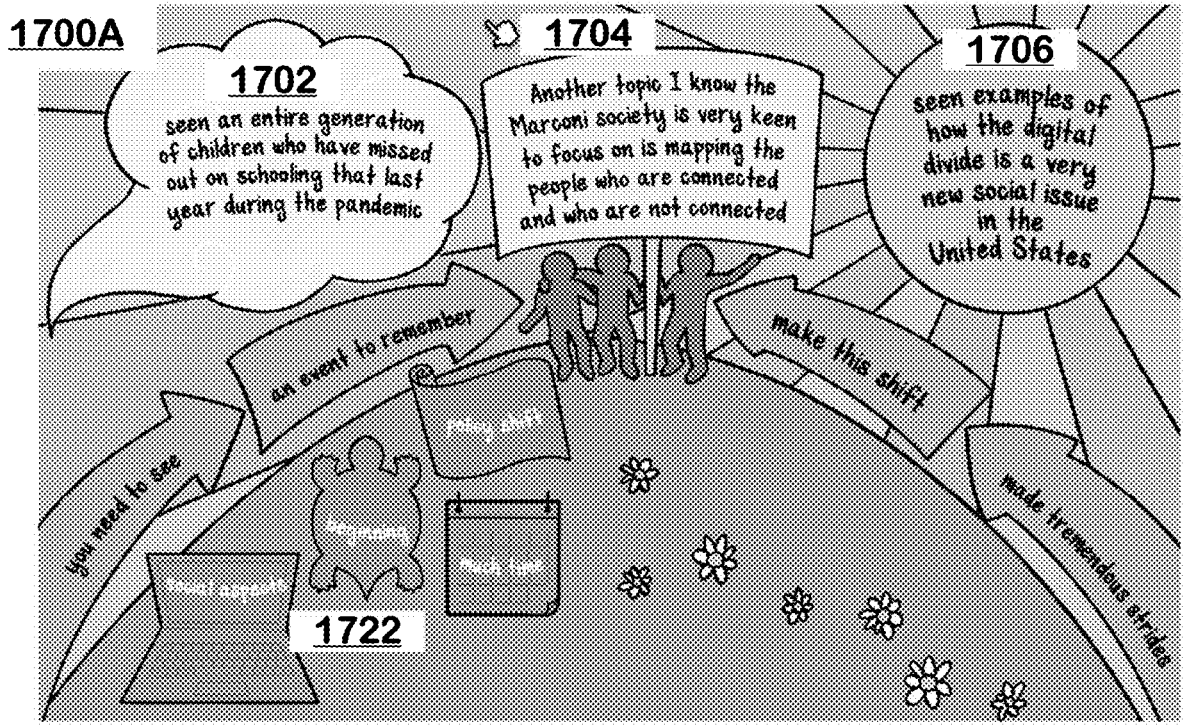

FIG. 17A shows a draft tapestry within a graphical user interface with options for interaction with the tapestry.

Figure 17B:
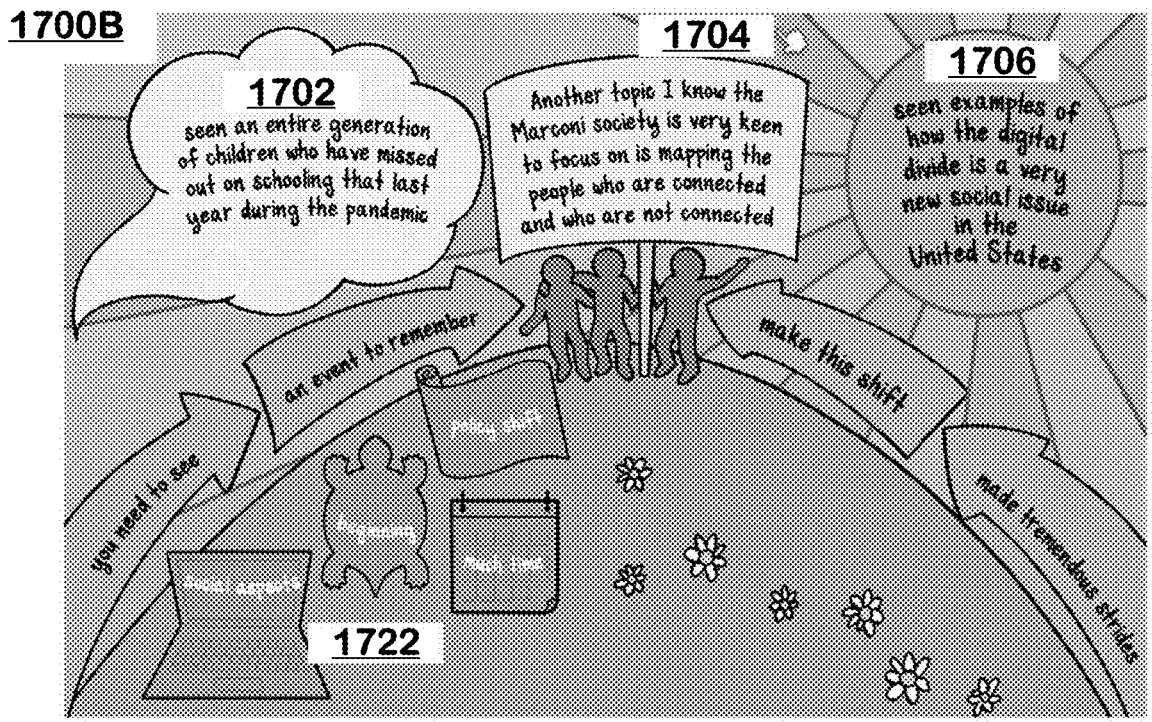

FIG. 17B shows a draft tapestry within a graphical user interface with options for interaction with the tapestry, wherein a magic hand cursor is employed by a user to alter a particular tapestry element.

Figure 17C:
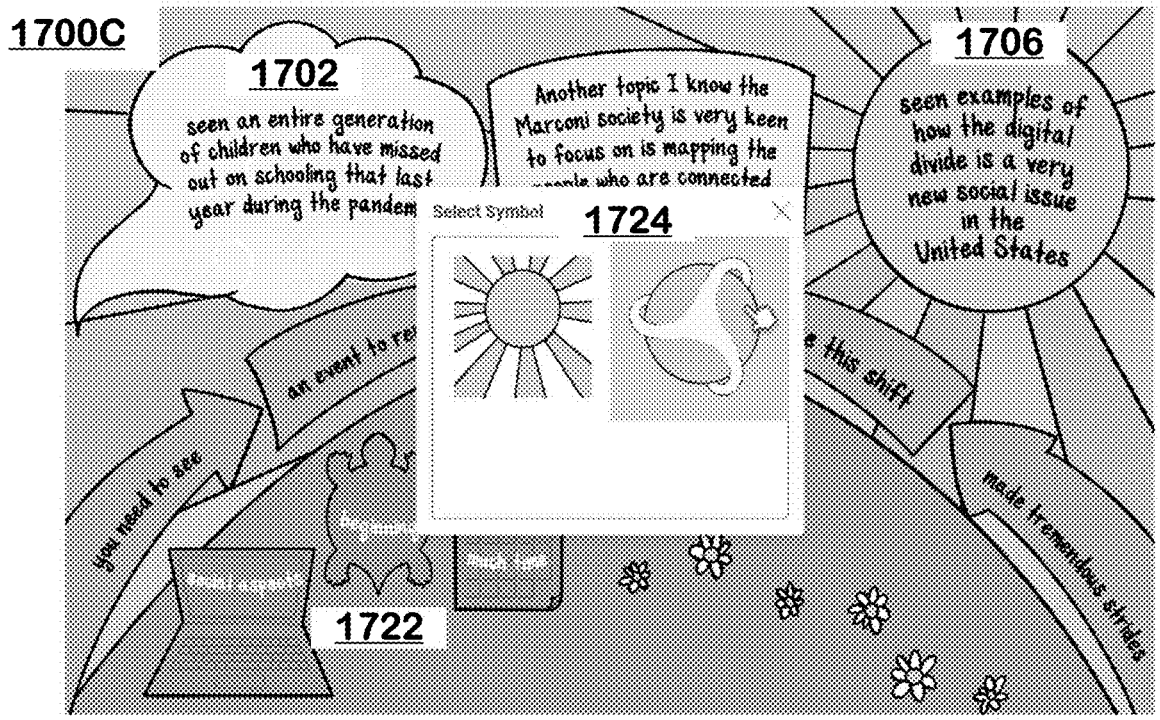

FIG. 17C shows a draft tapestry within a graphical user interface with options for interaction with the tapestry, wherein alternative options for the particular tapestry element are presented towards the user.

Figure 17D:
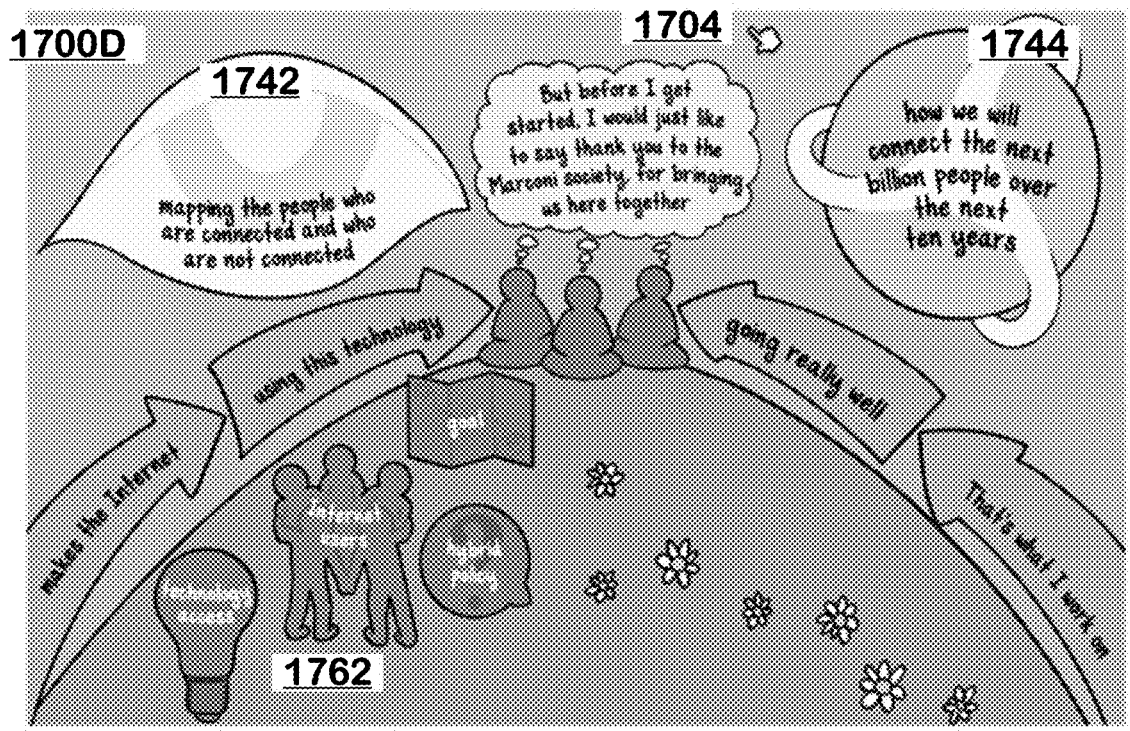

FIG. 17D shows an altered tapestry within a graphical user interface, wherein the alteration of one tapestry element has resulted in a plurality of downstream alterations.

Figure 18:
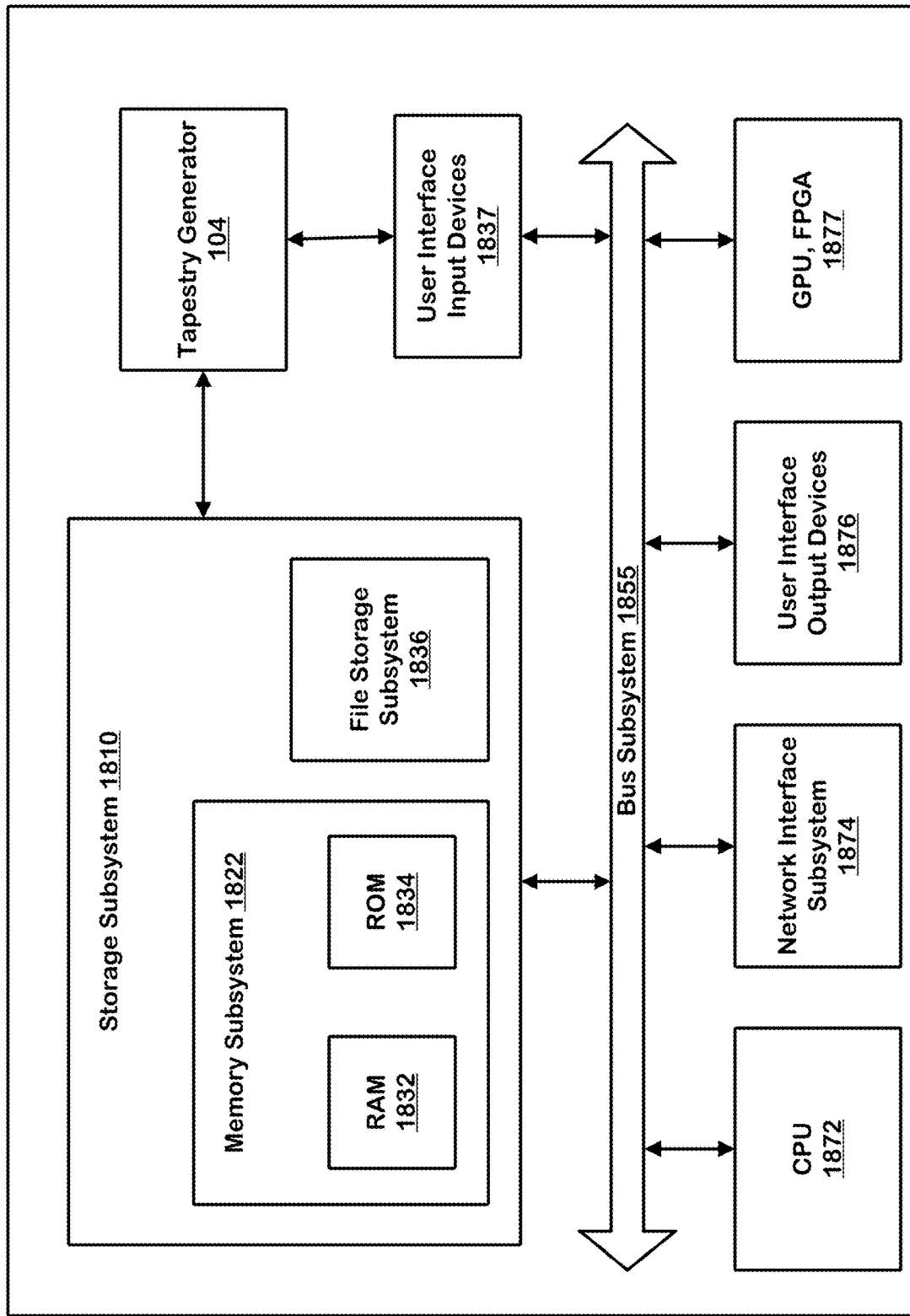

FIG. 18 is a simplified block diagram of a computer system that can be used for generating a graphical summary of a meeting that provides a reflection of a group's conversation in a tapestry, within accordance with an implementation of the disclosed technology.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The National Institute of Health reports that, in the absence of face-to-face interactions, workers experience a feeling of social isolation that negatively impacts productivity. The COVID-19 pandemic, followed by a change in work patterns, shifted many interactions from face-to-face to online. This created a need for online tools that build trust and create psychological relief, as well as tools that provide a tangible takeaway from the meeting. Engagement with online artistic tools, either as an observer or initiator, can enhance moods, emotions, and psychological states, according to the National Institute of Health.

The technology disclosed comprises an art-based online meeting tool that summarizes the conversation, humanizes the meeting process with nonverbal communication, captures not just the content but the sentiment of a meeting, and invites engagement.

The disclosed automated art-based summary of online meetings can provide a reflection of a group's conversation with key words, phrases, and sentences in a visual tableau. An artistic summary tool can be built into a meeting platform. It can be used incrementally in real-time to reveal the summary as the meeting progresses or be used against the entire meeting content to produce a summary of the complete meeting. It transforms the transcript of an online meeting, which can be generated as the meeting progresses, into a digital visual summary without requiring a skilled artist/moderator to graphicly record the meeting. A meeting organizer or secretary can use the disclosed tool to display a visual summary at any point in the meeting when a reflective moment is desired to facilitate participant engagement. Participants also can receive a copy of the visual summary as a takeaway from the meeting or at the beginning of a next, follow-up meeting.

The visual summary disclosed can use symbols and visual metaphors from nature, ancient culture, communication, technology, and otherwise to provide a shared context for information. The metaphors promote collective memory. This kind of shared mental representation promotes attunement between members of a group, according to the American Psychological Association. While much of the imagery for nouns is commonplace in the digital era—for example, a laptop representing technology—some symbols are ancient, cross-cultural images representing a collection of verbs that capture emotions and behaviors. Other symbols may be abstract, representing semantic relationships as to how a particular word or phrase interacts with other words, phrases, symbols, or additional contextual information. Archetypal symbols evoke imagination and creative approaches to problem-solving, according to the founder of analytical psychology, Dr. Carl G. Jung.

The disclosed tapestry generator produces an automated visual summary, including art that builds on neuropsychological research as a framework for content. In addition to building collective memory, art also promotes health and well-being for individuals. Studies in the field of neuroaesthetics—at the intersection of brain science and the arts—show that art releases brain chemicals that trigger positive emotions, according to the National Institute of Health. Scenes from nature have a positive effect on the parasympathetic nervous system, providing stress relief.

Applying the disclosed method, the use of evocative symbols adds to the aesthetic impact of the disclosed technology and functions in the algorithm for selecting key phrases, which appear in the visual summary next to the symbols. A method for selecting symbols is based on a plurality of statistical analyses on textual elements extracted from the transcript, such as the frequency of words associated with the selected symbols appearing in the transcript. The word-symbol associations are based on a proprietary symbol library developed through research into the history and psychology of symbology and graphic recording. The selected symbols function to prioritize and extract key elements of a summarization, using the proprietary ontology established by the symbol library. The symbol algorithm identifies phrases that characterize the nature of the conversation and the dispositions of the participants as well as the dominant topics.

The disclosed method can apply customizable tapestry composition strategies for the creation of novel tapestry templates, tapestry-prompted synthesized symbols, and user-driven alteration of rendered tapestries. The resulting tapestry generation features allow for customizable tapestries that are robust to the specific needs of a particular enterprise, meeting, or target goal of tapestry generation.

In some implementations, the disclosed tapestry generator leverages a tapestry template associated with one or more template rules. A template rule may guide the theme of the tapestry, the selected textual elements within the tapestry, the selected graphical elements within the tapestry, the arrangement of tapestry elements within the tapestry, and/or an analysis to be completed as part of the tapestry generation process. In one embodiment, the user selects a template to be used for tapestry generation. In another embodiment, the template is selected in response to one or more statistical analyses.

The technology disclosed solves the technical problem of automatically generating a graphical summary of a meeting that provides a reflection of a group's conversation with key phrases in a tapestry without the need of a skilled artist/moderator to graphicly record the meeting.

The summarization technology may comprise extractive text generation, such as the output of a summary constructed predominately from text segments extracted directly from a transcript, or abstractive text generation, such as the output of a summary that is generated in response to the processing of the transcript but need not necessarily use verbatim language from the transcript. Abstractive text generation processes can leverage a deeper understanding of the processed content to create summaries with related, non-verbatim language that may be more concise, evocative, or include more semantic analyses. As a simple representative example, consider the following conversational snippet from a transcript to be summarized: "[MATT AMATICS]: I am glad we changed strategies to a more analytical approach; [AL GORITHM]: I agree. I think this aligns more closely with our goals." A generative summary that was constructed primarily using extractive language understanding technology may read "Matt A. is glad we changed strategies to a more analytical approach. Al G. agrees and thinks this aligns more closely with our goals." while a generative summary that was constructed primarily using abstractive language understanding technology may read "Participants in the session expressed a positive view of the strategy change and believe an analytical approach aligns more closely with their goals." Often, the summarization operations within the technology disclosed rely on a combination of extractive and abstractive methods to preserve the original language used within the transcript while also providing a succinct, insightful summary beyond repetition.

In addition to summarizing the content of the meeting from a transcript, the disclosed tapestry generator can be used to emulate the insight of a graphic reporting specialist to guide teams towards targeted productivity and engagement goals and increase team member engagement in lieu of access to a graphic reporting specialist or trained facilitator, which are high-demand and expensive resources that may be inaccessible for many applications. Moreover, virtual meetings (increasingly becoming a standard practice) introduce unique challenges for tasks such as graphic reporting, boosting engagement, analyzing team dynamics, and extracting subtle patterns in dialogue.

Information necessary to perform these tasks can be challenging to obtain in a virtual environment (for example, reduced body language and eye contact social cues). The technology disclosed provides a solution to these problems, in addition to many other similar problems in the realms of organizational psychology and digital communication technology, that leverages the highly-specialized insights of graphic reporting and neuroaesthetics to augment advanced pattern recognition algorithms such as transformers and large language models. In contrast to artificial intelligence models and other algorithms configured to solely analyze textual inputs, such as the text of a transcript, many embodiments of the tapestry generator disclosed herein further integrate input data such as audio, video, and further metadata. In one example embodiment, the disclosed tapestry generator extracts and analyzes conversational features from both transcript data (e.g., semantic and syntactic patterns) and audio data (e.g., periods of time in between utterances, volume of speech, and changes to vocal pitch or tone). In another example embodiment, the disclosed tapestry generator extracts and analyzes conversational features from both transcript data and video data (e.g., evaluating metrics related to participant focus and facial expression recognition).

In yet another example embodiment, the disclosed tapestry generator further integrates additional metadata that can, at least, further contextualize input data and customize the tapestry generation process. Contextual metadata can include, but is not limited to, organizational and/or project-based roles of the participants, a category or target goal of the meeting, or data obtained from previous meetings. Customization metadata can include, but is not limited to, selection of input data to process (such as the exclusion of video data to comply with company privacy policies or filtering of analytical tasks to only include a subset of at least one of a sentiment analysis, clustering analysis, or team-building analytics) and hyperparameter variables such as a decision threshold variable related to an output metric (e.g., a similarity metric to evaluate how on-topic a conversational segment is to a pre-determined goal topic). In many embodiments, a combination of some or all of the above-described input data can be used to evaluate the characteristics of a recorded social interaction such as a meeting. A user skilled in the art will recognize that the examples given above are purely illustrative and should not be considered limiting to the scope or spirit of the technology disclosed. Graphic reporting may integrate a wide number of features and techniques that are contextually-dependent, and the systems and methods disclosed are not limited to a particular arrangement of input data or algorithmic structure.

A system for generating an automated art-based summary of online meetings configured to provide a reflection of a group's conversation with key phrases in a visual tableau is described below. First, certain terminology will be introduced to complement later-described description of tapestry generation. Next, an exemplary system for tapestry generation is established. The description continues to expand upon this system with variations to the system and examples of various embodiments and particular implementations.

Terminology

The technology disclosed generally refers to a system and method for automatically generating a graphical summary of a meeting that provides a reflection of a social interaction in a tapestry. For simplicity, the description generally focuses on a group conversation as the social interaction to be graphically summarized. More specifically, many embodiments disclosed herein involve a virtual meeting conducted using a conference calling medium, such as a video conferencing software accessible with a computer, smart phone, et cetera. This virtual meeting may be documented via the recording of audio, video, chat text, shared files, generated files such as a digital whiteboarding session, and so on. However, in other embodiments, the technology disclosed can also be applied to telephone meetings or in-person meetings. Certain embodiments may comprise the analysis of a non-verbal interaction such as an email, chat, text, or forum exchange, brainstorming methods such as whiteboarding, lists, "brain mapping" or "word clouds," interactively-shared documents, digital files such as slide decks, and other tangible outputs. Other embodiments may comprise the analysis of verbal interactions other than a meeting involving a group conversation, such as a forum, panel discussion, question and answer session, teambuilding exercise, debate, lecture, or voice-recording notes. In most implementations, the event or product to be analyzed for tapestry generation is collaboratively produced. The tapestry generation process provides an external perspective that is less hindered by the personal biases of an individual involved in, or affected by, the collaboration and thus, these collaborative works like meeting discussions can benefit from the coalescence of multiple perspectives into a single tapestry. However, the technology disclosed may also be applied to an independently-produced work such as a speech, presentation, or brainstorming process to guide future usage of the work or ideas. It is to be understood that the embodiments described herein generally only refer to a meeting transcript and omit the description of additional input data such as audio, video, or other digital files for clarity, as a user skilled in the art will understand the processes by which these additional input formats can be processed computationally.

A tapestry, as referred to herein, is a visual aid generated in relation to the processed input data (e.g., virtual meeting recording). The tapestry can include a combination of one or more graphical element and/or one or more textual element. Herein, textual and graphical "elements" may also be referred to synonymously as "objects" or "content." Graphical elements, or symbols, can be an image, rendering, symbolic depiction, animation, camera- or digitally-generated, and so on. Textual elements may be excerpts from the captured speech, such as a single word, fragment, sentence, or longer passages. However, textual elements need not necessarily be verbatim from the analyzed speech or text. In some embodiments, textual elements may be words or phrases that are descriptive of, influenced or inspired by, or otherwise responsive to the analyzed language. For example, a tapestry may include a thematic summary term such as "unity" or "growth," even if the term is not explicitly used within the analyzed transcript, if the topics discussed within the transcript are categorized by the tapestry generator to these terms via a clustering or similarity analysis. Hence, the tapestry generation process can leverage both extractive and/or abstractive text summarization.

In some embodiments, a tapestry may resemble a mural or collage. In other embodiments, a tapestry may resemble visual aids such as flow charts, Venn diagrams, word clouds, timelines, storyboards, et cetera. The tapestries generated by the technology disclosed are predominantly defined by the process used for generation rather than the particular arrangement of content within the tapestry beyond the above-described format of graphical and textual objects within a visual summary. Within this context, a tapestry is defined herein as the broadest interpretation of a visual representation of the content, output, success as defined by a pre-defined metric, process, and/or team dynamic associated with an input; and in particular, associated with a group conversation like a virtual meeting.

The tapestry is automatically generated by a tapestry generator system. Herein, automation generally refers to the generation of said tapestry leveraging the systems and methods disclosed herein in lieu of, or as an augmentation of, a subjective and/or manual process. A computer system and its components, in accordance with some implementations of the technology disclosed, that can be used in the automatic generation of a tapestry is discussed in further detail in the description of FIG. 18 below. In certain implementations, this automatic generation is generated from a tapestry template. Algorithmic design can be employed to produce a tapestry template configured to fit a certain task, like the generation of a timeline or collage-inspired graphical summary, such that the placement and stylistic features of tapestry objects is directed by a computational rule or set of rules. Algorithmic design may also be employed to populate a tapestry template with content in association with the processing of an input conversation, such that statistical analyses are leveraged to determine the selection and arrangement of graphical and textual elements within the tapestry.

The selection and arrangement (or placement) of elements within a tapestry may be guided by several statistical analyses. In many embodiments, language processing and understanding are facilitated by transformers, autoencoders, or large language models but may also comprise additional models in the processing of a meeting transcript, as well as pre-processing and post-processing analyses. These statistical analyses and artificial intelligence models can include, but are not limited to, regression analysis, significance testing, decision tree-based models, clustering analysis, multi-layer perceptron, or deep learning models. A person skilled in the art will recognize that these analytical models are examples and should not be considered a complete list of relevant models. In one example, textual data from a meeting transcript is analyzed to generate an importance metric, wherein the importance metric can be a statistic such as Gini importance, entropy, significance, model coefficients, or classification and regression tree (CART) importance.

Importance is referred to herein within the context of textual elements of importance, concept importance, symbol importance, and so on. The measures of importance leveraged within various implementations of the technology disclosed typically refer to statistical and computational measures of importance, wherein an importance measure is a pre-defined algorithm or computational process employed to calculate the weight or impact of an input on an output. Examples of statistical importance, such as the computation of concept importance, may include a descriptive statistic (e.g., mean, median, or frequency count), a quantitative or qualitative metric (e.g., a percentile score, a classification determined by a pre-defined set of rules or operations applied to the input, a weight, or a coefficient), a significance metric (e.g., p-value, F-score, log-likelihood ratio, Chi-square, et cetera), a machine learning-associated evaluation metric (e.g., feature importance, impurity, mean decrease accuracy and other permutation tests, Shapley additive explanations, or correlation metrics), and further importance theory metrics such as game theory variables, risk assessments, reliability analysis, delta index, and eigen-transformation of input data.

Generally, the embodiments of the technology disclosed described herein can be grouped into three categories. One category, as described previously, is the generation of a tapestry from a tapestry template. Tapestry templates have pre-defined locations, or slots, to be populated with content as guided by one or more rules associated with the slot. The second category is the generation of a tapestry using an algorithmic layout method. Rather than using a tapestry template, the algorithmic layout method uses a statistical algorithm (in most embodiments, an artificial intelligence model such as a large language model) to process an input, such as a meeting transcript, generate a tapestry layout in response to the processed transcript, and render the tapestry with graphical and textual elements in response to the processed transcript. The algorithmic layout method may generate the tapestry from a complete transcript, or simultaneously generate the tapestry as the transcript (as well as any additional data, such as audio and video) becomes available in "real-time."

"Real-time" refers to processing a transcript is under preparation but not fully complete. This may be a scenario in which the meeting is actively occurring or a scenario in which a series of meetings are compiled into a single transcript from which a tapestry will be generated. In contrast, tapestry generation following a meeting refers to a point in time in which the transcript comprises a complete record of a meeting or series of meetings to be processed as a whole entity, from which a visual summary of the meeting or series of meetings can be generated.

In some embodiments, real-time generation of a tapestry may involve incremental generation of certain components of the tapestry (e.g., one or more particular locations or sections within the tapestry, particular excerpts of the transcript, or particular textual or graphical elements extracted from the transcript or generated as output by a statistical analysis, logic, algorithm, or engine), incremental revision of certain components of the tapestry, or a combination of both. In addition to real-time generation of a tapestry, the same described principles of incremental generation may apply to the generation of a tapestry at a later time point from a complete transcript.

A particular component within the disclosed tapestry generator model may comprise a variety of system components and configurations. The components, as introduced later within FIG. 2A, may be configured as an algorithm process, statistical analysis, a factory method, a decision tree or flow chart, an automation protocol, a machine learning model such as logistic regression or random forest, a deep learning model such as a convolutional neural network, a recurrent neural network, and/or a multi-task neural network. In some embodiments, at least two components within the disclosed tapestry generator model may be configured to comprise an overlapping model/statistical analysis or a hyperparameter. In other embodiments, no components within the disclosed tapestry generator model may be configured to comprise an overlapping model/statistical analysis or a hyperparameter.

A variety of statistical models and machine learning analyses can be implemented for each respective model component to generate tapestry features. A summary of relevant machine learning models will be described prior to introduction of various model architectures comprising these models.

A tapestry generator may comprise a plurality of machine learning models, examples of which will now be discussed in further detail. A machine learning model can take the transcript, or output data generated by a language understanding model in a pre-processing step, as input features to generate a meeting tapestry. A central issue is that classification performance depends heavily on the quality and the relevance of these features. For example, incomplete representation of the data may reduce classification accuracy.

Deep learning, a subdiscipline of machine learning, addresses this issue by embedding the computation of features into the machine learning model itself to yield end-to-end models. This outcome has been realized through the development of deep neural networks, machine learning models that comprise successive elementary operations, which compute increasingly more complex features by taking the results of preceding operations as input. Deep neural networks are able to improve prediction accuracy by discovering relevant features of high complexity, such as sentiment or accuracy of statements within the meeting transcript. The construction and training of deep neural networks have been enabled by the explosion of data, algorithmic advances, and substantial increases in computational capacity, particularly through the use of graphical processing units (GPUs).

An example of a deep learning problem is one that predicts whether a specific symbol is an appropriate selection as a graphical element given features of at least one textual element identified within the transcript such as a particular utterance, a particular sentiment, or a particular theme within the transcript. Training a machine learning model refers to learning its parameters, which commonly involves minimizing a loss function on training data with the aim of making accurate predictions on unseen data.

For many deep learning problems, the input data can be represented as a table with multiple columns, or features, each of which contains numerical or categorical data that are potentially useful for making predictions. Some input data are naturally represented as features in a table (such as temporal data), whereas other input data need to be first transformed (such as categorization of textual elements into a particular linguistic category) using a process called feature extraction to fit a tabular representation. Tabular data are standard for a wide range of supervised machine learning models, ranging from simple linear models, such as logistic regression, to more flexible nonlinear models, such as neural networks and many others.

Logistic regression is a binary classifier, that is, a supervised learning model that predicts a binary target variable. Logistic regression predicts the probability of the positive class by computing a weighted sum of the input features mapped to the [0,1] interval using the sigmoid function, a type of activation function. The parameters of logistic regression, or other linear classifiers that use different activation functions, are the weights in the weighted sum. Linear classifiers fail when the classes cannot be well discriminated with a weighted sum of input features. To improve predictive performance, new input features can be manually added by transforming or combining existing features in new ways, for example, by taking powers or pairwise products.

Neural networks use hidden layers to learn these nonlinear feature transformations automatically. Each hidden layer can be thought of as multiple linear models with their output transformed by a nonlinear activation function, such as the sigmoid function or the more popular rectified-linear unit (ReLU). Together, these layers compose the input features into relevant complex patterns, which facilitates the task of distinguishing two classes.

Deep neural networks use many hidden layers, and a layer is said to be fully-connected when each neuron receives inputs from all neurons of the preceding layer. Neural networks are commonly trained using stochastic gradient descent, an algorithm suited to training models on very large data sets. Embodiment of neural networks using modern deep learning frameworks enables rapid prototyping with different architectures and data sets.

Local dependencies in spatial and longitudinal data must be considered for effective predictions. For example, shuffling a plurality of particular utterances in an order that does not correspond with the linear time progression of a meeting severely disrupts informative patterns. These local dependencies set spatial or longitudinal data apart from tabular data, for which the ordering of the features is arbitrary. Consider the problem of generating a tapestry comprising a timeline that graphically illustrates the progression of a meeting over time.

A convolutional layer is a special form of filter or fully-connected layer in which the same fully-connected layer is applied locally, for example, in a 60 minute window, to all transcript positions. Each convolutional layer scans the transcript with several filters by producing a scalar value at every position, which quantifies the match between the filter and the sequence. As in fully-connected neural networks, a nonlinear activation function (commonly ReLU) is applied at each layer. Next, a pooling operation is applied, which aggregates the activations in contiguous bins across the positional axis, commonly taking the maximal or average activation for each channel. Pooling reduces the effective sequence length and coarsens the signal. The subsequent convolutional layer composes the output of the previous layer. Finally, the output of the convolutional layers can be used as input to a fully-connected neural network to perform the final prediction task. Hence, different types of neural network layers (e.g., fully-connected layers and convolutional layers) can be combined within a single neural network.

Different types of neural network can be characterized by their parameter-sharing schemes. For example, fully-connected layers have no parameter sharing, whereas convolutional layers impose translational invariance by applying the same filters at every position of their input. Recurrent neural networks (RNNs) are an alternative to convolutional neural networks for processing sequential data, such as time series, that implement a different parameter-sharing scheme. Recurrent neural networks apply the same operation to each transcript element. The operation takes as input the memory of the previous transcript element and the new input. It updates the memory and optionally emits an output, which is either passed on to subsequent layers or is directly used as model predictions. By applying the same model at each transcript element, recurrent neural networks are invariant to the position index in the processed transcript.

The main advantage of recurrent neural networks over convolutional neural networks is that they are, in theory, able to carry over information through infinitely long transcripts via memory. Furthermore, recurrent neural networks can naturally process sequences of widely varying length, such as a plurality of text segments of differing word or character length or a plurality of transcripts each corresponding to a meeting with differing time lengths such as fifteen minutes, sixty minutes, and eighty-five minutes. However, convolutional neural networks combined with various tricks (such as dilated convolutions) can reach comparable or even better performances than recurrent neural networks on sequence-modelling tasks, such as audio synthesis and machine translation. Moreover, because recurrent neural networks apply a sequential operation, they cannot be easily parallelized and are hence much slower to compute than convolutional neural networks.

For the language understanding and image recognition tasks involved in the disclosed technology, many embodiments employ models such as those within the transformer family like autoencoders and large language models for language understanding and natural language processing (NLP) tasks.

In many embodiments, the tapestry generator comprises a transformer model that relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field. Some of the state-of-the-art models use Transformers, a more powerful and faster model than neural networks alone. Neural networks process input in series (e.g., time series data including sequencing-by-synthesis (SBS) sequencing data) and weight relationships by distance in the series. Transformers can process input in parallel and do not necessarily weight by distance. Transformers can be used in addition to alternative architectures of neural networks.

The artificial intelligence model used in the algorithmic layout method can include self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, BERT, SpanBERT, RoBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-DeepLab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, ViTB/16-FRCNN, ViT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

Attention mechanisms distinguish transformers from other artificial intelligence and machine learning models. The attention mechanism provides a solution for the so-called vanishing gradient problem. At every step of one example attention mechanism that can be implemented within certain embodiments of the technology disclosed, a decoder is given an attention score, e, for each encoder hidden state. In other words, the decoder is given weights for each relationship between words in a sentence. The decoder uses the attention score concatenated with the context vector during decoding. The output of the decoder at time step t is be based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

A user skilled in the art will recognize that many variations of the above-described artificial intelligence technology exist and the disclosed language understanding tasks herein may comprise a range of algorithm and artificial intelligence model architecture and ensemble structure without deviating from the scope or spirit of the technology.

Now, the discussion turns to a description of the disclosed tapestry generation system and methods in further detail.

System Overview

FIG. 1 illustrates an architectural level schematic of a system for automatically generating a graphical summary of a meeting that provides a reflection of a group's conversation in a tapestry, in an example of the technology disclosed. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements in the system is described in greater detail.

System 100 includes a meeting supervisor or facilitator 122 who interacts with an online meeting platform 124 via computers, tablets, cell phones and smartwatches. Browser-based applications and third-party applications can also be delivered on additional devices not mentioned here. System 100 also includes symbol library 102, a database comprising a plurality of symbols wherein each symbol is related to one or more language elements. System 100 also has network 112 which can be a public network or a private network, in different implementations. System 100 can include multiple applications and multiple networks.

System 100 also includes tapestry generator 104, wherein the tapestry generator is configured to automatically generate a graphical summary of a meeting incrementally in real-time as the meeting progresses or after the meeting is completed. The resulting graphical summary provides a reflection of a group's conversation with textual and graphical elements in a tapestry.

In the interconnection of the elements of system 100, network 112 couples meeting supervisor or facilitator 122 on a computer, tablet, cell phone, or smartwatch, with online meeting platform 124 and tapestry generator 104. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

System 100 may be further configured to generate a tapestry leveraging a pre-defined tapestry template, wherein the tapestry template has a set of slots to be filled with corresponding slot rules, or an algorithm-generated tapestry layout, wherein the set of rules governing tapestry generation are generated in response to the processing of a tapestry.

Tapestry Generation Using a Template

FIG. 2A shows a block diagram for generating a tapestry from a pre-defined template, in an example of the technology disclosed. A transcript 201 is obtained from an online remote meeting. This transcript may come from an automated or manually generated transcription of an audio file in the form of a text file. The transcript can contain a combination of textual elements, annotations, and temporal data, such as time stamps. A tapestry generator 104 comprises transcript processing logic 222, textual element selection logic 242, graphical element selection logic 262, and tapestry composition logic 282. In some implementations, the tapestry generator 104 renders a tapestry following a particular tapestry template and a plurality of parameters respective to the particular tapestry template (e.g., a landscape nature template). Parameters for tapestry composition may also include a filter for the inclusion of one or more symbols, a prioritization schema for graphical element placement, or template slot rules (e.g., a particular slot may only be filled with a graphical element or a textual element, or a particular slot prioritizes placement of one or more graphical elements over other graphical elements).

In other embodiments, the tapestry generator 104 renders a tapestry following a particular tapestry template comprising a series of steps guiding an arrangement of selected textual and graphical elements within a tapestry, guided by one or more statistical analyses of transcript 201. A tapestry 204 is rendered, comprising one or more textual and graphical elements. Textual elements may include keywords, phrases, sentences, lemmas, or lexemes extracted from the transcript 201. Graphical elements may consist of symbols from symbol library 102 or transcript-prompted digitally synthesized symbols.

Next, the functional components of tapestry generator 104 are discussed in further detail. Transcript processing logic 222 extracts textual elements from the transcript 201, as well as additional data such as temporal data (such as time stamps, length of time speaking, and length of pauses in between participants speaking) and annotation data (such as meeting commentary, additional notes from a meeting facilitator about the purpose of a meeting or participants within the meeting, or language understanding algorithm-extracted data on participant sentiment or meeting quality). Textual element selection logic 242 selects a plurality of textual elements extracted by transcript processing logic 222 as textual elements of importance. Textual elements are identified as important as determined by one or more statistical analyses. These statistical analyses may be implemented in various models, including modules within the language understanding model used for transcript processing or post-transcript processing analyses as previously described above. Various embodiments of the technology disclosed rely on extractive versus abstractive methodologies within the processing of textual elements. In certain embodiments, the user may have access to one or more customization options that determine the degree of abstraction that is acceptable within the generative process. In other embodiments, one or more operations performed in association with the tapestry generator 104 may guide the particular strategy of text summarization to be used in dependence upon one or more identified features related to the input data.

The statistical analyses that constitute textual element selection logic 242 process one or more features associated with textual elements, such as frequency of included words, lemma family and syntactic dependency of included words, various temporal metrics (e.g., length of speech comprising a textual element within the meeting transcript 201, time point within the meeting at which a textual element was first introduced, and so on), and linguistic analysis related to sentiment, importance, relevance, or complexity of a textual element.

The above-described statistical analyses will now be further expanded upon with a range of use cases and implementations. A person skilled in the art will recognize that these statistical analyses are examples and that a variety of additional analyses, as well as combinations and ensembles of the listed analyses, may be implemented without departing from the scope of the disclosed technology.

Statistical analysis of the sentiment of a textual element may include the extraction of opinion (e.g., excited, apprehensive, or uninterested) or connotation (e.g., positive, neutral, negative) of the textual element. Statistical analysis of the importance of a textual element may include the computation of a weight, coefficient, or scoring metric determined by a pre-defined set of one or more rules. Examples of these rule sets may include rules pertaining to a particular field addressed by meeting participants, a particular goal for the meeting associated with specific functions or metrics that pre-define accomplishment of the particular goal, or a metric dependent on the output obtained from prior meetings.

Statistical analysis of the relevance of a textual element may include similar analyses to that of importance analysis, wherein "importance" is defined to be the similarity or degree of relatedness to a set of one or more referential concepts, frameworks, or networks. A referential concept or framework for relevance analysis may be related to an area of study or pre-defined rubric (e.g., a rubric set by a trusted governing authority or a supervisor within the group). A referential network may be a network graph wherein the nodes are previous utterances within the transcript or previous transcripts from an earlier meeting, and edges related the connectedness of each node (i.e., via a pre-defined rule system determining connectedness of a pair of nodes based on a metric for sentiment, similarity, agreement, et cetera). Moreover, a similar process or computation may be applied to quantify the complexity of a particular utterance.

Following selection of important textual elements by textual element selection logic 242, selected textual elements are processed as input by graphical element selection logic 262 to select one or more associated graphical elements. Graphical elements are selected from symbol library 102 (or, in certain embodiments, transcript-prompted digitally synthesized symbols) as graphical elements of importance. Graphical elements are identified as important as determined by one or more statistical analyses. The statistical analyses that constitute graphical element selection logic 262 process one or more features associated with textual elements, such as pre-defined relationships between textual elements and symbols (as informed by graphic reporting methodology), frequency of textual elements associated with particular symbols, prioritization schema or weighting logics applied to a particular tapestry layout, and symbology analysis related to sentiment, importance, relevance, or complexity of a graphical element.

The statistical analyses comprising graphical element selection logic 262 may include one or more overlapping statistical models with textual element selection logic 242, transfer learning informed by textual element selection logic 242, or non-overlapping statistical models from the textual element selection logic 242.

Within the plurality of selected textual elements and graphical elements, one or more textual elements and one or more graphical elements are rendered within a particular tapestry layout by tapestry composition logic 282. In one implementation of the technology disclosed, the arrangement of textual and graphical elements is determined by a tapestry template layout comprising defined slots to be filled with either a textual or graphical element and a set of template rules. One or more template rules may be pre-defined as part of the template set-up, such as the number of slots, position of slots, and allowable content within a slot (i.e., a textual element or a graphical element, the maximum length of a textual element or size of a graphical element, et cetera). One or more template rules may be related to the layout template, transcript content, or user customization input.

In addition to the statistical analyses constituting textual element selection logic 242 or graphical element selection logic 262, the template rules associated with tapestry composition logic 282 may also comprise one or more rule sets associated with statistical analysis. A rule set further comprises one or more rules, wherein a rule may be a prioritization rule, a compatibility rule, or an inclusion rule. Some embodiments of the tapestry composition rules may not require statistical analyses, such as a conditional or decision tree-structured rule (e.g., a particular template dictates that a specific symbol must be included, a certain number of symbols must be included, or the inclusion of a first symbol must be paired with the inclusion of a second symbol). However, other embodiments of the tapestry composition rules comprise rules associated with one or more outputs from one or more statistical analyses.

In some embodiments, the inclusion of a symbol, the placement configuration of a symbol, or the location of a first symbol relative to the location of a second symbol is dependent on one or more metrics associated with the statistical analyses of the selected graphical elements, selected textual elements, or the transcript. In certain embodiments, the selection of a graphical element for inclusion within a tapestry is dependent on a similarity metric, wherein the similarity metric measures the similarity of thematic features (e.g., relevance to nature, relevance to technology, connotation, sentiment) related to a candidate graphical element to the thematic features related to a central theme of the tapestry template. In one embodiment, the similarity metric is related to the inclusion of the candidate graphical element as a simple inclusion rule such that the candidate graphical element is included within the tapestry if the similarity metric exceeds a pre-defined threshold magnitude, percentile relative to other similarity metrics associated with other graphical elements, or rank within a rank-ordered list, wherein the graphical elements within the rank-ordered list are ordered by similarity metric. A limited pre-defined number of highest-ranked graphical elements may be selected for inclusion.

In another embodiment, the inclusion of the candidate graphical element within the tapestry may further depend on a prioritization rule that applies to a respective subset of graphical elements. An example of a prioritization rule dictated by a tapestry template is a rule stating that if a first candidate graphical element and a second candidate graphical element both meet the requirements defined by the similarity metric threshold for inclusion, the second candidate graphical element must be prioritized for inclusion over the first candidate independent of the similarity metric scores of the first candidate graphical element or the second candidate graphical element.

In yet another embodiment, the inclusion of the candidate graphical element within the tapestry may further depend on a compatibility rule that applies to the relationship between specific graphical elements. An example of a compatibility rule dictated by a tapestry template (or a symbol library) is an inclusion rule stating that a first candidate graphical element and a second candidate graphical element cannot both be selected for inclusion within the tapestry, or a rule stating that a first candidate graphical element and a second candidate graphical element cannot be placed adjacent to one another within the tapestry. One of the two candidate graphical elements may be prioritized over the other candidate graphical element as stated by a prioritization rule, or the selection of which graphical element within a set of incompatible graphical elements will be included within the tapestry may depend on the values of the similarity metric scores.

In some circumstances, two symbols are both selected, but the first symbol is prioritized over the second symbol resulting in the second symbol being excluded from the rendered tapestry, a particular slot always prioritizes one or more symbols over the remainder of the available symbols if the prioritized symbols are selected from the transcript. One or more template rules may be customizable by user input, such as a custom prioritization schema for a particular set of textual or graphical elements.

In many implementations, a plurality of rules and rule sets guide the selection and inclusion of tapestry elements within the tapestry wherein rules may be related to the transcript, the textual elements, the graphical elements, the template, or the statistical analysis outputs obtained from the tapestry generation system disclosed. The example embodiments listed comprise a limited rule hierarchy applied to a limited number of tapestry elements; however, it is to be understood that any number of rules may be implemented with any number of prioritization orderings or sequence orderings, and these rules may be applied towards any feature or element of the tapestry generation process or the final tapestry obtained from the tapestry generation process.

In another implementation, the arrangement of textual and graphical elements is determined by an algorithmic layout method comprising a series of steps for arrangement. One or more algorithms, machine learning models, or factory methods can be implemented to generate the algorithmic layout method steps. In most embodiments, the algorithmic layout method comprises at least one artificial intelligence model configured for language understanding tasks. To generate an algorithmic layout method, one or more input data sources are processed, such as the meeting transcript, output data from statistical analyses respective to the selection of textual or graphical elements, or user input parameters.

In yet another implementation, a user can customize a draft tapestry in a graphical user interface to interactively generate a tapestry. Following the generation of a draft tapestry (either using a tapestry template or an algorithmic layout method), a user can utilize a so-called "magic hand" cursor with tool-tip options for altering textual and graphical elements in the draft tapestry. The alternative options for a tapestry element may also be referred to as alternative tapestry elements, alternative elements, candidate replacements, candidate replacement options, or candidate replacement tapestry elements. In some embodiments, a particular textual element may be altered to comprise alternative textual content, typography, or positioning.

In one embodiment of the disclosed method, a particular graphical element may be altered to comprise alternative graphical content, designs, or positioning. In most embodiments of an interactive tapestry generation method, alterations offered to the user are guided by one or more statistical analyses or rule sets. In another embodiment, a particular graphical element may be selected from a plurality of symbols ranked by a scoring metric result by statistical analysis. Although the selected graphical element scored the highest in this scenario, as measured by the pre-determined metric, a set of alternative high-scoring graphical elements may also be presented to the user as candidates for manual replacement of the automatically selected graphical element within the tapestry.

The set of alternative elements may be determined by a maximum number of graphical elements (e.g., the following three best matches extracted from the list of symbols ranked by scoring metric or symbols within a target percentile range of the list of symbols ranked by scoring metric), a similarity score (e.g., symbols that are determined to be at a target percent similarity, above a target percent similarity or within a target percent similarity range, as determined by one or more input features), or a categorization metric (e.g., symbols within the same group as the originally selected graphical element when symbols are grouped by one or more features).

Within the most common three categories of tapestry generation embodiments (generation of a tapestry from a tapestry template, an algorithmic layout method, or interactive generation of a tapestry), numerous additional embodiments may comprise various combinations of the described components from each embodiment described.

While system 200A is described herein with reference to particular logic components and statistical analyses, it is to be understood that the components are defined for convenience of description and are not intended to require a particular permutation of component parts. Additional combinations and permutations of the above-described method components can be used to generate a tapestry comprising textual and graphical elements selected from one or more rule systems.

Next, the discussion turns to a description of a method for tapestry generation in further detail.

FIG. 2B shows a schematic flow diagram for a method of generating a tapestry from a pre-defined template, in an example of the technology disclosed. First, an overview of the components of diagram 200B will briefly be described. Next, individual components will further be broken down into subcomponents. Diagram 200B comprises a flow schematic with component 222 for transcript processing, component 242 for extraction of textual elements within a transcript, component 262 for the selection of graphical elements, component 282 for the population of a tapestry layout, and finally, component 226 for the generation of a tapestry.

Diagram 200B begins with a component 222 that can be used for processing of a meeting transcript, in operation 208, to remove stop words and phrases, such as unintelligible words, filler words ("like", "um", "uh", and so on), or unallowable terms (e.g., explicit words). In some embodiments, component 222 may perform additional operations such as the recognition of differing speakers within recording data from the meeting. In some embodiments, speaker recognition may be as simple as differentiating between Speaker 1 and Speaker 2. In other embodiments, speaker recognition may be more specific, as guided by additional metadata or analysis, allowing for a more descriptive differentiation between speakers (e.g., speakers Matt Amatics and Al Gorithm from the text summarization example provided above). A clean transcript can then be processed as input to extract textual elements within the transcript such as words, phrases, lemmas, and lexemes within the transcript. In operation 218, the transcript undergoes tokenization, allowing for further processing of the language data. Textual elements are broken up into smaller units as tokens, such as words, characters, or sub-words. Following tokenization, operation 228 comprises lemmatization of the textual element tokens. Lemmatization refers to the process of grouping different inflected words into a category having the same root form, or lemma. Lemmatization is further explained within FIG. 4.

In addition to detecting lemmas within the textual elements, operation 238 detects syntactic dependencies within the textual elements. Dependency parsing analyzes the grammatical structure of a sentence to identify parts-of-speech (e.g., nouns, verbs, and adjectives) and relational dependencies, also known as syntactic dependencies, within a particular textual element. In some implementations, detected syntactic dependencies are parsed into a dependency tree structure. Dependency parsing is further explained within FIG. 4.

Operation 228 comprises the statistical analysis of detected entities and entity relationships within textual elements and textual element tokens identified within the transcript. As described above, a plurality of statistical analyses may be implemented to accomplish the ranking, scoring, or categorization of textual elements. The output of one or more statistical analyses carried out in operation 228 can be used to inform the selection of key textual elements (also referred to as "textual elements of importance", "textual elements of interest", or "selected textual elements") within operation 258. The output of one or more statistical analyses carried out in operation 228 can also be used to inform the classification of a meeting theme, wherein the meeting theme classification may influence the selected template, or a rule associated with the selected template for tapestry generation.

All or some of the processes constituting operations 208, 218, 228 and 238 can be implemented within a language understanding model (e.g., a large language model or a natural language processing (NLP) model), or as a pre- or post-processing step for a language understanding model. Following the language analysis of meeting transcript and input settings 206, the output of one or more statistical analyses from operation 228 may be processed as input by component 242 to generate a selection of key textual elements. In addition to statistical analyses performed in operation 228, further statistical analyses may be performed in operation 248 to process output data generated by the transcript processing logic 222. In some embodiments, further analysis is performed with a computer vision model to extract data associated with the sentiment or an organizational psychology analytic from an audio or video file captured during the meeting. These analyses may be used to augment the selection of textual elements, or at a later stage, graphical elements as well.

Once textual elements have been selected, component 262 selects a subset of graphical elements from symbol library 102. Component 262 can further be broken down into operations 266, 276, and 286. Operation 266 comprises the statistical analysis of detected entities and entity relationships within selected textual elements and selected textual element feature(s) (e.g., tokens, lemmas, frequencies, and statistical metrics). As described above, a plurality of statistical analyses may be implemented to accomplish the ranking, scoring, or categorization of graphical elements. In operation 276, the output of operation 266, as well as any additional analyses respective to the tapestry template (e.g., rules associated with a tapestry template, algorithms associated with a algorithmic layout method, or user customization parameters) inform the detection of symbols associated with the selected textual elements. The output of one or more statistical analyses carried out in operations 266 and 276 can be used to inform the selection of symbols from symbol library 102 as key graphical elements (also referred to as "graphical elements of importance", "graphical elements of interest", "graphical textual elements", "selected symbols", or "symbols of importance") within operation 286.

Following the selection of key textual elements and key graphical elements, component 282 populates the tapestry template with the selected textual or graphical elements in an appropriate composition, wherein appropriateness is determined by one or more rules associated with a particular textual element, graphical element, or the tapestry template. Component 282 comprises operation 298 for identification of appropriate arrangement for textual elements and graphical elements, respectively, and operation 299 for the arrangement of selected elements within the layout. As a result, component 226 is enabled following operation 299 to generate a tapestry and thus, component 226 culminates in a generated tapestry as the final output of diagram 200B. Further detail about the population of a tapestry with textual and graphical elements and generation of the tapestry can be found within the description of tapestry composition logic 282 above.

The conversation now turns to a plurality of entities involved in the method described and their relationships, especially within the context of language understanding tasks.

Data Structures and Features

FIG. 3 is an entity-relationship diagram comprising a plurality of elements involved in generating a tapestry, within accordance with some implementations of the disclosed technology. First, the components of diagram 300 will be described. Next, the relationships between each entity will be elaborated on, within accordance with one embodiment of the disclosed technology as a representative example. Within the described embodiment of diagram 300, each entity is directly related to all other entities within the diagram. A respective first and second entity associated with the disclosed method need not be directly related as a necessity to perform the disclosed method.

Diagram 300 comprises the following entities: symbol library 102, transcript 201, tapestry 204, and tapestry generator 104. Symbol library 102 further comprises at least one symbol 302, wherein a symbol within symbol library 102 is associated with at least one additional entity such as a word, phrase, category of words or phrases, theme, lexeme, or connotation. In some embodiments, the relationship between a symbol and another entity is associated with a dictionary or database. Transcript 201 further comprises at least one text segment 304, wherein n text segment(s) 304 of length m can be extracted from transcript 201, and both n and m may be any nonnegative integer. The text segment(s) 304 are associated with one or more textual features 324, wherein a textual feature 324 may be a syntactic feature 344 or a semantic feature 364.

Syntactic features 344 may include a part of speech classification, syntactic dependency, a word length, or a complexity classification. Semantic features 364 may include a connotation classification, a cluster or category prediction, a theme classification, or an accuracy metric. Many linguistic features may be extracted from language models, other statistical methods and a number of additional features beyond the examples listed may be implemented within the disclosed technology without departing from the scope or spirit of the disclosed technology.

Tapestry 204 further comprises textual elements 306 and graphical elements 326, wherein the textual elements 306 and/or graphical elements 326 are referred to as "tapestry elements." A tapestry may contain zero, one, or a plurality of textual elements 306 and/or graphical elements 326. In some embodiments and within some templates, the number of textual elements 306 may be equal to the number of graphical elements 326. In other embodiments, the number of textual elements 306 is not equal to the number of graphical elements 326.

In most implementations, one tapestry generator 104 interacts with a transcript 201 and a symbol library 102 to generate a tapestry 204, wherein the relationship between tapestry generator 104 and another entity associated with tapestry generator 104 is a one-to-many relationship. A plurality of transcripts 201 may interact with a single symbol library 102 or a plurality of symbol libraries 102 (e.g., wherein a plurality of symbol libraries 102 may comprise a first library of common English linguistics and a second library of computer science terminology linguistics), and a symbol library 102 may be leveraged in the analysis of a single transcript 201 or a plurality of transcripts 201.

Hence, it also may be true that a plurality of tapestries 204 may interact with a single symbol library 102 or a plurality of symbol libraries 102 (e.g., wherein a plurality of symbol libraries 102 may comprise a first library of common English linguistics and a second library of computer science terminology linguistics), and a symbol library 102 may be leveraged in the analysis of a single tapestry 204 or a plurality of tapestries 204. Finally, a single transcript 201 can be used to generate a single tapestry 204 or a plurality of tapestries 204, and a tapestry 204 may be generated as a result of a single processed transcript 201 or an aggregated plurality of transcripts 201. In addition to the embodiments and relationship types described within diagram 300, many other embodiments exist wherein the numerosity of each particular entity within a relationship pair of entities may vary.

For clarity of description, certain stated examples, various embodiments, and particular implementations of the disclosed method may refer to a particular component or associated feature as a singular entity or another specific quantity (e.g., the allusion to a single semantic feature associated with a textual element or the comparison of a first tapestry element with a second tapestry element). However, the numerosity of elements may vary from one embodiment to another without altering the scope of the technology disclosed. As described within diagram 300, the data and entities associated with the technology disclosed are typically related via a many-to-many, one-to-many, or many-to-one relationship such that the quantity of an entity such as a text segment, tapestry element, or feature can be any nonnegative integer.

The analysis of linguistic features within a transcript is an important step for accurate and relevant extraction of textual elements, and thus, influences the selection of graphical elements as well. Two of the methods that can be implemented to achieve this goal, lemmatization and dependency parsing, are now described further.

FIG. 4 illustrates a word lemmatization and a related dependency tree. Block 402 comprises a list of various inflected forms of the root word "drive." These words may be tokens extracted from tokenization of text data, such as a meeting transcript. Although they are conjugated into different forms, "drive", "driving", "drives", "drove", and "driver", each word listed in block 402 shares the same root form, "drive", as shown within block 404. Hence, block 404 ("drive") would be the resulting lemma from any token within block 402. In addition to the lemmatization of tokens, tokens can also be structurally organized by their relational dependencies within the syntax of a phrase or sentence.

FIG. 4 includes a dependency tree relating the syntactic dependencies of phrase 422, "I drive a car." First, phrase 422 is separated into a related noun 442 and verb phrase 444, where noun 442 performs the action in verb phrase 444. Because noun 442 comprises a single token, "I" 460 (i.e., there are no adjectives or modifiers that relate to the acting noun), no further branching is necessary for noun 442. In contrast, verb phase 444 comprises a related verb 462 and a noun phrase 464, where verb 462 acts upon noun phrase 464. Verb 462 comprises a single token, "drive" 482, so no further branching is necessary for verb 462. Noun phrase 464 can be further branched into two tokens: a determiner 484 and a noun 486, where "a" 494 is a determiner for noun 486, "car" 496. While tokenization and lemmatization provide information about the types of entities discussed within a transcript, dependency parsing provides more depth by detecting the relationships between discussed entities.

Statistical analyses computed for the selection of textual and graphical elements may process data from the original transcript, tokens from the transcript, lemmas from the transcript, syntactic dependencies from the transcript, as well as additional associated data from annotations, timestamps, and more complex language model tasks such as NLP processing (e.g., sentiment, relevance, and accuracy).

The following use case demonstrates the above description of system and method components within the context of tapestry generation examples. First, the annotation and feature extraction processes associated with transcript processing logic 222 are elaborated upon further, including syntactic features as described in FIG. 4 as well as semantic features. Next, a plurality of potential embodiments are presented, each potential embodiment comprising a separate architecture.

Within the architectures described, it is to be understood that the arrangement of blocks are defined for convenience of description and are not intended to require a particular arrangement of component parts. Further, the blocks need not correspond to physically distinct components, i.e., a process comprising more than one distinct component may also be implemented wherein the functions of the described components are performed using a single multi-task machine learning or statistical analysis. To the extent that distinct nonoverlapping components are used, additional combinations and permutations of the distinct components exist and the distinct components described within each particular embodiment may be combined in alternative arrangements not described. A variety of deep learning architectures or statistical models may be built to the same end without departing from spirit or scope.

Certain components may be configured to perform a task simultaneously with other components, or in an order wherein an upstream component must be completed prior to a downstream component. Certain components may process identical input data as compared to other components or non-identical input data as compared to other components. Moreover, a particular component may be configured to process data generated from any number of any additional components within the architecture. In a first implementation, the graphical element selection component processes input data obtained from the transcript processing component and the textual element selection component, while in a second implementation, the graphical element component processes input data obtained from the textual element selection component but not input data obtained from the transcript processing component. In another example, a third embodiment comprises a model configured to simultaneously invoke the textual element selection component and the graphical element selection component. In contrast, a fourth embodiment comprises a model configured to complete a textual element selection component function prior to initiating a graphical element selection component function.

FIG. 5 shows an example language model output 500 comprising an annotated transcript 502. Annotations in this example correspond to features of the transcript. Annotated transcript 502 may be obtained from transcript processing logic 222, or it may be obtained from alternative models and processes such as statistical pre-processing or user-labeled data. Features extracted and annotated within the transcript may include syntactic features such as lexemes or syntactic dependencies and/or semantic features such as connotation, theme, accuracy, or sentiment. The annotation shown in output 500 for transcript 502 includes segmentation of text identified by line breaks, parts of speech within the text identified by color-coded typeface, and theme identified by text highlighting. Any number of features may be extracted from transcript 502 and/or annotations associated with transcript 502 using a language model or other statistical model; however, a limited number are shown within output 500 to improve the clarity of the description.

Some lines, such as line 522, include a plurality of identified parts of speech and dependencies as well as a plurality of key words identified that are associated with important themes. A theme may be classified as "important" and/or a word is described as "key" as determined by a pre-defined list of rules or conditions. In certain embodiments, a plurality of themes may be manually selected as important by the user, or a metric generated by a statistical model quantifying the relevance of a text fragment to a particular sentiment or connotation may be used to measure importance. Many language understanding methodologies exist for text classification, which can be used to implement the technology disclosed.

Other lines, such as line 524, also comprise several annotated features; however, the length of the fragment per line, the number of annotations, and the sentence structure do not overlap with line 522. In contrast to text segmentation by length, text segmentation may also be invoked regarding the individual speaking, full sentences, topic, or a metric generated by the statistical models described within the disclosed method. Some lines, such as line 562, comprise sentences with only semantic annotations but no syntactic annotations. Alternatively, lines may also comprise sentences with only syntactic annotations but no semantic annotations. Finally, certain lines may not be annotated by any features. The input data displayed within output 500 and other forms of textual or linguistic data, wherein the data is described by at least one feature, can be processed by a tapestry generator model to generate a tapestry summarizing the content within the input data. Many embodiments and architectures exist for the disclosed tapestry generator model, therefore the format of the input data compatible with the tapestry generator model varies.

Model Architectures for Template-Guided Tapestry Generation

FIG. 6 shows an example architectural level schematic of a tapestry generator model. Within multi-task learning model embodiment 600, a transcript 201 first undergoes processing by a transcript processing logic 222 to obtain text segment(s) 304. The text segment(s) 304 are annotated or otherwise associated with textual feature(s) 324. A textual feature 324 may be a syntactic feature 344 or a semantic feature 364. As previously described, one or more rules or conditional logics govern the segmentation of text and feature extraction from text within transcript 201. Or a neural network such as a deep learning network, convolutional neural network, or recurrent neural network can be used.

Within the text segment(s) 304, at least one text segment 304 obtained from transcript processing logic 222 (or an alternative source of transcript data, as previously described) associated with at least one textual feature 324 is processed by textual element selection logic 242. Textual element selection logic 242 selects textual elements 306. The graphical element selection logic 262 then processes selected textual elements 306 to select graphical elements 326. The selected graphical components 326 may be associated with the selected textual elements 306 by connection within symbol library 102, one or more algorithms computing a similarity metric or detecting a relationship as guided by one or more conditional rules, or manual labeling of the textual and graphical elements by a user.

Graphical elements may be selected by graphical element selection logic 262 as determined by association with the selected textual elements 306, a feature or descriptive statistic of the selected textual elements 306, a feature or descriptive statistic of one or more graphical elements within the symbol library 102, and/or a feature or descriptive statistic of the transcript extracted by statistical methods such as transcript processing logic 222. In some implementations, the output of the graphical element selection logic 262 comprises at least one graphical element and at least one textual element and may comprise additional data describing relationships between graphical and textual elements. This data corresponding to selected graphical elements 326 and/or selected textual elements 306 may then be processed as input by a tapestry composition logic 282 to render tapestry elements in a particular arrangement within a tapestry 204.

Whereas model embodiment 600 comprises a model architecture that is linear in nature and generalizable to a plurality of use cases, additional embodiments will now be introduced comprising a wide range of architectural shapes and/or a particular class or group of classes of tasks.

FIG. 7A shows an architectural level schematic of a tapestry generator model configured to generate a tapestry from a pre-defined template, in one implementation of the technology disclosed. In contrast to model embodiment 600, model embodiment 700A comprises a nonlinear architecture and is configured to generate a tapestry from a pre-defined tapestry template. The pre-defined tapestry template may comprise one or more rules, conditions, prioritization schemas, and/or computations related to the background design of the tapestry, the number of elements associated with the tapestry, the type of elements associated with the tapestry, the arrangement of elements associated with the tapestry, and/or the aesthetic choices associated with the tapestry.

In model embodiment 700A, transcript 201 first undergoes processing by a transcript processing logic 222 to obtain text segment(s) 304. The text segment(s) 304 are annotated or otherwise associated with textual feature(s) 324. A textual feature 324 may be a syntactic feature 344 or a semantic feature 364. As previously described, one or more rules or conditional logics govern the segmentation of text and feature extraction from text within transcript 201.

Within the text segment(s) 304, at least one text segment 304 obtained from transcript processing logic 222 (or an alternative source of transcript data, as previously described) associated with at least one textual feature 324 is processed by textual element selection logic 242. Textual element selection logic 242 selects textual elements 306. The graphical element selection logic 262 is then enabled to process the selected textual elements 306 to select graphical elements 326. In addition to processing data associated with the selected textual components 306, graphical element selection logic 262 is configured in model embodiment 700A to process input data associated with the text segment(s) 304. This example is one of many possible ensemble methods that can be used to fine-tune the output of a statistical model.

Language understanding tasks used by the technology disclosed are established in the literature as complex tasks demanding very large training datasets, high-dimensionality input data, and extensive computational cost. Ensemble methods can be employed to decrease the performance barriers associated with complex deep learning tasks, by breaking the model down into a plurality of smaller models. The smaller models (also referred to as "weak learners" or "base models") may have some or no overlapping architecture or task, and the outputs of the base models are aggregated into an ensemble model to obtain the final output. Ensemble models can decrease the stringency of standards for training data (an often necessary process due to the reality of observed data availability) while achieving a similar goal.

Aggregation of base models from a plurality of weak learner outputs into a decreased quantity of strong learner outputs generated by at least one ensemble model may comprise any transformation function such as summation or averaging, weighting, concatenation, bagging, boosting, and/or data compression. The selected graphical components 326 may be associated with the selected textual elements 306 by connection within symbol library 102, one or more algorithms computing a similarity metric or detecting a relationship as guided by one or more conditional rules, or manual labelling of the textual and graphical elements by a user. As an alternative or augmentation to an ensemble method, statistical models may also share knowledge via skip connections, residual connections, transfer learning, knowledge distillation, collaborative learning, or auxiliary training protocols may also be implemented within an implementation of the technology disclosed to perform multi-task computation.

A variety of combinations of network topologies (i.e., the topology, arrangement, and order in which model components are initiated and from where model components obtain input data) are described to emphasize that a plurality of model component combinations and permutations exist. In some embodiments, model components may be aggregated into an ensemble model, and/or a plurality of ordered architectures. In some implementations, textual element selection must be performed before graphical element selection can be performed. Or, textual element selection and graphical element selection may overlap within the architectural order of the tapestry generator model. Additionally, many combinations and permutations exist regarding non-ensemble multi-task procedures such as transfer learning or skip connections, as well as any of the described methods and their associated variations.

In the figures and discussed below, some broken gray lines are marked with a slant at each end connecting two model components. This notation indicates the presence of a particular multi-task structural component as described above. While the multi-task goal may be achieved through a variety of the above-referenced methods, for simplicity of description, these connection points will simply be described as "transfer learning connections." It is to be understood that the configurations explicitly described are not to be considered limitations of the architecture of the disclosed technology. Rather, the examples are intended to demonstrate the versatility of model architecture and the many possible combinations of multi-task architectures and components.

Graphical elements may be selected by graphical element selection logic 262 as determined by association with any of the selected textual elements 306, a feature or descriptive statistic of the selected textual elements 306, a feature or descriptive statistic of one or more graphical elements within the symbol library 102, and/or a feature or descriptive statistic of the transcript extracted by statistical methods such as transcript processing logic 222. In some implementations, the output of the graphical element selection logic 262 comprises at least one graphical element and at least one textual element and may comprise additional data describing a relationship between at least one graphical element and at least one textual element. This data corresponding to selected graphical elements 326 and/or selected textual elements 306 may then be processed as input by a tapestry composition logic 282 to render tapestry elements in a particular arrangement within a tapestry 204.

In model embodiment 700A, a broken grey line connects textual element selection logic 242. Graphical element selection logic 262 indicates that a transfer learning connection exists such that knowledge sharing may occur between textual element selection logic 242 and graphical element selection logic 262.

FIG. 7B shows an architectural level schematic of a tapestry generator model configured to generate a tapestry from a pre-defined template, within accordance with another implementation of the technology disclosed. As seen in model embodiment 700A and in contrast to model embodiment 600, model embodiment 700B comprises a nonlinear architecture. Model embodiment 700B is configured to generate a tapestry from a pre-defined template.

In contrast to model embodiment 700A, model embodiment 700B comprises the tapestry composition logic 282 as the ensemble model aggregating textual and graphical data from the textual element selection logic 242 and the graphical element selection logic 262. In addition to the ensemble structure, broken grey lines between the textual element selection logic 242 and the graphical element selection logic 262, the textual element selection logic 242 and the tapestry composition logic 282, and between the graphical element selection logic 262 and the tapestry composition logic 282 indicate a configured transfer learning connection to allow knowledge sharing.

Example Application of a Template-Guided Tapestry Generator

FIG. 8 shows a first plurality of example outputs obtained from various elements of the tapestry generator model. A short example of a pitch for automated tapestry generation is provided, just a couple hundred words. Suppose that transcript 802 was generated during a remote meeting between team members discussing tapestry generation, even though transitions between speakers are not indicated. The transcript of a meeting will be accompanied by meeting set-up information added by a facilitator or team member, for instance during planning for the meeting. In addition to the tab labelled text that holds the raw transcript, additional tabs exist to explore extracted tokens, key sentences, selected symbols, triples (a form of syntactic dependency), slots within the selected tapestry template, and the final tapestry. Excerpts of content from various tabs appear in other parts of FIG. 8.

Table 822 illustrates a subset of tokens extracted from transcript 802 following lemmatization. In addition to lemmatization of the tokens, the lemmas have been counted and ranked for frequency within the transcript, categorized into part of speech detected by dependency parsing, and symbols defined within a symbol library to be associated with the listed lemmas, where applicable. Not all tokens must result in the selection of a symbol if the token is not recognized by the symbol library.

The selected textual element in block 842 is one of a plurality of key sentences/phrases selected from transcript 802. In addition to the textual element, there is a list of symbols associated with the sentence, as well as the overall frequency of that symbol being selected within transcript 802. As shown in table 822, the tokens "people" and "conversation" are associated with the "3 people" symbol and "2 faces" symbol and occur more frequently than other token-associated symbols selected from the transcript lemmas. Block 842 includes a plurality of symbols associated with the textual element listed ("triskelion", "3 people", "eye", "calendar/clock", "2 faces", and "muses" symbols) as well as each symbol's respective total occurrence.

Of note, selection of a symbol can be driven by more than one lemma. Lemma-oriented table 822 lists that the lemma "conversation" is associated with the "2 faces" symbol six times. The symbol-oriented table 824 indicates ten lemma occurrences associated with the "2 faces" symbol, so one or more additional lemmas, other than "conversation" are associated with the "2 faces" symbol four times within transcript 802. The two highest frequency scoring symbols ("2 faces" and "3 people") associated with the textual element shown in block 842 are selected as graphical elements. Because the combined occurrences of the lemmas associated with the "2 faces" and "3 people" symbols within transcript 802 is eighteen, the textual element is assigned a total frequency score of 18. This score may be used as a proxy for the contribution of a textual element to the selection of graphical elements within the transcript. In addition to frequency, many additional scores can be computed for the ranking and selection of tapestry elements such as similarity scores or importance weights.

Although this example follows a particular rule schema allowing for two symbols to be selected from the example textual element in block 842, this example is not to be interpreted as a limiting condition. As detailed above, a plurality of alternative rules and parameters can influence the selection of both selected textual and graphical elements related to the tapestry layout and user preferences.

Table 824 comprises a plurality of symbols selected as graphical elements from transcript 802. As previously shown in table 822 and block 842, symbols may be associated with a particular part of speech or frequency occurrence of the symbol-associated lemma extracted from transcript 802. Additionally, we see that for the algorithmic layout method enacted within FIG. 8, symbol co-occurrence (the frequency that a symbol co-occurs with one or more other selected symbols in selected textual elements from a transcript) is also listed and related to the selection of graphical elements. The tapestry generation process shown in FIG. 8 is used to render the example tapestry shown in FIG. 9.

FIG. 9 shows a tapestry generated from a pre-defined template. Tapestry 900 comprises a natural landscape template, a meeting title and date, six rendered textual elements, and nine graphical elements, some of which are displayed juxtaposed with the lemma extracted from the transcript that resulted in selection of the respective graphical element. Textual and graphical elements were selected and rendered in the tapestry as governed by a set of tapestry template rules and statistical analyses described in system FIGS. 1 and 2.

Tapestry 900 comprises a plurality of tapestry elements arranged in pre-defined slot locations within a landscape template. The plurality of tapestry elements further comprises textual and graphical elements selected because of one or more features associated with at least one textual or graphical element. In some implementations, a feature that can be processed to determine the selection and arrangement of tapestry elements is associated with the outputs of one or more statistical analyses previously described. In some embodiments, a statistical analysis may generate an output comprising a quantitative metric associated with a textual or graphical element, such as a similarity metric in reference to a specific theme, an accuracy score, or a relative importance scalar value.

The quantitative metrics obtained from statistical analyses may be rank-ordered such that the ordering of tapestry elements within a list reflects the statistical likelihood that a given tapestry element will be selected for inclusion within a tapestry by a tapestry composition component within a tapestry generator. Moreover, a plurality of quantitative metrics may be aggregated for the rank-ordering of tapestry elements via a weighted ensemble of quantitative metrics, an operator such as summation of quantitative metrics, a descriptive statistic, a summary fingerprint, an alternative compressed data format of a plurality of metrics, or another form of data transformation and/or mapping. Qualitative features and statistical outputs may also be transformed into ordered or rank-ordered data. In some embodiments, classification data can be clustered or grouped by a given feature or set of features. A rank order can be determined for non-overlapping classes as determined by a set of rules. Consider a tapestry template or a tapestry layout in which the final tapestry must include either a tapestry element associated with either community or nature. If a tapestry element associated with communication is selected, then a tapestry element associated with community will be prioritized for inclusion over an element associated with nature.

The association between a particular tapestry element and a particular tapestry theme may be defined by a particular feature or statistical output associated with the particular tapestry element. Hence, within this example scenario, one can easily create a rank-ordered list of tapestry elements such that tapestry elements are ordered by likelihood of inclusion. Rank-ordered lists of tapestry elements may comprise textual elements, graphical elements, or both. Additionally, rank-ordered lists of tapestry elements may include a plurality of tapestry elements as determined by one or more shared features of the included tapestry elements other than content classification (i.e., textual or graphical content) such as theme, size, or the originating individual whose speech is associated with the tapestry elements. Finally, rank-ordered lists may be generated with respect to a complete transcript, a section of a transcript, a tapestry template or layout, a subsection of a tapestry template or layout, a particular slot or defined location within a tapestry, or a particular analysis output or metric.

Within tapestry 900, textual element 902 and graphical element 904 are emphasized with black boxes. Textual element 902 comprises the textual segment "vTapestry helps people see beyond the day to day conversation to the big picture", extracted from transcript 802. The analysis of the text within textual element 902 included the extraction of syntactic and semantic features such as included lexemes, frequency of important words, and association with themes and symbols, as described in FIG. 8. A plurality of additional statistical analyses can be performed on the text segment(s); however, only a select number are described for clarity. Of note, textual element 902 is selected as a key textual element to be rendered within tapestry 900 in part due to its association with the "2 faces" symbol and the "3 people" symbol, both of which have a total of eighteen associations within the transcript 802. In addition to textual element 902, the "2 faces" and "3 people" symbols are also included within the transcript; however, they are included in different locations per the template used to generate tapestry 900.

Within the selected tapestry template used to generate tapestry 900, textual element 902 is not placed directly next to either associated symbol (i.e., "2 faces" and "3 people"). If another template was used to construct tapestry 900 from transcript 802, an alternative arrangement may comprise alternative positioning of either textual element 902 or the symbols associated with textual element 902. Moreover, alternative templates may also not comprise textual element 902, the "2 faces" symbol, or the "3 people" symbol, as determined by the unique placement rules and prioritization schema of the respective template.

Other graphical elements, such as graphical element 904, are placed next to a specific word extracted from a particular text segment. The specific word extracted from the particular text segment is the associated word with graphical element 904 within the text segment. Per the template used to generate tapestry 900, only the lexeme associated with the text segment associated with graphical element 904 is included within tapestry 900. The lexeme associated with the graphical element, "become", can be a word that is verbatim from a text segment associated with the graphical element, a lexeme associated with a word that is verbatim from a text segment associated with the graphical element, or a thematic element classified from the text segment associated with the graphical element. However, as described similarly within the context of textual element 902, an alternative tapestry template may comprise the text segment associated with graphical element 904 in addition to, or in place of, graphical element 904.

Example tapestry 900 is generated and rendered as guided by a template that may be used to summarize a plurality of various transcripts. Other implementations generate a tapestry without the use of a template. Some of those implementations include a tapestry generator that leverages an algorithmic layout method configured to design a tapestry layout from an algorithm such as a machine learning model by processing the transcript and associated textual and graphical elements extracted from the transcript.

Tapestry Generation Using an Algorithmic Layout Method

FIG. 10A shows a block diagram for generating a tapestry from an algorithm-generated layout, in an example of the technology disclosed. A transcript 201 is obtained from a remote online meeting. This transcript may come from an automated or manually generated transcription of an audio file in the form of a text file. The transcript can contain a combination of textual elements, annotations, and temporal data, such as time stamps. A tapestry generator 1002 comprises transcript processing logic 222, tapestry layout selection model 1042, textual element selection model 1062, graphical element selection model 1082, and tapestry composition model 1092.

In some implementations, the tapestry generator 1002 renders a tapestry guided by a learned tapestry layout. Tapestry layout can be learned in response to the processing of the transcript 201. A plurality of parameters can be used for training to produce a circular layout. These parameters guide the arrangement of tapestry items in reference to a central theme. A temporal layout also can be trained. Then, the trained parameters guide the selection of tapestry items with regard to an order of events in time, such as the order in which textual elements are spoken.

Parameters for tapestry composition may also include a filter for the inclusion of one or more symbols, a prioritization schema for graphical element placement, or template compatibility rules. Applying compatibility rules, a particular arrangement within the algorithm-generated layout could be limited to a specific topology such that a particular tapestry element must be placed in reference to a second particular tapestry element. Or, a particular location within the layout could prioritize placement of one or more graphical elements over other graphical elements. A tapestry 204 is rendered, comprising one or more textual and graphical elements. Textual elements may include keywords, phrases, sentences, lemmas, or lexemes extracted from the transcript 201. Graphical elements may consist of symbols from symbol library 102 or transcript-prompted digitally synthesized symbols.

Next, the functional components of tapestry generator 104 are discussed in further detail. Transcript processing logic 222 extracts textual elements from the transcript 201. It also can extract additional data such as temporal data and annotation data. Temporal data can include time stamps, length of time speaking, and length of pauses in between participants speaking. Annotation data can include meeting commentary, additional notes from a meeting facilitator about the purpose of a meeting or participants within the meeting, or artificial intelligence-extracted data on participant sentiment or meeting quality. Tapestry layout selection model 1042 processes the extracted textual elements generated by transcript processing logic 222, additional metadata, and data generated by one or more statistical analyses of the transcript 201. The output generated by tapestry layout selection model 1042 includes one or more features or parameters associated with the design, generation, or rendering of a tapestry layout.

In some embodiments, the tapestry layout selection model may generate a thematic classification of the transcript 201 and apply a conditional compatibility logic for one or more tapestry elements in view of the transcript 201. For example, if one tapestry element is included within the tapestry layout, another tapestry element could be excluded from the tapestry layout. A different tapestry element could be required within the layout, based on a detected theme within the extracted textual elements. Textual element selection model 1062 selects a plurality of textual elements extracted by transcript processing logic 222 as textual elements of importance. Textual elements are identified as important as determined by one or more statistical analyses, as well as one or more features or rules associated with the tapestry layout data generated by tapestry layout selection model 1042.

The language model used for transcript processing or post-transcript processing analyses can be implemented in many ways, such as the embodiments described above. A person skilled in the art will recognize that these analytical models are examples and should not be considered a complete list of relevant models. The statistical analyses that constitute textual element selection model 1062 process one or more features associated with textual elements. These analyses can cover frequency of included words; lemma family and syntactic dependency of included words; various temporal metrics, such as length of speech comprising a textual element within the meeting transcript 201, time point within the meeting at which a textual element was first introduced, and so on; and linguistic analysis related to sentiment, importance, relevance, or complexity of a textual element.

The above-described statistical analyses will now be further expanded upon with a range of use cases and implementations. These statistical analyses are examples. A variety of additional analyses, as well as combinations and ensembles of the listed analyses, may be implemented without departing from the scope of the disclosed technology.

Statistical analysis of the sentiment of a textual element may include the extraction of opinion (e.g., excited, apprehensive, or uninterested) or connotation (e.g., positive, neutral, negative) of the textual element. Statistical analysis of the importance of a textual element may include the computation of a weight, coefficient, or scoring metric determined by a pre-defined set of one or more rules. Examples of these rule sets may include rules pertaining to a particular field addressed by meeting participants, a particular goal for the meeting associated with specific functions or metrics that pre-define accomplishment of the particular goal or a metric dependent on the output obtained from prior meetings.

Statistical analysis of the relevance of a textual element may include similar analyses to that of importance analysis. "Importance" refers the similarity or degree of relatedness to a set of one or more referential concepts, frameworks, or networks. A referential concept or framework for relevance analysis may be related to an area of study or a pre-defined rubric (e.g., a rubric set by a trusted governing authority or a supervisor within the group). A referential network may be a network graph in which the nodes are previous utterances within the transcript or previous transcripts from an earlier meeting, and edges related to the connectedness of each node (i.e., via a pre-defined rule system determining connectedness of a pair of nodes based on a metric for sentiment, similarity, agreement, et cetera). Moreover, a similar process or computation may be applied to quantify the complexity of a particular utterance. The described semantic and syntactic features extracted from the textual segment(s) of the transcript 201 can be generated from processing the output of the tapestry layout selection model 1042, and the outputs generated from textual element selection model 1062 may also be recursively fed back into the tapestry layout selection model 1042 via a skip connection, recurrent layer, or transfer learning.

After selection of important textual elements by the textual element selection model 1062, the selected textual elements are processed as input by graphical element selection model 1082, which selects one or more associated graphical elements. Graphical elements are selected from symbol library 102 (or, in certain embodiments, transcript-prompted digitally synthesized symbols) as graphical elements of importance. Graphical elements are identified as important as determined by one or more statistical analyses. The architecture that constitutes graphical element selection model 1082 comprises one or more components configured to process features associated with textual elements, such as pre-defined relationships between textual elements and symbols (as informed by graphic reporting methodology), frequency of textual elements associated with particular symbols, prioritization schema or weighting logics applied to a particular tapestry layout, and symbology analysis related to sentiment, importance, relevance, or complexity of a graphical element.

The graphical element selection model 1082 can be implemented using components of textual element selection model 1062, transfer learning informed by textual element selection model 1062, and/or non-overlapping computational components from textual element selection model 1062.

Textual and graphical elements are rendered within a particular tapestry layout by tapestry composition model 1092 from the selected textual elements and graphical elements. One or more layout features may be pre-defined as part of the template set-up, such as the number of tapestry elements, the position of tapestry elements, and allowable content within a layout (i.e., a textual element or a graphical element, the maximum length of a textual element or size of a graphical element, et cetera). Compatibility rules can establish a prioritization schema respective to the layout, transcript content, or user customization input data.

In some embodiments, if two symbols are both selected, but one symbol is prioritized over the second symbol resulting in the second symbol being excluded from the rendered tapestry, a particular slot always prioritizes one or more symbols over the remainder of the available symbols if the prioritized symbols are selected from the transcript. One or more tapestry compatibility rules may be customizable by user input, such as a custom prioritization schema for a particular set of textual or graphical elements.

The components within the disclosed tapestry generator model such as the tapestry layout selection model 1042, the textual element selection model 1062, the graphical element selection model 1082, or the tapestry composition model 1092 may also be associated with certain rule sets. These rule sets can include prioritization rule(s), compatibility rule(s), and inclusion rule(s). The rules may or may not be associated, directly or indirectly, with the output of a statistical analysis, the transcript processing logic 222, the tapestry layout selection model 1042, the textual element selection model 1062, the graphical element selection model 1082, or the tapestry composition model 1092. The examples above, in the context of a tapestry template-guided tapestry generation method, also can apply an algorithmic layout method. In this algorithmic layout approach, template rule sets can be considered analogous to an AI-generated layout rule set. The analogy between tapestry templates and tapestry layouts/layout methods/AI-generation of layouts is respective to the rules associated with the composition of a tapestry; however, other than this comparison, other features of the tapestry templates and tapestry layouts should not be assumed to be equivalent or translatable.

In another implementation of the technology disclosed, the arrangement of textual and graphical elements is determined by a tapestry layout selection model 1042 configured to further comprise a series of steps for arrangement. One or more algorithms, machine learning models, or factory methods can be implemented to generate the algorithmic layout method steps. To generate a algorithmic layout method, one or more input data sources are processed, such as the meeting transcript, output data from statistical analyses respective to the selection of textual or graphical elements, or user input parameters.

In yet another implementation, a user can customize a draft tapestry in a graphical user interface to interactively generate a tapestry. Following the generation of a draft tapestry (either using a tapestry template or a algorithmic layout method), a user can utilize a magic hand cursor with tool-tip options for altering textual and graphical elements in the draft tapestry. In some embodiments, a particular textual element may be altered to comprise alternative textual content, typography, or positioning. Alternatively, a particular graphical element may be altered to comprise alternative graphical content, designs, or positioning. In most embodiments of an interactive tapestry generation method, alterations offered to the user are guided by one or more statistical analyses or rule sets. In some embodiments, a particular graphical element may be selected from a plurality of symbols ranked by a scoring metric result by statistical analysis. Although the selected graphical element scored the highest in this scenario, as measured by the pre-determined metric, a set of alternative high-scoring graphical elements may also be presented to the user to replace the originally selected graphical element within the tapestry.

The set of alternative elements may be determined by a maximum number of graphical elements, a similarity score, or a categorization metric. An example of using a maximum number presents three best matches extracted from the list of symbols ranked by scoring metric or symbols within a target percentile range of the list of symbols ranked by scoring metric. A similarity score presents symbols that are determined to be at a target percent similarity, above a target percent similarity or within a target percent similarity range, as determined by one or more input features. A categorization metric presents symbols within the same group as the originally selected graphical element when symbols are grouped by one or more features. The configuration and deployment of a tapestry generator model comprising an interactive component are described in further detail beginning with FIG. 15A.

Numerous additional combinations of the components described can enhance the three examples of generation of a tapestry from a tapestry template, an algorithmic layout method, and interactive generation of a tapestry.

Real-time generation of a tapestry may involve incremental generation of certain components of the tapestry (e.g., one or more particular locations or sections within the tapestry, particular excerpts of the transcript, or particular textual or graphical elements extracted from the transcript or generated as output by a statistical analysis, logic, algorithm, or engine), incremental revision of certain components of the tapestry, or a combination of both. In addition to the real-time generation of a tapestry, the same described principles of incremental generation may apply to the generation of a tapestry at a later time point from a complete transcript. Embodiment and configuration of a tapestry generator model that processes transcript data in real-time are described in further detail below beginning with FIG. 16A.

While system 1000A is described with reference to particular logic components and statistical analyses, it is to be understood that the components are defined for convenience of description and are not intended to require a particular permutation of component parts. A user skilled in the art will recognize additional combinations and permutations of the above-described method components that result in the generation of a tapestry comprising textual and graphical elements selected from one or more rule systems.

Next, a method for tapestry generation leveraging artificial intelligence to guide the selection and placement of tapestry elements is described in further detail.

FIG. 10B shows a schematic flow diagram for a method of generating a tapestry from an algorithm-generated layout, in one example of the technology disclosed. First, an overview of the components of diagram 1000B will briefly be described. Next, individual components will further be broken down into subcomponents. Diagram 1000B comprises a flow schematic with component 222 for transcript processing, component 1042 for selection of a tapestry layout, component 1062 for extraction of textual elements within a transcript, component 1082 for the selection of graphical elements, component 1092 for the population of a tapestry layout, and finally, component 1024 for the generation of a tapestry.

Diagram 1000B begins with component 222 for processing of a meeting transcript. The process within component 222 within 1000B follows as described for component 222 within 200B. Briefly, component 222 comprises step 1006 for the removal of stop words and phrases, then step 1016 for the tokenization of textual content within the transcript 1004, allowing for further processing of the language data. Following tokenization, step 1026 comprises statistical analyses, as previously described, such as the lemmatization of the textual element tokens or detection of syntactic dependencies within the textual elements.

Component 1042 comprises the selection of a tapestry layout using a machine learning model. First, statistical analyses of the transcript and associated data 1004 guide the detection of a meeting theme in 1036. Next, the layout of the tapestry is designed in step 1038 as previously described within diagram 1000A.

Component 1062 comprises one or more statistical models for the selection of textual elements. Within component 1062, steps 1046 and 1056 involve the statistical analysis of detected entities and entity relationships within textual elements and textual element tokens identified within the transcript. As described above, a plurality of statistical analyses may be implemented to accomplish the ranking, scoring, or categorization of textual elements. The output of one or more statistical analyses carried out in step 1056 can be used to inform the selection of key textual elements (also referred to as "textual elements of importance", "textual elements of interest", or "selected textual elements").

All or some of the processes constituting steps 1006, 1016, 1036, 1038, 1046, and 1056 can be implemented within a language (e.g., NLP) model, or as a pre-or-post-processing step for a language model. Once textual elements have been selected, component 1082 selects a subset of graphical elements from symbol library 102. Component 1082 can further be broken down into steps 1066, 1076, and 1086. Step 1066 comprises the statistical analysis of detected entities and entity relationships within selected textual elements and the selected textual element features (e.g., tokens, lemmas, frequencies, and statistical metrics). As described above, a plurality of statistical analyses may be implemented to accomplish the ranking, scoring, or categorization of graphical elements.

In step 1076, the output of step 1066, as well as any additional analyses respective to the particular tapestry layout (e.g., algorithms associated with an algorithmic layout method or user customization parameters) inform the detection of symbols associated with the selected textual elements. The output of one or more statistical analyses carried out in steps 1066 and 1076 can be used to inform the selection of symbols from symbol library 102 as key graphical elements (also referred to as "graphical elements of importance", "graphical elements of interest", "graphical textual elements", "selected symbols", or "symbols of importance") within step 1086.

Following the selection of key textual elements and key graphical elements, component 1092 populates the tapestry layout with the selected textual or graphical elements in an appropriate composition. Appropriateness can be determined by one or more rules associated with a particular textual element, a particular graphical element, or a particular tapestry layout rule. Component 1092 comprises step 1096 for identification of appropriate arrangement for textual elements and graphical elements, respectively, and step 1098 for the arrangement of selected elements within the layout. As a result, component 1024 is enabled following step 1086 to generate a tapestry and thus, component 1092 culminates in a generated tapestry as the final output of diagram 1000B. Next, a plurality of particular embodiments for system 1000A will be described.

FIG. 11 shows a block diagram for training elements of the tapestry generator model 1000A, in an example of the technology disclosed. In one embodiment of the disclosed method, the architecture comprises a series of model components. The model components can include one or more statistical analyses, machine learning models, or deep learning networks as described within previous model architectures. First, the overall architecture will be described, followed by an overview of training procedures for various components. A transcript 201 undergoes processing via transcript processing logic 222, applying a language processing model to produce text segment(s) 304. The text segment(s) 304 are associated with textual feature(s) 324. A textual feature 324 may be a syntactic feature 344 or a semantic feature 364. Output 304 and the associated extracted features can be processed as input by tapestry layout selection model 1042 to generate a selected tapestry layout 1101. The tapestry layout 1101 comprises one or more rules related to the selection and placement of tapestry elements.

The selected tapestry layout 1101 and associated features may be processed as input by textual element selection model 1062 to generate at least one selected textual element 1111. Selected textual elements 1011 are then processed by graphical element selection model 1082. The resulting selected graphical elements 1121 are processed as input by the tapestry composition model 1092, and finally, the tapestry composition model 1092 generates a final tapestry 204.

A number of training protocols can be leveraged to train tapestry generator model 1000A. Each model component may be trained using ground truth data, while some models may be pre-trained or involve statistical analyses that do not require training. Additionally, certain model components may be trained as an ensemble rather than separately. A variety of training protocols can be reasonably implemented for training a multi-component model and training protocols are often quite task-specific; hence, the disclosed models may be trained in more than one method without departing from the scope or spirit of the technology. For the purpose of simplicity, one example training protocol will be elaborated upon.

Tapestry layout selection model 1042 may be trained using ground truth data comprising labeled tapestry layout data 1102. Within training data 1102, an observation including a text input 1112 and at least one associated text feature 1122 is labelled with one or more layout label 1114. A layout label includes one or more tapestry features 1124 associated with the composition of a tapestry layout. The tapestry layout selection model 1106 can be trained using the training dataset 1102 to generate a tapestry layout selection model-specific training error 1108. In one implementation, tapestry layout selection model 1106 is a neural network and the neural network is trained to minimize the training error 1108 via backpropagation. Many loss functions or error functions exist that can be implemented to obtain training error 1108, and the minimization of training error 1108 may have the goal of convergence of the loss function or reaching a particular pre-determined threshold (i.e., a pre-determined error value or percentage decrease in magnitude of the error 1108). The result of the detailed training process is a trained model for deployment, tapestry layout selection model 1042. For the following three model training procedures, the above-described training processes may also apply.

Textual element selection model 1126 can be trained on ground truth data 1132 The ground truth data is a labeled dataset of textual element data. Training data 1132 comprises a text input 1142 with one or more associated text featured 1152 paired with a particular metric label 1144 (e.g., a similarity score, an accuracy score, or a frequency) wherein the label 1144 comprises one or more values obtained for one or more metrics 1154. A trained model for textual element selection 1062 results.

Graphical element selection model 1146 can be trained on ground truth data 1162, using a labeled dataset of graphical element data. Training data 1162 comprises a text input 1172 with one or more associated text features 1182 paired with a particular graphical label 1174, such as a symbol within a dictionary or symbol library 102. The label 1174 can include symbols 1184 associated with the text input 1172. A trained model for graphical element selection 1082 results.

Tapestry composition model 1166 can be trained on ground truth data 1192. The ground truth data is a labeled dataset of tapestry element data, including textual elements, graphical elements, or both, as well as features associated with the tapestry elements. Training data 1192 comprises a tapestry element input 1183 with one or more associated features for one or more elements within an observation 1193 paired with a particular tapestry quality label 1185, such as a compatibility label or score related to a rule dictating which tapestry elements should be prioritized over other tapestry elements or which tapestry elements are allowed to co-exist within a tapestry. The label 1185 can include one or more values obtained for one or more quality metrics 1195.

A particular set of tapestry elements may be labeled as a "good" or "bad" tapestry, a "compatible" or "incompatible" tapestry, or an "effective" or "ineffective" tapestry. Moreover, the label may be a qualitative value ("good" or "bad") or the label may be a quantitative value (a score computed that correlates with quality in view of one or more computational functions). A trained model for tapestry composition 1092 results.

Next, additional architectures for the tapestry generator model 1000A will be given to illustrate the versatility of the disclosed method. Within each example architecture, the principles described related to the composition, configuration, and training of model components apply. More specifically, details provided for model embodiments 700A and 700B, such as methods of transfer learning and machine learning algorithms, apply to the below model embodiments.

FIG. 12A shows an architectural level schematic of a tapestry generator model configured to generate a tapestry from an algorithm-generated layout, within accordance with one implementation of the technology disclosed. The configuration of model embodiment 1200A is as follows. A transcript 201 is processed by transcript processing logic 222 to produce the segmentation of text 304 with associated feature(s) 324, the associated feature(s) 324 further comprising syntactic features 344 and/or semantic features 364. Text segment(s) and associated data 304 may be processed as input simultaneously by tapestry layout selection model 1042, textual element selection model 1062, and graphical element selection model 1082.

Dashed grey lines between tapestry layout selection model 1042, textual element selection model 1062, and graphical element selection model 1082 indicate connections for knowledge sharing, as in embodiments 700A and 700B. Respective outputs for the selected tapestry layout 1101, selected textual element(s) 1111, and selected graphical element(s) 1121 may be generated from some combination or permutation of data associated with transcript processing logic 222, tapestry layout selection model 1042, textual element selection model 1062, and/or graphical element selection model 1082. Data corresponding to the selected tapestry layout 1101, selected textual element(s) 1111, and selected graphical element(s) 1121 can all be processed by the tapestry composition model 1092 to generate tapestry 204.

FIG. 12B shows an architectural level schematic of a tapestry generator model configured to generate a tapestry from an algorithm-generated layout, within accordance with another implementation of the technology disclosed. In contrast to model embodiment 1200A, model embodiment 1200B involves a slightly different ordering of model elements. For both model embodiments 1200A and 1200B, a plurality of nonoverlapping tapestries may be generated as output from transcript 201.

Within model embodiment 1200B, transcript 201 is processed by transcript processing logic 222 to produce the segmentation of text 304 with associated feature(s) 324, the associated feature(s) 324 further comprising syntactic features 344 and semantic features 364. Text segment(s) and associated data 304 may be processed as input first by tapestry layout selection model 1042, generating selected tapestry layout 1101. The selected tapestry layout 1101 and associated data may be processed as input by textual element selection model 1062 and graphical element selection model 1082. Dashed grey lines between tapestry layout selection model 1042 and tapestry composition model 1092 indicate connections for knowledge sharing, such that respective outputs for the selected tapestry layout 1101 may be processed by tapestry composition model 1092 in addition to outputs generated by textual element selection model 1062 and graphical element selection model 1082. Finally, data corresponding to the selected textual element(s) 1111 and selected graphical element(s) 1121 can be processed by the tapestry composition model 1092 to generate tapestry 204.

In each described model example, tapestry 204 is listed as an output for the model. This tapestry 204 may comprise any rendered tapestry comprising any inclusion, arrangement, design, or placement of at least one tapestry element. The output tapestry of a first model embodiment and the output tapestry of a second model embodiment may comprise one or more overlapping features or elements and may also comprise one or more nonoverlapping features or elements.

Example Application of an Algorithmic Layout-Guided Tapestry Generator

FIG. 13 shows a second plurality of example outputs obtained from various elements of the tapestry generator model. A short example based on a transcript from a pitch for automated tapestry generation is provided, similar to the pitch provided within example 800. Suppose that transcript 1302 was generated during part of a remote meeting between team members discussing tapestry generation, even though transitions between speakers are not indicated. The transcript of a meeting will be accompanied by meeting set-up information added by a facilitator or team member, for instance during planning for the meeting. In addition to the block that holds the raw transcript, additional block exist to explore extracted tokens, key sentences, selected symbols, triples (a form of syntactic dependency), slots within the selected tapestry template, and the final tapestry. Excerpts of content from various tabs appear in other parts of FIG. 13.

Table 1322 illustrates a subset of text segment(s) extracted from the transcript 1302 following natural language processing and textual element analysis via models such as transcript processing logic 222 and textual element selection model 1062. A list of symbols for a text segment is identified from symbol library 102. A symbol may be associated with the text segment via a token extracted from the text segment or a particular feature of the text segment such as a theme, similarity score, or sentiment category. Not all words within the text segment, nor any words within any text segment, must correspond with a symbol within symbol library 102.

The two selected textual elements in block 1322 are examples of textual elements from key sentences/phrases selected from transcript 1302. In addition to the textual elements, there is a weighted importance score as determined by one or more machine learning models within the tapestry model generator as illustrated within diagrams 1000A, 1000B, and 1100. The list of symbols associated with the sentence, as well as the overall frequency of that symbol being selected within transcript 802, also have corresponding importance scores listed. These scores are obtained by computing syntactic features such as frequency, data associated with speakers identified within the transcript (e.g., number of speakers within the meeting who refer to a particular symbol, role of speakers who refer to a particular speaker, time stamp within the conversation at which a particular symbol is referred to), or part of speech analysis. The scores may also be obtained by computing semantic feature(s) such as relevance (e.g., a similarity score to a particular theme or analysis) or accuracy (e.g., factual content of a particular utterance or a similarity score to a particular target goal).

A variety of methods exist within language understanding techniques to leverage feature engineering and data transformation processes for the vectorization and/or one-hot-encoding of linguistic data to obtain numerical data such as a feature vector, matrix, encoded image, or other data compression formats so that analysis of terms for the purpose of computing similarity or extracting semantic data is possible.

Although many symbols are identified to be relevant to the textual elements listed within 1322, and the textual elements listed within 1322 have been selected as key textual elements, it is not a requirement for either the textual elements listed within 1322 to be included within the final tapestry, nor is it a requirement of the related symbols within 1322 to be included within the final tapestry regardless of the inclusion of the textual elements. Statistical analyses of the data within 1302 can result in more prospective tapestry elements processed for feature extraction, feature engineering, or selection than can be used. Inclusion and arrangement of tapestry elements can be performed in view of one or more additional prioritization or conditional compatibility rules.

In one implementation, the model components produce various outputs corresponding to the overall tapestry theme, textual elements associated with the transcript, or graphical elements associated with the transcript as described in diagrams 1000A, 1000B, 1100, 1200A, and 1200B. These outputs then undergo further analysis from the tapestry composition model 1092 for one or more additional inclusion filters to determine the final content and arrangement of tapestry elements. Within table 1322, the first textual element listed is associated with a blue ribbon symbol. However, rules within the tapestry composition model 1092 may result in the exclusion of the blue ribbon symbol from the final tapestry. This may be due to a quantitative rule such as a minimum score threshold that the blue ribbon score of 1 does not meet, or a qualitative rule related to the tapestry theme or tapestry layout. A particular theme or particular layout design may not allow inclusion of the blue ribbon symbol as a graphical element.

As previously described for example 800, within example 1300, the relationship between the extracted textual elements and the associated graphical elements is not a linear one-to-one relationship. A particular token, lemma, or additional extracted feature may appear more than one time in more than one location within the transcript. A particular symbol within the symbol library 102 may be related to more than one text segment within the transcript. Thus, the network mapping of textual element-to-graphical element relationships, along with location and frequency statistics, is an important component of tapestry composition. In some embodiments, within block 1324, graphical elements are listed corresponding to a "tree" symbol, a "profile with brain" symbol, and a "3 people" symbol.

The "tree" symbol is listed in 1342 as associated with a verb. In some implementations, the features associated with the part of speech of a particular token or lemma are processed as input to generate a related symbol as output. Hence, a "tree" symbol will be produced as output if the processed input comprises at least one similar thematic component to the thematic components associated with the "tree" symbol in symbol library 102 and the processed input comprises a verb. Other implementations may not process part of speech features and may process other syntactic features such as phonetic features (i.e., sound) or grammar features (i.e., tense). Additionally, the number of occurrences of text segments that were processed by graphical element selection model 1082 to produce the tree symbol are listed. Similarly, the "profile with brain" and "3 people" symbols are listed with respective occurrences and part of speech features, obtained from statistical analyses of the transcript 1302.

This example follows a particular rule schema allowing for two symbols to be selected from the example textual element in block 1082 but is not to be interpreted as a limiting condition. A plurality of alternative rules and parameters can influence the selection of both selected textual and graphical elements related to the tapestry layout and user preferences. Additionally, we see that for the tapestry generation method enacted within FIG. 13, symbol co-occurrence (frequency that a symbol co-occurs with one or more other selected symbols in selected textual elements from a transcript) is also listed and related to selection of graphical elements. These three features, as well as other not shown features previous referenced, may also be processed as input by a tapestry composition model 1092.

Table 1342 comprises a plurality of symbols selected as graphical elements from transcript 1302. As previously shown in table 1322 and block 1324, symbols may be associated with a particular part of speech or frequency occurrence of the symbol-associated lemma extracted from transcript 1302. Similar features such as associated themes and associated text segment(s) (both selected and unselected) are listed, as described previously for example 800. The tapestry generation process shown in FIG. 13 is used to render the example tapestry shown in FIG. 14.

FIG. 14 shows a tapestry generated from an algorithm-generated layout. The artificial intelligence models used to generate tapestry 1400 follow processes described in diagrams 1000A, 1000B, 1100, 1200A, and 1200B and the generation of tapestry 1400 results from processing of the statistical data from example 1300. Tapestry 1400 comprises a meeting title and date, a plurality of rendered textual elements, and a plurality of graphical elements, some of which are displayed juxtaposed with the particular lemma extracted from the transcript that resulted in the respective graphical element to be selected. Textual and graphical elements were selected and rendered in the tapestry composition model 1092 as guided by one or more rules associated with the output of tapestry layout selection model 1042.

In some implementations, a feature that can be processed to determine the selection and arrangement of tapestry elements is associated with the outputs of one or more statistical analyses previously described. In some embodiments, a statistical analysis may generate an output comprising a quantitative metric associated with a particular textual or graphical element, such as a similarity metric in reference to a specific theme, an accuracy score, or a relative importance scalar value.

The quantitative metrics obtained from statistical analyses may be rank-ordered such that the ordering of tapestry elements within a list reflects the statistical likelihood that a given tapestry element will be selected for inclusion within a tapestry by a tapestry composition component within a tapestry generator. Moreover, a plurality of quantitative metrics may be aggregated for the rank-ordering of tapestry elements via a weighted ensemble of quantitative metrics, an operator such as summation of quantitative metrics, a descriptive statistic, a summary fingerprint or an alternative compressed data format of a plurality of metrics, or another form of data transformation and/or mapping.

Qualitative features and statistical outputs may also be transformed into ordered or rank-ordered data. In some embodiments, classification data can be clustered or grouped by a given feature or set of features, and a rank-order can be determined for non-overlapping classes as determined by a set of rules. Consider a tapestry layout in which the final tapestry must comprise a tapestry element associated with either community or nature. If a tapestry element associated with communication is selected, then a tapestry element associated with community will be prioritized for tapestry inclusion over the element associated with nature.

The association between a tapestry element and a tapestry theme may be defined by a particular feature or statistical output associated with the tapestry element. Hence, within this example scenario, one can easily create a rank-ordered list of tapestry elements such that tapestry elements are ordered by likelihood of inclusion. Rank-ordered lists of tapestry elements may comprise textual elements, graphical elements, or a combination of both textual and graphical elements.

Rank-ordered lists of tapestry elements may include a plurality of tapestry elements as determined by one or more shared features of the included tapestry elements other than content classification (i.e., textual or graphical content) such as theme, size, or the originating individual whose speech is associated with the tapestry elements. Finally, rank-ordered lists may be generated with respect to a complete transcript, a section of a transcript, a tapestry layout, a subsection of a tapestry layout, a particular slot or defined location within a tapestry, or a particular analysis output or metric.

Within tapestry 1400, textual element 1402 and graphical element 1404 are emphasized with black boxes. Textual element 1402 comprises the textual segment "We get information as well as a feeling about the conversation" extracted from transcript 1302. The analysis of the text within transcript 1302 included the extraction of syntactic and semantic features such as included lexemes, frequency of important words, and association with themes and symbols, as described in FIG. 13. A plurality of additional statistical analyses can be performed on text segment(s); however, only a select number are described for clarity. In addition to textual element 1402, the "2 faces" symbol is also included within the transcript with the word "conversation" extracted from textual element 1402; however, they are included in different locations per the template used to generate tapestry 1400. Within the algorithmic layout method used to generate tapestry 1400, textual element 1402 is not placed directly next to the associated symbol (i.e., "2 faces") but in the event that another layout method was used to construct tapestry 1400 from transcript 1302, an alternative arrangement may comprise alternative positioning of either textual element 1402 or the symbol(s) associated with textual element 1402. Moreover, alternative templates may also not comprise textual element 1402 or the "2 faces" symbol, as determined by the unique placement rules and prioritization schema of the respective template.

Other graphical elements, such as graphical element 1404, are placed next to a specific word extracted from a particular text segment. The specific word extracted from the text segment is thereby associated with graphical element 1404 within the text segment. Per the template used to generate tapestry 1400, only the particular lexeme associated with the text segment associated with graphical element 1404 is included within tapestry 1400. The lexeme associated with the graphical element, "become", can be a word that is verbatim stated within the text segment, a lexeme associated with a word stated within the text element, or a thematic element classified from the text segment. However, as described similarly within the context of textual element 1402, an alternative tapestry template may comprise the text segment associated with graphical element 1404 in addition to, or in place of, graphical element 1404.

A brief comparison of tapestry 900 and tapestry 1400 illustrates the generalizability and the versatility of the technology disclosed. Tapestry 900 and tapestry 1400 are generated via the processing of the same meeting transcript data using different tapestry generator implementations. Tapestry 900 was generated using a pre-defined template using many of the rules specific to the template itself, which and do not change in response to the input transcript. Alternatively, tapestry 1400 is the product of a tapestry generator comprising an AI-generated layout wherein many of the rules are specific to the transcript itself and do not follow any particular slot-based organization system. The template used for tapestry 900 has a landscape theme. Only specific symbols are allowed and must be placed in certain locations. In contrast, the layout method generated for tapestry 1400 follows a set of rules defined with respect to the content of the transcript. Thus, whereas both tapestries are primarily influenced by the content of the transcript, the difference in composition results in different final tapestries. As a result, some tapestry elements and tapestry features are overlapping between tapestry 900 and tapestry 1400 but other tapestry elements and tapestry features are nonoverlapping.

In some embodiments, graphical element 904 and graphical element 1404 share similar placement, design, and associated features (e.g., inclusion of the lexeme "become"). The textual element "The quality of interaction between people contributes to the meaning of the vTapestry, which reflects the coherence of the conversation" is included within both tapestries with similar locations and design. However, most other textual elements and symbols within tapestry 900 and tapestry 1400 are nonoverlapping. Hence, it is apparent that numerous tapestries can be generated from a single transcript and a comparable number of goals can be achieved with the disclosed method. Through the use of differing templates, input parameters, model architectures, and model hyperparameters, different implementations result in differing tapestry outputs with various advantages and disadvantages in terms of theme, aesthetic value, purpose, and emphasis.

In addition to the illustrated tapestry 1400, which resembles a mural, additional tapestry layouts and methods may be generated by or embodied in model 1000A. In some embodiments, resulting tapestry layouts may include a circular tapestry layout comprising at least one textual or graphical element centered within the tapestry surrounded by a plurality of textual and graphical elements, a linear tapestry layout comprising a plurality of textual and graphical elements organized along an axis respective to one or more properties, or a tabular tapestry layout comprises a plurality of textual and graphical elements organized along two or more axes respective to one or more properties.

A circular tapestry layout may comprise elements arranged by their degree of relatedness to a central theme. This can be determined by sentiment analysis, relatedness analysis, or a quality metric influenced by pre-defined criteria. A linear tapestry layout can be arranged by a temporal property. Time-linearity can be reflected with respect to the progress of the meeting, the progress of an overall pre-defined process an enterprise aims to traverse as a means to achieve a goal, or the chronology of a discussed event. Alternatively, a pre-defined metric can produce a linear arrangement over a range of output values such as a measure of discussion quality, discussion progress, or a particular sentiment within the meeting such as bias towards a particular topic, degree of positivity or negativity of extracted textual elements from the transcript, or a suggested flowchart for a process as determined by extracted textual elements from the transcript. A tabular tapestry layout arranges elements in a grid-like structure, where elements may be arranged within so-called columns and rows guiding a pre-determined grouping scheme, such as clustering or categorization of textual and graphical elements by sentiment, quality, topic, or respective speaker. The above examples are listed for the convenience of description. The technology disclosed by the embodiments of layout methods listed.

In some embodiments, the population of a tapestry template or generation of a algorithmic layout method is generated from a machine learning model trained on previously generated tapestries. Certain embodiments may select symbols from a symbol library. In contrast, other embodiments may select transcript-prompted synthesized symbols generated by an image generation logic configured to process the transcript, textual elements extracted from the meeting transcript, or an output generated by the statistical analyses of the textual elements.

In addition to the wide variety of tapestry formats and generation options, further tapestry versatility is possible using real-time generation of a tapestry, with iterative changes as new transcript data is processed, optionally combined with post-transcript completion processing tapestry alteration by user changes to certain components of the tapestry and other features within the tapestry. These options will now be elaborated upon further.

Interactive Tapestry Generation

FIG. 15A shows an example block diagram 1500A for interactively generating a tapestry. In this example, the tapestry generator used is similar to tapestry generator 1002. Machine learning models are configured to select textual elements and graphical elements from a transcript and generate a tapestry. Tapestry generator 1002 may comprise the architecture described within model embodiment 1100, 1200A, 1200B, or an alternative arrangement of model components. The model components within tapestry generator 1002 may also comprise a variety of different machine learning models in certain embodiments, as described previously.

Additionally, system 1500A need not comprise a tapestry generator model similar to system 1000A and may rather comprise a tapestry generator model similar to system 200A, in which a particular template guides generation of a tapestry. However, for simplicity, system 1500A will be described within the context of an embodiment comprising tapestry generator 1002.

A transcript 201 is obtained from an online remote meeting. This transcript may come from an automated or manually generated transcription of an audio file in the form of a text file. The transcript can contain a combination of textual elements, annotations, and temporal data, such as time stamps. A tapestry generator 1002 comprises transcript processing logic 222, tapestry layout selection model 1042, textual element selection model 1062, graphical element selection model 1082, and tapestry composition model 1092. In some implementations, the tapestry generator 1002 renders a tapestry as guided by a learned tapestry layout. The tapestry layout can be learned in response to the processing of the transcript 201, including a plurality of parameters respective to a particular tapestry layout. For instance, for a circular layout, the parameters guide the arrangement of tapestry items in reference to a central theme. For a temporal layout, the parameters guide the selection of tapestry items via an order of events in time, such as order in which textual elements are spoken).

Parameters for tapestry composition may also include a filter for the inclusion of one or more symbols, a prioritization schema for graphical element placement, or template compatibility rules (i.e., a particular arrangement within the algorithmic layout may only comprise a specific topology such that a particular tapestry element must be placed in reference to a second particular tapestry element, or a particular location within the layout prioritizes placement of one or more graphical elements over other graphical elements). A tapestry 204 is rendered, comprising one or more textual and graphical elements. Textual elements may include keywords, phrases, sentences, lemmas, or lexemes extracted from the transcript 201. Graphical elements may consist of symbols from symbol library 102 or transcript-prompted digitally synthesized symbols.

Following the generation of tapestry 204, a tapestry alteration logic 1502 receives a user selection of a tapestry alteration and generates the selected alteration. A tapestry alteration may include an alteration to a textual or graphical element or a tapestry layout rule. The alteration may affect a content, placement, or design feature of a particular tapestry element or the particular algorithmic layout method. The user may select a textual element within a tapestry using a magic hand cursor, invoking the presentation of a list of tool-tip options. The tool-tip options further comprise alteration options for the textual element such as alternative content (i.e., a rank-ordered list of the next-most-likely textual elements to be included for the particular tapestry element or algorithmic layout method, as determined by statistical analysis), alternative placement (i.e., movement of the textual element to a differing location or alignment within the tapestry), or alternative design (i.e., changes to the typography, font, font size, or font color) of the textual element.

Alternatively, the user may select a graphical element within the tapestry using the magic hand cursor, invoking the presentation of a list of tool-tip options. The tool-tip options further comprise alteration options for the graphical element such as alternative content (i.e., a rank-ordered list of the next-most-likely graphical elements to be included for the particular tapestry element or algorithmic layout method, as determined by statistical analysis), alternative placement (i.e., movement of the graphical element to a differing location or alignment within the tapestry), or alternative design (i.e., changes to the aesthetic design, size, or color) of the graphical element.

Finally, the user may also alter a particular rule within the algorithmic layout method within the tapestry using the magic hand cursor. The tool-tip options further comprise alteration options such as adjustment of a conditional compatibility rule (i.e., allowing a symbol to be included that was previously restricted), the introduction of a new prioritization rule (i.e., requiring a particular symbol or class of symbol to be included) or increasing the number of textual elements included within the tapestry.

When a tapestry element or algorithmic layout method rule is altered, one or more additional tapestry features or tapestry elements may also require alteration to comply with one or more tapestry layout rules (or, alternatively, when using a tapestry template, to comply with one or more tapestry template rules). In contrast to a simple editor interface, the disclosed system 1500A allows for intelligent design of tapestries combining user input with machine learning analyses. While allowance of user input increases the personalization and fine-tuning capacity of the disclosed tapestry generator, integration with the statistical models of tapestry generator 1002 provides a "guard rail" system enforcing the integrity, forgiveness, and learnability of the model disclosed reinforcing the robustness and accessibility of the tapestry generator.

More specifically, alteration options presented to the user are restricted by rank-ordered lists (e.g., a rank-ordered list of textual elements ranked by similarity to the detected meeting theme. The included textual element may the highest ranked element and the alteration options include the next-highest ranked elements), pre-determined thresholds. The number of alteration options presented can be limited by a minimum or maximum number of alteration options, a range of alteration options such as 1-3 alteration options, or a percentage of alteration options such as the top ten percent of textual elements within a rank-ordered list. Algorithmic layout method rules can identify alteration options that only include allowable content for the tapestry as determined by the layout method rules. Rules can exclude content such as specific symbols or words deemed incompatible with the tapestry layout.

Once an alteration option is selected, the tapestry generator 1002 process is repeated in view of the alteration change. The alteration change may be treated similarly to a rule or restriction of the layout method. Consider a draft tapestry comprising a draft element and a user selection of a revised element to replace the draft element. The tapestry generator 1002 will recompute the tapestry generation. A new rule is effectively introduced within the layout that requires the revised element to be included within the tapestry per the composition defined by the alteration option (i.e., with the same content, placement, and design dictated by the selected alteration option). Selection of the revised tapestry element may affect compatibility of other tapestry elements.

In some embodiments, the algorithmic layout method generated by the tapestry layout selection model 1042 may require some element to be included if the revised element is included, or may require that some other element not be included. It may require that some arrangement must be followed, such as selection of a temporal-themed element initiates a timeline arrangement of elements, or selection of a nature-themed element initiates inclusion of at least one other nature-themed element. Likewise, a second alteration initiated by the user-selected alteration and generated by the tapestry generator may also result in a third required alteration, and so on. Thus, the cycle routing from tapestry generator 1002 to a generated tapestry 204 to tapestry alteration logic 1502 back to tapestry generator 1002 may repeat n times. Here, n is the number of iterations in which the alteration violates a particular tapestry layout prioritization rule, compatibility rule, or inclusion rule. After n cycles, once the tapestry meets all required tapestry layout rules (i.e., the set of all tapestry elements within the current tapestry version, including any altered and non-altered tapestry elements, do not violate any tapestry layout rules), the tapestry alteration logic 1502 will not result in alteration of any further tapestry elements and progresses to the stop function 1504. After reaching stop, no further alterations to tapestry 204 are made.

In some use cases for certain embodiments of system 1500A, the user makes a single selected alteration to the tapestry, resulting in one downstream alteration. In other use cases, the user makes a single selected alteration to the tapestry, resulting in multiple downstream alterations. In yet other use cases, the user makes a single selected alteration, which results in no further downstream alterations because the user-selected alteration has not affected any tapestry composition requirements. For many embodiments of system 1500A, following the end of an alteration loop invoked by a first user-selected alteration processed by tapestry alteration logic 1502, a second user-selected alteration process is initiated, resulting in another alteration loop.

Next, a method for tapestry generation leveraging artificial intelligence in an interactive algorithmic layout method to guide the selection and placement of tapestry elements is described in further detail.

FIG. 15B shows a schematic flow diagram for interactively generating a tapestry, in an example of the technology disclosed. First, an overview of the components of diagram 1500B will briefly be described. Next, individual components will further be broken down into subcomponents. Diagram 1500B comprises a flow schematic with similar components to diagram 1000B, including component 222 for transcript processing, component 1042 for the selection of a tapestry layout, component 1062 for extraction of textual elements within a transcript, component 1082 for the selection of graphical elements, component 1092 for the population of a tapestry layout, and finally, component 1024 for the generation of a tapestry.

Diagram 1500B begins with component 222 for processing of a meeting transcript. The process that component 222 within 1500B follows is as described for component 222 within 200B and 1500B. Briefly, component 222 comprises step 1506 for the removal of stop words and phrases, then step 1516 for the tokenization of textual content within the transcript 204, allowing for further processing of the language data. Following tokenization, step 1526 comprises statistical analyses, as previously described, such as lemmatization of the textual element tokens or detection of syntactic dependencies within the textual elements.

Component 1542 comprises the selection of a tapestry layout using a machine learning model. First, statistical analyses of the transcript and associated data 204 guide the detection of a meeting theme in 1536. Next, the layout of the tapestry is designed in step 1538 as previously described within diagram 1500A.

Component 1562 comprises one or more statistical models for the selection of textual elements. Within component 1562, steps 1546 and 1556 involve the statistical analysis of detected entities and entity relationships within textual elements and textual element tokens identified within the transcript. As described above, a plurality of statistical analyses may be implemented to accomplish the ranking, scoring, or categorization of textual elements. The output of one or more statistical analyses carried out in step 1556 can be used to inform the selection of key textual elements (also referred to as "textual elements of importance", "textual elements of interest", or "selected textual elements").

All or some of the processes constituting steps 1506, 1516, 1536, 1538, 1546, and 1556 can be implemented within a language understanding model, or as a pre- or post-processing step. Once textual elements have been selected, component 1582 selects a subset of graphical elements from symbol library 152. Component 1582 can further be broken down into steps 1566, 1576, and 1586. Step 1566 comprises the statistical analysis of detected entities and entity relationships within selected textual elements and selected textual element features (e.g., tokens, lemmas, frequencies, and statistical metrics). As described above, a plurality of statistical analyses may be implemented to accomplish the ranking, scoring, or categorization of graphical elements.

In step 1576, the output of step 1566, as well as any additional analyses respective to the particular tapestry layout (e.g., algorithms associated with an algorithmic algorithmic layout method or user customization parameters) inform the detection of symbols associated with the selected textual elements. The output of one or more statistical analyses carried out in steps 1566 and 1576 can be used to inform the selection of symbols from symbol library 152 as key graphical elements (also referred to as "graphical elements of importance", "graphical elements of interest", "graphical textual elements", "selected symbols", or "symbols of importance") within step 1586.

Following the selection of key textual elements and key graphical elements, component 1592 populates the tapestry layout with the selected textual or graphical elements in an appropriate composition. Appropriateness may be determined by one or more rules associated with a particular textual element, a particular graphical element, or a particular tapestry layout rule. Component 1592 comprises step 1596 for the identification of appropriate arrangement for textual elements and graphical elements, respectively, and step 1597 for the arrangement of selected elements within the layout. As a result, component 1522 is enabled following step 1586 to generate a tapestry. At this stage, tapestry alteration logic 1502 processes the generated tapestry and a user-selected alteration option for a particular tapestry element. More specifically, tapestry alteration logic 1502 comprises step 1598, a decision point at which a user may select a candidate replacement for a tapestry element they intend to alter. Once an element has been selected for alteration, as well as the specific alteration choice (e.g., an alternative textual element or an alternative positioning of a graphical element), downstream elements are altered in step 1599. Within step 1599, the process is routed cyclically back to the tapestry layout selection model 1042.

At this stage, depending on the new rule introduced by the user (i.e., a new tapestry element must be included within the tapestry), the output of at least one model component may be altered, thus altering the final generated tapestry. The previously designed tapestry layout by tapestry selection model 1042 may no longer be compatible with the user-selected alteration. In some embodiments, if the initially selected algorithmic layout method dictates that all graphical elements must share a community theme feature, and the user-selected candidate replacement tapestry element is not associated with the community theme. Thus, a new algorithmic layout method will be generated to accommodate the altered element. As a result, the generated tapestry can be fine-tuned with new information provided by the user in the format of a new tapestry generation rule, resulting in a new output.

Similarly, if a compatibility rule states that a draft tapestry element initially included within the tapestry is not compatible with the user-selected candidate replacement tapestry element, inclusion of the user-selected candidate replacement tapestry element will trigger the replacement of the draft tapestry element that is not compatible with the user-selected candidate replacement. Alternatively, a prioritization rule may state that an alternative tapestry element is more compatible with the user-selected candidate replacement tapestry element than the current draft tapestry element initially included within the tapestry, resulting in the current draft tapestry element being replaced with the alternative tapestry element to satisfy the prioritization rule. In some scenarios, the candidate replacement tapestry element selected by the user for one particular tapestry element at a first location may already be included within the tapestry at a non-overlapping second location. Thus, selection of the candidate replacement tapestry element at the first location will automatically initiate selection of an alternative tapestry element for the second location.

In another implementation, the selected tapestry layout or template may not be changed by the user. Thus, the user cannot alter the compatibility rules, prioritization rules, or inclusion rules related to the tapestry layout, and the candidate replacement tapestry items presented as alteration options to the user will also be restricted by the selected tapestry element. In the previous example, the user was presented with a candidate replacement tapestry element that was not compatible with the previously selected tapestry layout, initiating a change to the tapestry layout. In this embodiment, candidate replacement tapestry elements that are presented to the user must be compatible with the selected tapestry layout and all tapestry alterations will be compliant with the set of rules corresponding to the selected tapestry elements.

In addition to the restriction of candidate replacement tapestry elements, the integrity of the tapestry content and quality is further fortified in some embodiments by a version control component that records alterations to the tapestry. The version control component may record some or all alterations, the order of alterations, the user responsible for an alteration, or the timestamp at which an alteration was made. Moreover, the version control component may allow for reversion back to a previous version of the tapestry prior to one or more alterations.

Next, a plurality of architectures within particular embodiments for system 1500A will be described.

Model Architectures for Interactive Tapestry Generation

FIG. 16A shows an architectural level schematic of a tapestry generator model configured to interactively generate a tapestry, within accordance with one implementation of the technology disclosed. In contrast with previous model embodiments, model embodiment 1600A comprises a recurrent neural network structure to illustrate alternative architectures within the scope of the technology disclosed. In an RNN, the nodes within layers of individual model components, or node layers of connected model components, are cyclically connected such that the output of a network node can affect subsequent input to the same node. The rounded dot-dashed black arrows indicate locations in which a recurrent connection may be introduced. Although a limited set of recurrent connections are illustrated within the diagram of model embodiment 1600A for clarity, a user skilled in the art will recognize that model 1600A may comprise a fully recurrent neural network (wherein the outputs of all neurons are connected to the inputs of all neurons), a simple recurrent network (wherein fixed back-connections save a copy of previous values of the hidden weights), a recursive neural network, or a long short-term memory, LSTM network.

Similar to previous model embodiments, model embodiment 1600A is configured such that transcript 201 is processed by transcript processing logic 222 to generate one or more text segment(s) 304 with associated text feature(s) 324. The associated text feature(s) 324 may be syntactic features 344 or semantic features 364. In model embodiment 1600A, the text segment(s) are processed by the tapestry layout selection model 1042, the textual element selection model 1062, and the graphical element selection model 1082 to respectively generate the selected tapestry layout 1101, selected textual element(s) 1111, and the selected graphical element(s) 1121. The respective outputs are processed as input by the tapestry composition model 1092 to generate the final tapestry 204. Recurrent loops between and within model components proceed until no new inputs are available to process, such as the end of a transcript or the lack of new alterations to the tapestry elements.

Recurrent neural networks of various topologies are frequently implemented for sequence processing so that the sequential segment(s) need not have a specified length. In particular, the cyclical nature of this topology allows for recurrent learning of long sequences such as text classification and prediction. In some embodiments, recurrent neural networks are able to process the sentence from FIG. 4, "I drive a car", in a manner that allows each word to be processed sequentially in context of all other words with differing fragment lengths. Thus, recurrent neural networks are often implemented in natural language processing applications and can address the cyclical topology of interactive tapestry generation within system 1500A.

In addition, a recurrent neural network may also be implemented for the disclosed method to enable real-time generation of tapestries such that a tapestry may be generated and iteratively updated as transcript data is obtained during a meeting. In one implementation, transcript text segment(s) are analyzed in regular intervals as they are obtained. The interval at which a new input is fed into the tapestry generator can be determined by the length of the text segment. In other embodiments, the interval at which new inputs are fed into the tapestry generator is determined by a confidence score that the available text contains sufficient information for tapestry generation, as informed by processing of associated text features.

The analysis of the currently available text segment(s) results in generation of a draft tapestry, which continues to iteratively update as new information is obtained. In one embodiment, previously processed text is re-processed within the context of newly generated text during future processing, whereas in other embodiments, each unique text segment is only processed one time. In some embodiments, certain connections are fixed such that once an output is obtained, the output is also fixed. In other embodiments, the network is fully recurrent such that the outputs of each node affect the inputs of each node. In yet other embodiments, certain outputs are fixed, such as the tapestry layout, whereas other outputs are continuously updated, such as the selected textual or graphical elements.

Similar to the interactive generation of tapestries from a full transcript obtained after a meeting has ended, the alterations made to a tapestry in real-time as novel text is processed may be restricted by similar rule sets as described for the tapestry alteration logic 1502. In some embodiments of real-time tapestry generation, the selection of tapestry elements and layout from the processed text may be further restricted by certain compatibility, prioritization, or inclusion rules set by previous outputs of the tapestry generation model.

In contrast to recurrent neural network topologies, the interactive generation of a tapestry, or other cyclical tapestry generation processes such as real-time generation of a tapestry, may also be implemented using other topologies similar to those within model embodiment 700A, 700B, 1200A, or 1200B.

FIG. 16B shows an architectural level schematic of a tapestry generator model configured to interactively generate a tapestry, within accordance with another implementation of the technology disclosed. In contrast to model embodiment 1600A, model embodiment 1600B comprises a simple loop structure similar to the architecture overview for system 1500A presented within FIG. 15A. As in model embodiment 1600A, transcript 201 is processed by transcript processing logic 222 to generate one or more text segment(s) 304 with associated text feature(s) 324. The associated text feature(s) 324 may be syntactic features 344 or semantic features 364.

In model embodiment 1600A, the text segment(s) are processed by the tapestry layout selection model 1042, the textual element selection model 1062, and the graphical element selection model 1082 to respectively generate the selected tapestry layout 1101, selected textual element(s) 1111, and the selected graphical element(s) 1121. The respective outputs are processed as input by the tapestry composition model 1092 to generate the final tapestry 204. Both model embodiments 1600A and 1600B may comprise knowledge sharing connections between the tapestry layout model 1042, the textual element selection model 1062, and the graphical element selection model 1082. The resulting outputs corresponding to the selected tapestry layout 1101, the selected textual element(s) 1111, and the selected graphical element(s) 1121 are processed as input to generate the tapestry 204 by the tapestry composition model 1092.

As previously described for system 1500A, the tapestry alteration logic 1502 receives a tapestry element alteration via the selection of a candidate replacement tapestry element by a user. The tapestry alteration logic 1502 introduces the user-selected alteration option as a new tapestry layout rule, such that the input data comprising text segment(s) 304 further comprises a rule such that a particular textual element or graphical element must be included, or cannot be included, with a particular arrangement within the final tapestry. If the tapestry alteration logic 1502 detects that an additional alteration must be made in response to the previous tapestry alteration, the tapestry alteration logic 1502 will again route this data back to an earlier stage of the tapestry generator model and the cycle will conclude once no further downstream alterations are necessary to generate a tapestry. The tapestry composition rules can be guided by hyperparameters of the tapestry generation model, user inputs, or rules associated with a tapestry layout or tapestry template. Once the tapestry alteration logic 1502 determines that no further alterations are to be made in response to the user-selected alteration option, the process reaches the stopping point 1504.

In some embodiments of cyclical tapestry generation methods such as real-time generation or interactive generation, a single alteration to the draft tapestry is processed at one time, such that alterations occur in a linear progression. The order of alterations is guided by prioritization rule(s). In other embodiments, a plurality of tapestry alterations may be processed simultaneously.

Next, an example use case of the interactive generation of a tapestry is given.

Example Application of an Interactive Tapestry Generator

FIG. 17A shows a draft tapestry within a graphical user interface with options for interaction with the tapestry. The interactive tapestry interface is displayed as an app within a Zoom Meeting™ session. In some embodiments, the interface may also be an independent application accessible locally or via a web browser. Draft tapestry 1700A is an automatically generated tapestry rendered with an arrangement of textual and graphical elements selected to represent a meeting transcript. The graphical user interface offers interactive options to edit the tapestry through a magic hand cursor with tool-tips that appear when a user selects (or in certain embodiments, hovers the cursor over) the pencil icon next to a particular element.

Tool-tip options for a textual element of the draft tapestry may include alteration options such as alternative phrases, alternative typography, and alternative positioning. Alternate phrase options for a textual element of the draft tapestry include an alteration to the textual element to correct a transcription error from the transcript. Alternative typography options for a textual element of the draft tapestry include an alteration to a font, a typeface, a text size, a font emphasis style, or a font color of the textual element. The alternative options available for a particular tapestry element are restricted in view of the statistical analysis outputs associated with the tapestry element content and location. As previously described, a plurality of statistical analyses may be implemented within the disclosed method to produce a plurality of various metrics and classifications related to the semantic content or syntactic content of a textual element, a feature of a graphical element, or a feature of a relationship between a first textual or graphical element and a second textual or graphical element. In some embodiments, selected textual and graphical elements may be rank-ordered by a similarity metric quantifying the distance between a particular tapestry element and a particular sentiment category.

For a given location in the tapestry, multiple potential tapestry element options are identified by one of the disclosed statistical analyses and rank-ordered by at least one output of at least one statistical analysis. The highest-ranked tapestry element will be placed in the given location in the tapestry. However, embodiments configured to allow interactive tapestry design and enable a user to select an alternative tapestry element for the given location in the tapestry. The alternative tapestry elements can be restricted by their location in the rank-ordered list. For instance, the next pre-defined quantity of elements in the rank-ordered list, a top percentile of elements in the rank-ordered list, a descriptive statistic of elements in the rank-ordered list, or a range of values describing the quantity, percentile, or statistic threshold necessary for a particular tapestry element can be presented to the user as allowed alternative tapestry elements for the given location.

Draft tapestry 1700A may not be final and undergo future alterations. It includes textual and graphical elements. A first large tapestry element 1702 includes a graphical element superimposed with a textual element. Additional smaller tapestry elements 1722 include various shorter textual segments superimposed with graphical components such as symbols and arrows.

Tapestry 1700A also comprises a magic hand cursor 1704 to mediate user interaction with tapestry elements. The magic hand cursor 1704 can interact with tapestry elements or the tapestry layout as a whole via a particular user-driven function such as an overlapping hover, a certain number of mouse clicks, or a certain pattern of touchscreen taps and swipes. When the magic hand cursor 1704 interacts with the tapestry layout via the background of the tapestry or a designated, labeled location specific to the tapestry layout alteration options, tool-tip options appear related to the adjustment of the placement of tapestry elements, number of tapestry elements, or compatible content with the tapestry layout alteration options. In many implementations, the available alteration options for the tapestry layout are restricted in view of the transcript content, statistical analyses, or certain features associated with the tapestry layout. In other embodiments of the technology, alteration of the tapestry layout is not allowed. In some implementations, in which the tapestry is generated by a template, the magic hand cursor 1704 can be used to select a non-overlapping alternative template. Then the entire tapestry is regenerated within the set of rules and slot placement of the selected alternative template.

When the magic hand cursor 1704 interacts with a tapestry element, a plurality of candidate replacement options are presented to the user as tool-tip options. The candidate replacement options may be restricted by one or more rules or rank-ordered lists as previously described. If the user selects a candidate replacement option from the available options, the alteration will be initiated as well as any further downstream alterations dictated by a rule associated with the tapestry or tapestry generation process. Within the following sequence of illustrations within FIGS. 17B, 17C, and 17D, a user-selected alteration is chosen which initiates a plurality of downstream tapestry alterations.

FIG. 17B shows a draft tapestry within a graphical user interface with options for interaction with the tapestry. A magic hand cursor can be employed by a user to alter a particular tapestry element. Draft tapestry 1700B first illustrates the user selection of tapestry element 1706, as indicated by the blue highlight, mediated by magic hand cursor 1704. At this stage, other tapestry elements 1702 and 1722 remain unchanged and the selection of tapestry element 1706 has not yet initiated an alteration.

FIG. 17C shows a draft tapestry within a graphical user interface with options for interaction with the tapestry. Alternative options for the particular tapestry element are presented to the user. Following selection of tapestry element 1706, tapestry alteration options are presented in the tool-tip pop-up window 1724. In addition to the sun symbol already present within the draft tapestry, an alternative sun design comprising a triskelion is presented to the user. In the given example, only two tapestry elements are compatible with the user-selected location and thus, each tapestry element, when selected, is associated with a single candidate replacement option. The two candidate tapestry elements, the "sun with rays" or the "sun with a triskelion", were selected by a series of statistical analyses within the model components of the tapestry generator. The "sun with rays" symbol is originally placed within draft tapestry 1700A because it outranks the "sun with a triskelion" symbol in at least one rank-ordered list, such as a list ranked by weighted importance or a list ranked by similarity to a tapestry theme. However, the "sun with triskelion" symbol is the second-best option, therefore it is presented to the user as a candidate replacement.

In some implementations, the number of alternative options presented to the user may be limited by a set maximum of allowable alternative options, a rank threshold that must be met to be included (e.g., only the top two, three, or five tapestry elements within a rank-ordered list are presented to the user), or a percentile threshold that must be met to be included (e.g., only the top five percent or ten percent of tapestry elements within a rank-ordered list are presented to the user). In other embodiments, the number of alternative options presented to the user may be all alternative options within a rank-ordered list. In some embodiments, the relevant rank-ordered list guiding inclusion of tapestry elements may comprise a smaller number of tapestry elements than the allowed number, resulting in all tapestry elements being presented to the user as alteration options.

Within draft tapestry 1700C, the user selects the candidate replacement tapestry element, a "sun with a triskelion", to replace the "sun with rays" symbol at the selected location.

FIG. 17D shows an altered tapestry within a graphical user interface, in which alteration of one tapestry element has resulted in a plurality of downstream alterations. Within draft tapestry 1700D, tapestry element 1706 has been replaced with tapestry element 1744. In addition to the replacement of the graphical content within tapestry element 1706, the alteration event also initiated a replacement of the textual content such that the textual element superimposed on the symbol within tapestry element 1744 comprises a text segment associated with the replacement symbol. Additionally, tapestry element 1742 and tapestry elements 1762 have also been altered with new graphical and textual content in response to the alteration of 1744. These alterations are guided by the compatibility rules, prioritization rules, and inclusion rules associated with the tapestry layout and the statistical analyses of the transcript.

The interaction with a tapestry draft to generate an alternative tapestry may result in a non-overlapping number of tapestry alterations to that within the example shown within FIGS. 17A-D. The number of downstream tapestry alteration events that occur in response to a user-selected alteration option depends on the specific rules associated with the tapestry, the tapestry generator architecture and hyperparameters, the tapestry content, and the output of the statistical analyses performed by the tapestry generator.

Computer System

FIG. 18 is a simplified block diagram of a computer system 1800 that can be used for generating a graphical summary of a meeting that provides a reflection of a group's conversation in a tapestry, within accordance with an implementation of the disclosed technology. Computer system 1800 includes at least one central processing unit (CPU) 1872 that communicates with a number of peripheral devices via bus subsystem 1855 and tapestry generator system 104. These peripheral devices can include a storage subsystem 1810 including, for example, memory devices and a file storage subsystem 1836, user interface input devices 1837, user interface output devices 1876, and a network interface subsystem 1874. The input and output devices allow user interaction with computer system 1800. Network interface subsystem 1874 provides an interface to outside networks, including an interface to corresponding interface devices in other computer systems.

In one implementation, tapestry generator system 104 of FIG. 1 is communicably linked to the storage subsystem 1810 and the user interface input devices 1837.

User interface input devices 1837 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1800.

User interface output devices 1876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1800 to the user or to another machine or computer system.

Storage subsystem 1810 stores programming and data constructs that provide the functionality of some or all of the modules and methods described. Subsystem 1877 can be graphics processing units (GPUs) or field-programmable gate arrays (FPGAs).

Memory subsystem 1822 used in the storage subsystem 1810 can include a number of memories including a main random access memory (RAM) 1832 for storage of instructions and data during program execution and a read only memory (ROM) 1834 in which fixed instructions are stored. A file storage subsystem 1836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1836 in the storage subsystem 1810, or in other machines accessible by the processor.

Bus subsystem 1855 provides a mechanism for letting the various components and subsystems of computer system 1800 communicate with each other as intended. Although bus subsystem 1855 is shown schematically as a single bus, alternative implementations of the bus subsystem can use multiple busses.

Computer system 1800 itself can be of varying types including a personal computer, a portable computer, a workstation, a computer terminal, a network computer, a television, a mainframe, a server farm, a widely-distributed set of loosely networked computers, or any other data processing system or user device. Due to the everchanging nature of computers and networks, the description of computer system 1800 depicted in FIG. 18 is intended only as a specific example for purposes of illustrating the preferred embodiments of the present invention. Many other configurations of computer system 1800 are possible having more or less components than the computer system depicted in FIG. 18.

Particular Implementations

Some particular implementations and features for generating a graphical summary of a meeting that provides a reflection of a group's conversation in a tapestry are described in the following discussion.

In one disclosed implementation, the method includes processing, as input, a transcript from a meeting with a language understanding model to extract, as output, textual elements including lemmas, words, phrases, and sentences. From the extracted textual elements, a subset of textual elements is selected based on statistical analyses of the transcript. Graphical elements from a symbol library are selected based on statistical analyses of the selected textual elements. Slots are filled within a tapestry template with the textual and graphical elements, and a tapestry is rendered including the textual and graphical elements within the filled slots. In certain implementations, the tapestry may be generated in real-time along with the meeting as the transcript becomes available, while in other implementations, the tapestry may be generated at a later point in time as a summary of the transcript as a whole.

In another disclosed implementation, the method includes processing, as input, a transcript from a meeting with a language understanding model to extract, as output, textual elements including lemmas, words, phrases, and sentences. From the extracted textual elements, a subset of textual elements is selected based on statistical analyses of the transcript. Graphical elements from a symbol library are selected based on statistical analyses of the selected textual elements. In contrast to filling slots within a tapestry template, however, an algorithmic layout method is selected comprising a series of steps guiding an arrangement of selected textual and graphical elements within a tapestry. A tapestry is rendered comprising the arrangement of textual and graphical elements respective to the transcript.

In yet another disclosed implementation, a draft tapestry is automatically rendered including the textual and graphical elements using a combination of generation strategies described above. A magic hand cursor is implemented within a graphical user interface with tool-tip options for altering textual and graphical elements in the draft tapestry. For a textual element of the draft tapestry, alteration options are offered such as alternative phrases, alternative typography, and alternative positioning. For a graphical element of the draft tapestry, alteration options are offered such as alternative symbols, alternative design, and alternative positioning. Following all alterations made to the draft tapestry, the interactively generated tapestry is rendered in response to user selections made via the magic hand cursor.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some implementations of the disclosed method further include the transcript being obtained from an online/remote meeting. The transcript may be generated automatically within an online meeting platform (e.g., Zoom™, Microsoft Teams™, Google Meet™, or WebEx Meet™) or by an additional transcription service used to process the meeting recording. The transcript is parsed for textual elements, time length of speech, time length between participants speaking, sentiment scoring, and annotation data. To analyze the transcript, a summarization and visualization tool comprising a plurality of parameters customizable in response to user selection is provided within a graphical user interface. The parameters include a tapestry template or layout method, a filter for inclusion of one or more symbols, a prioritization schema for graphical element placement within a tapestry, and parameters guided by the output from one or more statistical analyses of the selected textual and graphical elements (e.g., an occurrence or co-occurrence frequency, a set of weights or other importance metrics, or NLP scoring of the textual elements).

Some implementations of the disclosed method further include a tapestry template comprising a plurality of rules guiding the arrangement of textual and graphical elements within the rendered tapestry, such as inclusion filtering or prioritization schema. Other implementations of the disclosed method further include an algorithmic layout method comprising a series of steps guiding an arrangement of selected textual and graphical elements within a tapestry. The algorithmic layout method may comprise one or more algorithms, statistical analyses, machine learning models, or factory methods. Inputs for the algorithmic layout method may comprise parsed textual elements, conversational structure, temporal data, sentiment scoring, annotation data, and user-input prioritization schema. Examples of resulting tapestry layouts may include a circular tapestry layout comprising at least one textual or graphical element centered within the tapestry surrounded by a plurality of textual and graphical elements, a linear tapestry layout comprising a plurality of textual and graphical elements organized along an axis respective to one or more properties, or a tabular tapestry layout comprises a plurality of textual and graphical elements organized along two or more axes respective to one or more properties.

A circular tapestry layout may comprise elements arranged by their degree of relatedness to a central theme (as determined by sentiment analysis, relatedness analysis, or a quality metric influenced by pre-defined criteria). A linear tapestry layout may comprise elements arranged by a temporal property (such as a time-linearity with respect to the progress of the meeting, the progress of an overall pre-defined process an enterprise aims to traverse as a means to achieve a goal, or the chronology of a discussed event) or a pre-defined metric with a range of output values (such as a measure of discussion quality, discussion progress, or a particular sentiment within the meeting such as bias towards a particular topic, degree of positivity or negativity of extracted textual elements from the transcript, or a suggested flowchart for a process as determined by extracted textual elements from the transcript). A tabular tapestry layout may comprise elements organized in a grid-like structure, where elements may be arranged within so-called columns and rows guiding a pre-determined grouping scheme (such as clustering or categorization of textual and graphical elements by sentiment, quality, topic, or respective speaker). However, the above examples are explicitly listed for convenience of description and should not be limited to the implementations of layout methods listed herein.

In some implementations, the population of a tapestry template or generation of an algorithmic layout method is generated from a machine learning model trained on previously generated tapestries. Certain implementations may select symbols from a symbol library, while other implementations may select transcript-prompted synthesized symbols generated by an image generation logic configured to process the transcript, textual elements extracted from the meeting transcript, or an output generated by the statistical analyses of the textual elements.

In one disclosed implementation, the method described in this section further includes the option to interact with a tapestry generated using a template or a layout method with a magic hand cursor to render an interactively generated tapestry. In the event that a tapestry is manually edited by a user, a protected, unedited record of the transcript, statistical analyses, and draft tapestry, as well as a record of all user-selected changes, are maintained on record for reference in some implementations of the disclosed method.

In another disclosed implementation, the tapestry may be generated and iteratively updated in live time during a meeting, processing the transcript as it is generated by group members speaking. The tapestry generator in this implementation may be a plug-in provided by an online meeting platform, or a separate application with access permissions to an online meeting platform.

In yet another disclosed implementation, the tapestry may be further analyzed with additional metrics to score the generated tapestry for accuracy or relevancy, as defined by a pre-determined goal set by a meeting facilitator or coordinator (e.g., relevancy of topics discussed within the meeting to a particular goal or number of potential solutions for a particular problem suggested by team members within the meeting).

Other implementations of the methods described in this section can include a tangible non-transitory computer-readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

A system of one or more computers can be configured to perform particular operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a computer-implemented method of automatically generating a graphical summary of a meeting that provides a reflection of a group's conversation with textual and graphical elements in a tapestry.

The computer-implemented method can also include processing, as input, a transcript from a meeting with a natural language processing (NLP) model to extract, as output, textual elements including lemmas, words, phrases, and sentences; selecting textual elements among extracted textual elements based on statistical analysis of the transcript, selecting graphical elements from a symbol library based on the statistical analysis of the selected textual elements, filling slots within a tapestry template with the selected textual and graphical elements, and generating a tapestry including the selected textual and graphical elements within filled slots. Other embodiments of this aspect include corresponding computer systems, apparatus, and computer programs recorded on one or more computer storage devices, each configured to perform the actions of the methods.

Implementations may include one or more of the following features. The computer-implemented method may be applied to a meeting transcript, wherein the transcript is from a remote online meeting, an in-person meeting, or a series of multiple meetings. The transcript may be generated automatically by a computational process or manually transcribed by a human transcriptionist. The transcript is parsed for textual elements, time length of speech, time length between participants speaking, sentiment scoring, and annotation data. The computer-implemented method further includes a summarization and visualization tool that may include a plurality of parameters customizable in response to user selection. A parameter within the plurality of parameters is the tapestry template. The tapestry template may include textual element slots and graphical element slots, where the arrangement of content into the slots follows one or more pre-defined rules. The pre-defined rules for the arrangement of slots include rules dictating a number of slots within the template, a size of the slots, or a location of the slots. A parameter within the plurality of parameters is a filter for the inclusion of one or more symbols. A parameter within the plurality of parameters is a prioritization schema for graphical element placement within a tapestry.

The statistical analysis described can process a frequency of a particular textual element. The statistical analysis can also process additional semantic features, syntactic features, or a combination of semantic and syntactic features of the particular textual element. The statistical analysis processes a set of weighted importances corresponding to textual elements. Words processed within the transcript by the NLP model are classified within a particular lemma. A relationship between textual element data structures and graphical element data structures is many-to-one, such that a plurality of textual elements may relate to the same graphical element. The tapestry template may include a plurality of rules, and where at least one of the plurality of rules requires that a particular slot can only be filled with a graphical element or a textual element. A rule within the plurality of rules states that one or more textual or graphical elements are prioritized for a particular slot. Implementations of the described techniques may include hardware, a method or process, or computer software on a computer-accessible medium.

One general aspect includes a tangible non-transitory computer-readable storage media. The tangible non-transitory computer-readable storage media also includes processing, as input, a transcript from a meeting with a language understanding model to extract, as output, textual elements including lemmas, words, phrases, and sentences; selecting among extracted textual elements based on at least one statistical analysis of the transcript, selecting graphical elements from a symbol library based on at least one statistical analysis of selected textual elements, filling slots within a tapestry template with the textual and graphical elements, and generating a tapestry including the textual and graphical elements within filled slots. Other embodiments of this aspect include corresponding computer systems, apparatus, and computer programs recorded on one or more computer storage devices, each configured to perform the actions of the methods.

Implementations may include one or more of the following features. The non-transitory computer-readable storage media where the tapestry template may include textual element slots and graphical element slots, where the arrangement of slots follows one or more pre-defined rules. A system for automatically generating a graphical summary of a meeting that provides a reflection of a group's conversation with textual and graphical elements in a tapestry, the system including a processor, memory coupled to the processor, and program instructions from the non-transitory computer-readable storage media loaded into the memory. The tapestry template may include a plurality of rules, and where a rule within the plurality of rules states that a particular slot can only be filled with a graphical element or a textual element. A rule within the plurality of rules states that one or more textual or graphical elements are prioritized for a particular slot. Implementations of the described techniques may include hardware, a method or process, or computer software on a computer-accessible medium.

Another implementation of the technology disclosed comprises a computer-implemented method of selecting an algorithmic layout method to generate a graphical summary of a meeting that provides a reflection of a group's conversation with textual and graphical elements in a tapestry. The computer-implemented method of selecting also includes processing, as input, a transcript from a meeting with a language understanding model to extract, as output, textual elements including lemmas, words, phrases, and sentences; selecting among extracted textual elements based on at least one statistical analysis of concept importance in the transcript (such as a frequency, relevance or similarity to a reference concept, a temporal measure such as timestamp at which a concept was introduced, or a statistical computation of importance such as mean decrease impurity or mean decrease accuracy, and so on), selecting graphical elements from a symbol library based on at least one statistical analysis of the connection between the selected textual elements and the symbols, selecting an algorithmic layout method may include a series of steps guiding an arrangement of selected textual and graphical elements within the tapestry, and generating the tapestry may include the arrangement of textual and graphical elements respective to the transcript. Other embodiments of this aspect include corresponding computer systems, apparatus, and computer programs recorded on one or more computer storage devices, each configured to perform the actions of the methods.

Implementations may include one or more of the following features. The computer-implemented method where the transcript is from an online meeting. The transcript is analyzed for textual elements, time length of speech, time length between participants speaking, sentiment scoring, and annotation data. The computer-implemented method further includes controlling the processing of the transcript responsive to receiving from a user a plurality of customizable parameters. The generation of an algorithmic layout method is controllable and responsive to receiving from a user a plurality of customizable parameters. The user-selected parameters control the form of statistical analysis applied (e.g., random forest, cluster analysis, neural network, significance testing, et cetera) and transcript features to which the statistical analysis is applied. The transcript features from which the user can select can include at least one of the following: parsed textual elements, conversational structure, temporal data, sentiment scoring, annotation data, or a user-input prioritization schema. Additional transcript features, such as semantic or syntactic features of the textual elements within the transcript, may also be processed by the one or more statistical analyses. The user-input prioritization schema includes allowed symbols, arrangement of textual and graphical elements, and weighted importances of one or more particular textual elements.

In one implementation of the technology disclosed, the tapestry layout is a circular tapestry layout, wherein the circular tapestry layout (also referred to as a radial tapestry layout) may include at least one textual or graphical element centered within the tapestry radially surrounded by a plurality of textual and graphical elements. In another implementation of the technology disclosed, the tapestry layout is a linear tapestry layout, wherein the linear tapestry layout may include a plurality of textual and graphical elements organized along an axis respective to one or more properties. In yet another implementation of the technology disclosed, the tapestry layout is a tabular tapestry layout, wherein the tabular tapestry layout may include a plurality of textual and graphical elements organized along two or more axes respective to one or more properties. Additional categories of tapestry layouts can be implemented, as well as sub-categories of each tapestry layout (e.g., sub-categories of a linear algorithmic layout method may include a timeline or a two-dimensional spectrum). The algorithmic layout method is generated from a statistical model trained on previously generated tapestries, textual element features, graphical element features, and pairs of associated textual elements and graphical elements. The symbol library contains a plurality of template symbols, and at least one particular template symbol within the plurality of template symbols is selected, by the algorithmic layout method, for placement within the generated tapestry. Implementations of the described techniques may include hardware, a method or process, or computer software on a computer-accessible medium.

One general aspect includes a tangible non-transitory computer-readable storage media. The tangible non-transitory computer-readable storage media also includes processing, as input, a transcript from a meeting with a language understanding model to extract, as output, textual elements including lemmas, words, phrases, and sentences; selecting among extracted textual elements based on statistical analyses of the transcript, selecting graphical elements from a symbol library based on statistical analyses of selected textual elements, selecting an algorithmic layout method may include a series of steps guiding an arrangement of selected textual and graphical elements within the tapestry, and generating the tapestry may include the arrangement of textual and graphical elements respective to the transcript. Other embodiments of this aspect include corresponding computer systems, apparatus, and computer programs recorded on one or more computer storage devices, each configured to perform the actions of the methods.

Implementations may include one or more of the following features. The non-transitory computer-readable storage media where the transcript is parsed for textual elements, time length of speech, time length between participants speaking, sentiment scoring, and annotation data. A plurality of parameters customizable in response to user selection guides the algorithmic layout method. A system for selecting an algorithmic layout method to generate a graphical summary of a meeting that provides a reflection of a group's conversation with textual and graphical elements in a tapestry, such that the system includes a processor, memory coupled to the processor and program instructions from the non-transitory computer-readable storage media loaded into the memory. The input features may include parsed textual elements, conversational structure, temporal data, sentiment scoring, annotation data, and user-input prioritization schema. The algorithmic layout method can be generated from a statistical model trained on previously generated tapestries, textual element features, graphical element features, and pairs of associated textual elements and graphical elements. Implementations of the described techniques may include hardware, a method or process, or computer software on a computer-accessible medium.

Another disclosed system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One implementation of the technology disclosed includes a computer-implemented method of interactively generating a graphical summary of a meeting that provides a reflection of a group's conversation with tapestry elements in a tapestry. The computer-implemented method further comprises generating a draft tapestry including visible tapestry elements and candidate content replacements of respective visible tapestry elements.

The visible tapestry elements and candidate content replacements may be generated based on computer-implemented natural language analysis of a transcript of the meeting, where earlier-generated visible tapestry elements constrain some later-generated visible tapestry elements. The disclosed method also comprises implementing a magic hand cursor with tooltip options for replacing a visible tapestry element, where the candidate content replacements constrain options for element alteration. The disclosed method also comprises, for one or more iterations, receiving a user selection of an alteration option for a particular visible tapestry element via the magic hand cursor and replacing the visible tapestry element with a replaced element that replaces an earlier-generated visible tapestry element linked to a later-generated visible tapestry element. The disclosed method also comprises processing each of the replaced elements, including evaluating each later-generated tapestry element that no longer satisfies a constraint imposed by the replaced tapestry element on the later-generated and generating, as output, an automatically updated related tapestry element; and generating a revised draft tapestry including the replaced element and the automatically updated related tapestry element. Other embodiments of this aspect include corresponding computer systems, apparatus, and computer programs recorded on one or more computer storage devices, each configured to perform the actions of the methods.

Implementations may include one or more of the following features. In many implementations of the technology disclosed, the alteration options within the magic hand tooltip options are constrained by a rank-ordered list. The rank-ordering within the rank-ordered list corresponds with a probability of inclusion within the set of tapestry elements. In some implementations, a higher-ranked tapestry element is more likely to appear in a set of selected tapestry elements than a lower-ranked tapestry element, a higher-ranked tapestry element is more likely to appear in a set of candidate content replacements than a lower-ranked tapestry element, and/or the rank of an included tapestry element is higher than, or equal to, the rank of a corresponding candidate content replacement for the particular tapestry element.

The selection and the arrangement of the included tapestry element may further include at least one conditional compatibility rule, where a conditional compatibility rule characterizes a necessary condition for the inclusion, the arrangement, or a rendering style of the included tapestry element. The conditional compatibility rule may state in certain implementations that, for a prospective tapestry element to be included within the tapestry, at least one compatible tapestry element must also be included, or at least one incompatible tapestry element must be excluded, where compatibility is defined by the content or the arrangement of the tapestry element. The alteration options for a textual element can include alternative phrases, alternative typography, and alternative positioning. The alteration options for a graphical element can include alternative symbols, alternative design, and alternative positioning. The intersection of the first set of tapestry elements and the second set of tapestry elements includes one or more non-overlapping tapestry elements, a non-overlapping style of one or more tapestry elements, or a non-overlapping arrangement of one or more tapestry elements. Implementations of the described techniques may include hardware, a method or process, or computer software on a computer-accessible medium.

The disclosed technology, in certain implementations, includes the computer-implemented method providing a meeting transcript to a tapestry generation model, where the tapestry generation model is configured to: process, as input, the meeting transcript to extract, as output, textual elements including lemmas, words, phrases, and sentences; select among extracted textual elements based on statistical analyses of the transcript; select graphical elements from a symbol library based on statistical analyses of selected textual elements; determine an arrangement of tapestry elements, from the selected textual and graphical elements, within a tapestry; and generate a tapestry may include the arrangement of tapestry elements respective to the transcript.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of selecting a tapestry layout method to generate a graphical summary of a meeting that provides a reflection of a group's conversation with textual and graphical elements in a tapestry, the method comprising:
    processing, as input, a transcript from a meeting with a natural language processing (NLP) model to extract, as output, textual elements including lemmas, words, phrases, and sentences;
    selecting among extracted textual elements based on statistical analysis of concept importance in the transcript;
    selecting graphical elements from a symbol library based on statistical analysis of connection between the selected textual elements and the graphical elements;
    selecting a tapestry layout method comprising a series of steps guiding an arrangement of selected textual and graphical elements within the tapestry; and
    generating the tapestry comprising the arrangement of textual and graphical elements respective to the transcript.

2. The computer-implemented method of claim 1, wherein the transcript is from an online meeting.

3. The computer-implemented method of claim 1, wherein the transcript is analyzed for textual elements, time length of speech, time length between participants speaking, sentiment scoring, and annotation data.

4. The computer-implemented method of claim 3, further including controlling the processing of the transcript responsive to receiving, from a user, one or more user-selected parameters from a plurality of customizable parameters.

5. The computer-implemented method of claim 4, controlling the tapestry layout responsive to receiving, from a user, one or more user-selected parameters from a plurality of customizable parameters.

6. The computer-implemented method of claim 5, wherein the user-selected parameters control a form of statistical analysis applied and transcript features to which the statistical analysis is applied.

7. The computer-implemented method of claim 6, wherein the transcript features from which the user can select include parsed textual elements, conversational structure, temporal data, sentiment scoring, annotation data, and a user-input prioritization schema.

8. The computer-implemented method of claim 7, wherein the user-input prioritization schema includes allowed symbols, arrangement of textual and graphical elements, and weighted importances of one or more particular textual elements.

9. The computer-implemented method of claim 1, further including selecting a circular tapestry layout, comprising at least one textual or graphical element centered within the tapestry radially surrounded by a plurality of textual and graphical elements.

10. The computer-implemented method of claim 1, further including selecting a linear tapestry layout, comprising a plurality of textual and graphical elements organized along an axis respective to one or more properties.

11. The computer-implemented method of claim 1, further including selecting a tabular tapestry layout, comprising a plurality of textual and graphical elements organized along two or more axes respective to one or more properties.

12. The computer-implemented method of claim 1, wherein the tapestry layout method is generated from a statistical model trained on previously generated tapestries, textual element features, graphical element features, and pairs of associated textual elements and graphical elements.

13. The computer-implemented method of claim 1, wherein the symbol library contains a plurality of template symbols, and at least one particular template symbol within the plurality of template symbols is selected, by the tapestry layout method, for placement within the generated tapestry.

14. A tangible non-transitory computer-readable storage media, including program instructions loaded into memory that, when executed on processors, cause the processors to implement a method of selecting a tapestry layout method to generate a graphical summary of a meeting that provides a reflection of a group's conversation with textual and graphical elements in a tapestry, the method including:
- processing, as input, a transcript from a meeting with a natural language processing (NLP) model to extract, as output, textual elements including lemmas, words, phrases, and sentences;
- selecting among extracted textual elements based on statistical analysis of concept importance in the transcript;
- selecting graphical elements from a symbol library based on statistical analysis of connection between the selected textual elements and the graphical elements;
- selecting a tapestry layout method comprising a series of steps guiding an arrangement of selected textual and graphical elements within the tapestry; and
- generating the tapestry comprising the arrangement of textual and graphical elements respective to the transcript.

15. The non-transitory computer-readable storage media of claim 14, wherein the transcript is parsed for textual elements, time length of speech, time length between participants speaking, sentiment scoring, and annotation data.

16. The non-transitory computer-readable storage media of claim 15, wherein the tapestry layout method is guided by a plurality of parameters customizable in response to user selection.

17. A system for selecting a tapestry layout method to generate a graphical summary of a meeting that provides a reflection of a group's conversation with textual and graphical elements in a tapestry, the system including a processor, memory coupled to the processor and program instructions from the non-transitory computer-readable storage media of claim 15 loaded into the memory.

18. The system of claim 17, wherein the input features include parsed textual elements, conversational structure, temporal data, sentiment scoring, annotation data, and user-input prioritization schema.

19. The system of claim 18, wherein the tapestry layout method is generated from a statistical model trained on previously generated tapestries, textual element features, graphical element features, and pairs of associated textual elements and graphical elements.

* * * * *